United States Patent
Gruner-Nielsen et al.

(10) Patent No.: US 9,250,383 B2
(45) Date of Patent: Feb. 2, 2016

(54) STEP-INDEX FEW-MODE FIBER DESIGNS FOR SPATIAL MULTIPLEXING

(75) Inventors: Lars Gruner-Nielsen, Copenhagen (DK); Robert L. Lingle, Alpharetta, GA (US); Alan McCurdy, Duluth, GA (US); David W. Peckham, Lawrenceville, GA (US); Torger Tokle, Allerod (DK)

(73) Assignee: OFS FITEL, LLC, Norcross, GA (US)

( * ) Notice: Subject to any disclaimer, the term of this patent is extended or adjusted under 35 U.S.C. 154(b) by 331 days.

(21) Appl. No.: 14/001,050

(22) PCT Filed: Feb. 24, 2012

(86) PCT No.: PCT/US2012/026663
§ 371 (c)(1),
(2), (4) Date: Dec. 20, 2013

(87) PCT Pub. No.: WO2012/161810
PCT Pub. Date: Nov. 29, 2012

(65) Prior Publication Data
US 2014/0093205 A1    Apr. 3, 2014

Related U.S. Application Data

(60) Provisional application No. 61/446,222, filed on Feb. 24, 2011, provisional application No. 61/531,842, filed on Sep. 7, 2011.

(51) Int. Cl.
G02B 6/02     (2006.01)
G02B 6/036    (2006.01)
G02B 6/26     (2006.01)
G02B 6/028    (2006.01)

(52) U.S. Cl.
CPC .............. *G02B 6/02042* (2013.01); *G02B 6/02* (2013.01); *G02B 6/0288* (2013.01); *G02B 6/0365* (2013.01); *G02B 6/03611* (2013.01); *G02B 6/03627* (2013.01); *G02B 6/03633* (2013.01); *G02B 6/03666* (2013.01); *G02B 6/03683* (2013.01); *G02B 6/262* (2013.01); *G02B 6/02019* (2013.01); *G02B 6/0281* (2013.01)

(58) Field of Classification Search
None
See application file for complete search history.

(56) References Cited

U.S. PATENT DOCUMENTS

| | | | | |
|---|---|---|---|---|
| 2001/0022884 A1* | 9/2001 | Bayart | ................ | H01S 3/06708 385/123 |
| 2004/0114892 A1* | 6/2004 | Chiang | ................ | G02B 6/0283 385/123 |
| 2007/0212006 A1* | 9/2007 | Wysocki | ................. | G02B 6/04 385/115 |
| 2009/0279835 A1* | 11/2009 | de Montmorillon | . | G02B 6/0365 385/127 |
| 2010/0310218 A1* | 12/2010 | Molin | ................ | G02B 6/03627 385/123 |
| 2011/0243519 A1* | 10/2011 | Jiang | .................. | G02B 6/02023 385/126 |
| 2013/0071114 A1* | 3/2013 | Bickham | .............. | G02B 6/0288 398/44 |

* cited by examiner

*Primary Examiner* — Hemang Sanghavi
(74) *Attorney, Agent, or Firm* — Jacobs & Kim LLP

(57) ABSTRACT

A few-mode optical fiber comprises a core surrounded by a cladding, having a step index profile that is structured to support propagation of a plurality of desired signal-carrying modes, while suppressing undesired modes. The core and cladding are configured such that the undesired modes have respective effective indices that are close to, or less than, the cladding index such that the undesired modes are leaky modes. The index spacing between the desired mode having the lowest effective index and the leaky mode with the highest effective index is sufficiently large so as to substantially prevent coupling therebetween.

17 Claims, 44 Drawing Sheets

30

| Approximate allowable mean DGD (ps/km) (30 Gbaud) | | | | Mode Coupling Strength L_c (km) | Approximate allowable mean DGD (ps/km) (60 Gbaud) | | | |
|---|---|---|---|---|---|---|---|---|
| | Link Distance (km) | | | | | Link Distance (km) | | |
| N_taps | 100 | 500 | 1000 | 50 | N_taps | 100 | 500 | 1000 |
| 10 | 3 | 1 | 1 | | 10 | 2 | 1 | 1 |
| 100 | 33 | 15 | 11 | | 100 | 17 | 7 | 5 |
| 1000 | 333 | 149 | 105 | | 1000 | 167 | 75 | 53 |
| | Link Distance (km) | | | | | Link Distance (km) | | |
| N_taps | 100 | 500 | 1000 | 10 | N_taps | 100 | 500 | 1000 |
| 10 | 7 | 3 | 2 | | 10 | 4 | 2 | 1 |
| 100 | 75 | 33 | 24 | | 100 | 37 | 17 | 12 |
| 1000 | 745 | 333 | 236 | | 1000 | 373 | 167 | 118 |
| | Link Distance (km) | | | | | Link Distance (km) | | |
| N_taps | 100 | 500 | 1000 | 5 | N_taps | 100 | 500 | 1000 |
| 10 | 11 | 5 | 3 | | 10 | 5 | 2 | 2 |
| 100 | 105 | 47 | 33 | | 100 | 53 | 24 | 17 |
| 1000 | 1054 | 471 | 333 | | 1000 | 527 | 236 | 167 |
| | Link Distance (km) | | | | | Link Distance (km) | | |
| N_taps | 100 | 500 | 1000 | 1 | N_taps | 100 | 500 | 1000 |
| 10 | 24 | 11 | 7 | | 10 | 12 | 5 | 4 |
| 100 | 236 | 105 | 75 | | 100 | 118 | 53 | 37 |
| 1000 | 2357 | 1054 | 745 | | 1000 | 1179 | 527 | 373 |

FIG. 3

| 701 | #Region | Index Start | Index End | Alpha | Width |
|---|---|---|---|---|---|
| | # 1 | 0.240E-02 | 0.000E+00 | 0.250E+02 | 0.7375E+01 |
| | # 2 | 0.000E+00 | -0.500E-03 | 0.000E+00 | 0.5500E+01 |
| | # 3 | 0.000E+00 | -0.500E-03 | 0.000E+00 | 0.5000E+01 |
| | # 4 | 0.000E+00 | 0.000E+00 | 0.000E+00 | 0.4462E+02 |

| 702 | | |
|---|---|---|
| | $LP_{01}$ $A_{eff}$ | 148 μm² |
| | $LP_{11}$ $A_{eff}$ | 144 μm² |
| | DGD (1550nm) | 45 ps/km |
| | $LP_{01}$ effective index | 0.00196 |
| | $LP_{11}$ effective index | 0.00015 |

Profile Parameters

| 1201 | #Region | Index Start | Index End | Alpha | Width |
|---|---|---|---|---|---|
| | # 1 | 0.400E-02 | 0.000E+00 | 0.250E+02 | 0.5675E+01 |
| | # 2 | 0.000E+00 | -0.800E-03 | 0.000E+00 | 0.5500E+01 |
| | # 3 | 0.000E+00 | -0.800E-03 | 0.000E+00 | 0.5000E+01 |
| | # 4 | 0.000E+00 | 0.000E+00 | 0.000E+00 | 0.4632E+02 |

| 1202 | | |
|---|---|---|
| | LP01 $A_{eff}$ | 88.3 µm² |
| | LP11 $A_{eff}$ | 85.0 µm² |
| | DGD (1550nm) | 52 ps/km |
| | LP01 effective index | 0.00326 |
| | LP11 effective index | 0.00022 |

Profile Parameters

| 1301 | #Region | Index Start | Index End | Alpha | Width |
|---|---|---|---|---|---|
| | #1 | 0.400E-02 | 0.000E+00 | 0.250E+02 | 0.559E+01 |
| | #2 | 0.000E+00 | 0.000E+00 | 0.000E+00 | 0.550E+01 |
| | #3 | 0.000E+00 | -0.400E-02 | 0.000E+00 | 0.500E+01 |
| | #4 | 0.000E+00 | -0.500E-03 | 0.000E+00 | 0.900E+01 |
| | #5 | 0.000E+00 | 0.000E+00 | 0.000E+00 | 0.374E+02 |

| 1302 | | |
|---|---|---|
| | LP01 $A_{eff}$ | 92 μm² |
| | LP11 $A_{eff}$ | 90 μm² |
| | DGD (1550nm) | 51 ps/km |
| | $LP_{01}$ effective index | 0.00331 |
| | $LP_{11}$ effective index | 0.00042 |

Profile Parameters

| 146 | #Region | Index Start | Index End | Alpha | Width |
|---|---|---|---|---|---|
| | #1 | 0.250E-02 | 0.000E+00 | 0.250E+02 | 0.700E+01 |
| | #2 | 0.000E+00 | 0.000E+00 | 0.000E+00 | 0.750E+01 |
| | #3 | 0.000E+00 | -0.400E-02 | 0.000E+00 | 0.500E+01 |
| | #4 | 0.000E+00 | -0.800E-03 | 0.000E+00 | 0.900E+01 |
| | #5 | 0.000E+00 | 0.000E+00 | 0.000E+00 | 0.340E+02 |

| 147 | | |
|---|---|---|
| | LP01 Aeff | 146 μm2 |
| | LP11 Aeff | 144 μm2 |
| | DGD (1550nm) | 36 ps/km |
| | LP01 effective index | 0.00205 |
| | LP11 effective index | 0.00023 |

250

| Example 1.1 – Specifications | | |
|---|---|---|
| Graded-Index Core | Start Δn | 0.0081 |
| | End Δn | 0 |
| | Radius | 7.7 μm |
| | Alpha | 2.00 |
| Shoulder | Δn | 0 |
| | Thickness | 1.085 μm |
| Trench | Δn | -0.006 |
| | Thickness | 6.5 μm |
| Guided Modes | | $LP_{01}, LP_{11}$ |
| Group Delay Difference between $LP_{01}$ and $LP_{11}$ | | < 0.001ps/m across C-band |
| Calculated Effective Area $A_{eff}$ of $LP_{01}$ | | 80.85 μm² at 1550nm |
| Calculated Effective Area $A_{eff}$ of $LP_{11}$ | | 80.5 μm² |

| Example 1.2 – Specifications | | |
|---|---|---|
| Graded-Index Core | Start Δn | 0.0073 |
| | End Δn | 0 |
| | Radius | 8.5 μm |
| | Alpha | 2.09 |
| Shoulder | Δn | 0 |
| | Thickness | 1.61 μm |
| Trench | Δn | -0.006 |
| | Thickness | 6.0 μm |
| Guided Modes | | $LP_{01}, LP_{11}$ |
| Group Delay Difference between $LP_{01}$ and $LP_{11}$ | | < 0.001ps/m across C-band |
| Calculated Effective Area $A_{eff}$ of $LP_{01}$ | | 94.76 μm² at 1550nm |
| Calculated Effective Area $A_{eff}$ of $LP_{11}$ | | 94.9 μm² |

310

| Example 1.3 – Specifications | | |
|---|---|---|
| Graded-Index Core | Start Δn | 0.0139 |
| | End Δn | 0 |
| | Radius | 7.47 μm |
| | Alpha | 2.01 |
| Shoulder | Δn | 0 |
| | Thickness | 0.65 μm |
| Trench | Δn | -0.006 |
| | Thickness | 5.0 μm |
| Guided Modes | | $LP_{01}$, $LP_{11}$ |
| Group Delay Difference between $LP_{01}$ and $LP_{11}$ | | < 0.001 ps/m across C-band |
| Calculated Effective Area $A_{eff}$ of $LP_{01}$ | | 59.62 μm² at 1550nm |
| Calculated Effective Area $A_{eff}$ of $LP_{11}$ | | 59.8 μm² |

330

340

| Example 2 – Specifications | | |
|---|---|---|
| Graded-Index Core | Start Δn | 0.0104 |
| | End Δn | 0.0042 |
| | Radius | 7.51 μm |
| | Alpha | 1.34 |
| Shoulder | Δn | 0 |
| | Thickness | 1 μm |
| Trench | Δn | -0.002 |
| | Thickness | 4.1 μm |
| Guided Modes | | $LP_{01}$, $LP_{11}$ |
| Group Delay Difference between $LP_{01}$ and $LP_{11}$ | | < 0.002ps/m across C-band |
| Calculated Effective Area $A_{eff}$ of $LP_{01}$ | | 77.01 μm² at 1550nm |
| Calculated Effective Area $A_{eff}$ of $LP_{11}$ | | 77.4 μm² (for one spatial pattern $A_{eff}$ of $LP_{11}$ is half of 154.84 μm²) |

370

| Example 3 – Specifications | | |
|---|---|---|
| Graded-Index Core | Start Δn | 0.0139 |
| | End Δn | 0.0022 |
| | Radius | 7.1 μm |
| | Alpha | 1.80 |
| Trench | Δn | -0.0037 |
| | Thickness | 5 μm |
| Guided Modes | | $LP_{01}$, $LP_{11}$ |
| Group Delay Difference between $LP_{01}$ and $LP_{11}$ | | < 0.002 ps/m across C-band |
| Calculated Effective Area $A_{eff}$ of $LP_{01}$ | | 59.59 μm² at 1550nm |
| Calculated Effective Area $A_{eff}$ of $LP_{11}$ | | 59.8 μm² |

410

| Example 4 – Specifications | | |
|---|---|---|
| Graded-Index Core | Start Δn | 0.0119 |
| | End Δn | 0.0024 |
| | Radius | 7.12 μm |
| | Alpha | 1.62 |
| Trench | Δn | -0.0038 |
| | Thickness | 5.32 μm |
| Guided Modes | | $LP_{01}, LP_{11}$ |
| Group Delay Difference between $LP_{01}$ and $LP_{11}$ | | < 0.001 ps/m across C-band |
| Calculated Effective Area $A_{eff}$ of $LP_{01}$ | | 65.40 μm² at 1550nm |
| Calculated Effective Area $A_{eff}$ of $LP_{11}$ | | 65.7 μm² |

| Example 6 – Specifications | | |
|---|---|---|
| Graded-Index Core | Start Δn | 0.0144 |
| | End Δn | 0 |
| | Radius | 8.4 μm |
| | Alpha | 1.97 |
| Shoulder | Δn | 0 |
| | Thickness | 1.16 μm |
| Trench | Δn | -0.011 |
| | Thickness | 3.16 μm |
| Guided Modes | | $LP_{01}$, $LP_{11}$, $LP_{02}$, and $LP_{21}$ |
| Group Delay Difference between $LP_{01}$, $LP_{11}$, $LP_{02}$, and $LP_{21}$ | | < 0.05 ps/m across C-band |

540

Two-Mode FMF (Graded-Index Core / Shoulder / Trench)

| | | Example 1.1 | Example 1.2 | Example 1.3 | Example 2 | Minimum | Maximum |
|---|---|---|---|---|---|---|---|
| Graded-Index Core | Start Δn | 0.0081 | 0.0073 | 0.0139 | 0.0104 | 0.0073 | 0.0139 |
| | End Δn | 0 | 0 | 0 | 0.0042 | 0 | 0.0042 |
| | Radius (μm) | 7.7 | 8.5 | 7.47 | 7.51 | 7.47 | 8.5 |
| | Alpha | 2 | 2.09 | 2.01 | 1.34 | 1.34 | 2.09 |
| Shoulder | Δn | 0 | 0 | 0 | 0 | 0 | 0 |
| | Thickness (μm) | 1.085 | 1.61 | 0.65 | 1 | 0.65 | 1.61 |
| | Inner Radius (μm) | 7.7 | 8.5 | 7.47 | 7.51 | 7.47 | 8.5 |
| | Outer Radius (μm) | 8.785 | 10.11 | 8.12 | 8.51 | 8.12 | 10.11 |
| Trench | Δn | -0.006 | -0.006 | -0.006 | -0.002 | -0.006 | -0.002 |
| | Thickness (μm) | 6.5 | 6 | 5 | 4.1 | 4.1 | 6.5 |
| | Inner Radius (μm) | 8.785 | 10.11 | 8.12 | 8.51 | 8.12 | 10.11 |
| | Outer Radius (μm) | 15.285 | 16.11 | 13.12 | 12.61 | 12.61 | 16.11 |
| Outer Cladding | Δn | 0 | 0 | 0 | 0 | 0 | 0 |
| | Thickness (μm) | 47.215 | 46.39 | 49.38 | 49.89 | 46.39 | 49.89 |
| | Inner Radius (μm) | 15.285 | 16.11 | 13.12 | 12.61 | 12.61 | 16.11 |
| | Outer Radius (μm) | 62.5 | 62.5 | 62.5 | 62.5 | 62.5 | 62.5 |
| Guided Modes | | LP01, LP11 | LP01, LP11 | LP01, LP11 | LP01, LP11 | | |
| Group Delay Difference Between Guided Modes (across C-Band) (ps/m) | | < 0.001 | < 0.001 | < 0.001 | < 0.002 | < 0.001 | < 0.002 |
| Calculated Effective Area $A_{eff}$ of $LP_{01}$ (μm$^2$) | | 80.85 | 94.76 | 59.62 | 77.01 | 59.62 | 94.76 |
| Calculated Effective Area $A_{eff}$ of $LP_{11}$ (μm$^2$) | | 80.5 | 94.9 | 59.8 | 77.4 | 59.8 | 94.9 |

FIG. 54

550
Two-Mode FMF (Graded-Index Core / Trench)

| | | Example 3 | Example 4 | Example 5 | Minimum | Maximum |
|---|---|---|---|---|---|---|
| Graded-Index Core | Start Δn | 0.0139 | 0.0119 | 0.0108 | 0.0108 | 0.0139 |
| | End Δn | 0.0022 | 0.0024 | 0.0034 | 0.0022 | 0.0034 |
| | Radius (μm) | 7.1 | 7.12 | 6.9 | 6.9 | 7.12 |
| | Alpha | 1.8 | 1.62 | 1 | 1 | 1.8 |
| Trench | Δn | -0.0037 | -0.0038 | -0.0041 | -0.0041 | -0.0037 |
| | Thickness (μm) | 5 | 5.32 | 5.58 | 5 | 5.58 |
| | Inner Radius (μm) | 7.1 | 7.12 | 6.9 | 6.9 | 7.12 |
| | Outer Radius (μm) | 12.1 | 12.44 | 12.48 | 12.1 | 12.48 |
| Outer Cladding | Δn | 0 | 0 | 0 | 0 | 0 |
| | Thickness (μm) | 50.4 | 50.06 | 50.02 | 50.02 | 50.4 |
| | Inner Radius (μm) | 12.1 | 12.44 | 12.48 | 12.1 | 12.48 |
| | Outer Radius (μm) | 62.5 | 62.5 | 62.5 | 62.5 | 62.5 |
| Guided Modes | | LP01, LP11 | LP01, LP11 | LP01, LP11 | | |
| Group Delay Difference Between Guided Modes (across C-Band) (ps/m) | | < 0.002 | < 0.001 | < 0.002 | < 0.001 | < 0.002 |
| Calculated Effective Area $A_{eff}$ of $LP_{01}$ (μm$^2$) | | 59.59 | 65.4 | 70.35 | 59.59 | 70.35 |
| Calculated Effective Area $A_{eff}$ of $LP_{11}$ (μm$^2$) | | 59.8 | 65.7 | 70.8 | 59.8 | 70.8 |

FIG. 55

560
Four-Mode FMF (Graded-Index Core / Shoulder / Trench)

| | | Example 6 | Example 7 |
|---|---|---|---|
| Graded-Index Core | Start Δn | 0.0144 | 0.00144 |
| | End Δn | 0 | 0 |
| | Radius (μm) | 8.4 | 8.91 |
| | Alpha | 1.97 | 1.97 |
| Shoulder | Δn | 0 | 0 |
| | Thickness (μm) | 1.16 | 0.558 |
| | Inner Radius (μm) | 8.4 | 8.91 |
| | Outer Radius (μm) | 9.56 | 9.468 |
| Trench | Δn | -0.011 | -0.006 |
| | Thickness (μm) | 3.16 | 3.906 |
| | Inner Radius (μm) | 9.56 | 9.468 |
| | Outer Radius (μm) | 12.72 | 13.374 |
| Outer Cladding | Δn | 0 | 0 |
| | Thickness (μm) | 49.78 | 49.126 |
| | Inner Radius (μm) | 12.72 | 13.374 |
| | Outer Radius (μm) | 62.5 | 62.5 |
| Guided Modes | | LP01, LP11, LP02, LP21 | LP01, LP11, LP02, LP21 |
| Group Delay Difference Between Guided Modes (across C-Band) (ps/m) | | < 0.05 | < 0.1 |

FIG. 56

570
Table: Effective Index Neff @1550nm

| | Column 1 | Column 2 | Column 3 | Column 4 | Column 5 | Column 6 | Column 7 | Column 8 |
|---|---|---|---|---|---|---|---|---|
| | LP01 Neff | LP11 Neff | LP02 Neff | LP21 Neff | LP01-LP11 Neff | LP11-LP02 Neff | Lowest Guided Mode Neff | Trench Volume (um^2*DN) |
| Example 1-1 | 0.0043 | 0.0010 | | | 0.0033 | | 0.0010 | -2.949 |
| Example 1-2 | 0.0041 | 0.0013 | | | 0.0028 | | 0.0013 | -2.9650 |
| Example 1-3 | 0.0086 | 0.0042 | | | 0.0044 | | 0.0042 | -2.0020 |
| Example 2 | 0.0061 | 0.0030 | | | 0.0031 | | 0.0030 | -0.5350 |
| Example 3 | 0.0085 | 0.0040 | | | 0.0044 | | 0.0040 | -1.1028 |
| Example 4 | 0.0068 | 0.0028 | | | 0.0040 | | 0.0028 | -1.2376 |
| Example 5 | 0.0052 | 0.0015 | | | 0.0037 | | 0.0015 | -1.3851 |
| Example 6 | 0.0103 | 0.0061 | 0.0020 | 0.0020 | 0.0041 | 0.0041 | 0.0020 | -0.7745 |
| Example 7 | 0.0105 | 0.0066 | 0.0027 | 0.0027 | 0.0039 | 0.0039 | 0.0027 | -0.5353 |

FIG. 57

STEP-INDEX FEW-MODE FIBER DESIGNS FOR SPATIAL MULTIPLEXING

CROSS REFERENCE TO RELATED APPLICATION

The present application claims the priority benefit of U.S. Provisional Patent Application Ser. No. 61/446,222, filed on Feb. 24, 2011, and U.S. Provisional Patent Application Ser. No. 61/531,842 filed on Sep. 7, 2011, both of which are owned by the assignee of the present application, and both of which are incorporated by reference herein in their entirety.

BACKGROUND OF THE INVENTION

1. Field of the Invention

The present invention relates generally to the field of fiber optics and in particular to improved few-mode fiber designs for spatial multiplexing.

2. Background Art

Data traffic over fiber optic networks continues to grow exponentially. In order to meet this demand, multiplexing techniques have been developed that allow a plurality of separate data streams to share the same optical fiber, thereby significantly increasing per-fiber traffic.

Current research and development in the optical fiber industry have focused on dense wavelength-division multiplexing (DWDM), which is a multiplexing technique, in which a plurality of data channels are assigned to respective wavelengths within an operating bandwidth. The data channels are combined onto the fundamental ($LP_{01}$) mode of a single-mode fiber for transmission, and are separated back into separate channels when they reach their destination.

In a DWDM-based transmission system, the total capacity within a given amplifier bandwidth is limited by spectral efficiency, which is a measure of how tightly separate wavelengths can be spaced for transmission purposes at a given data rate when ultimately limited by nonlinear effects in the fiber. Spectral efficiency can be increased using increasingly complex methods, such as the use of higher-order modulation schemes, but such methods have diminishing returns and the modest improvement cannot keep pace with the exponential growth of bandwidth demand. It is anticipated that, over the next 10 to 15 years, the spectral efficiency of DWDM in a single-mode fiber will approach its theoretical limit.

One promising approach for increasing per-fiber capacity is space division multiplexing (SDM), in which a plurality of data channels within a single optical fiber are provided by a respective plurality of fiber cores, or by a respective plurality of optical signal modes guided by the fiber. SDM-based techniques have the potential to significantly increase per-fiber transmission capacity beyond the limits imposed by non-linearity in DWDM-based systems.

Because of the fundamental differences between SDM and prior technologies, SDM has proven to be technologically challenging, requiring the development of new types of optical fibers and associated devices.

SUMMARY OF THE INVENTION

A few-mode optical fiber comprises a core surrounded by a cladding, the fiber having a refractive index profile that is configured to guide a spatially multiplexed optical signal along a length of the fiber. The cladding may include an outer cladding region and a down-doped trench or depressed cladding region positioned between the core and the outer cladding region. An alternate embodiment further includes a high-index guiding ring within the cladding, disposed between the core and the trench or depressed cladding region. The refractive index profile is structured to support a plurality of guided modes for carrying a respective plurality of spatially multiplexed transmission signals, while suppressing undesired guided modes.

According to an aspect of the invention, an optical fiber comprises a core and a cladding surrounding the core. The core and cladding have a step index profile that is structured to support propagation of a plurality of desired signal-carrying modes, while suppressing undesired modes. The cladding includes an outer cladding region having an outer radius $r_{cladding}$, a refractive index $n_{cladding}$, and an index difference $\Delta n_{cladding}=0$. The core has a radius $r_{core}$, a refractive index $n_{core}$, and an index difference $\Delta n_{core}$. The core and cladding are configured such that the undesired modes have respective effective indices that are close to or less than, the cladding index such that the undesired modes are leaky modes. The index spacing between the desired mode having the lowest effective index and the leaky mode with the highest effective index is sufficiently large so as to substantially prevent coupling therebetween.

Another aspect of the invention is directed to a few-mode fiber having a graded index-core that provides the described index spacing between modes propagating through the fiber.

A further aspect of the invention is directed to an optical fiber, comprising a plurality of individual core extending through a common cladding. Each individual core supports at least one local transverse spatial mode. The individual cores and surrounding cladding are structured to support propagation of plurality of desired signal-carrying modes, while suppressing undesired modes, thereby supporting the propagation of one or more spatially multiplexed signals. The core-to-core spacing of the fiber is configured to maintain an acceptably low level of mode-coupling between cores.

BRIEF DESCRIPTION OF THE DRAWINGS

FIG. 3 shows set of tables setting forth, in ps/km, the approximate limitations of allowable mean DGD with different numbers of taps, different target link lengths, and varying degrees of mode coupling for 30 and 60 Gbaud.

FIGS. 54-57 are a series of tables setting forth the specifications of the exemplary few-mode fibers illustrated in FIGS. 23-53.

DETAILED DESCRIPTION

Figures 1, 2:
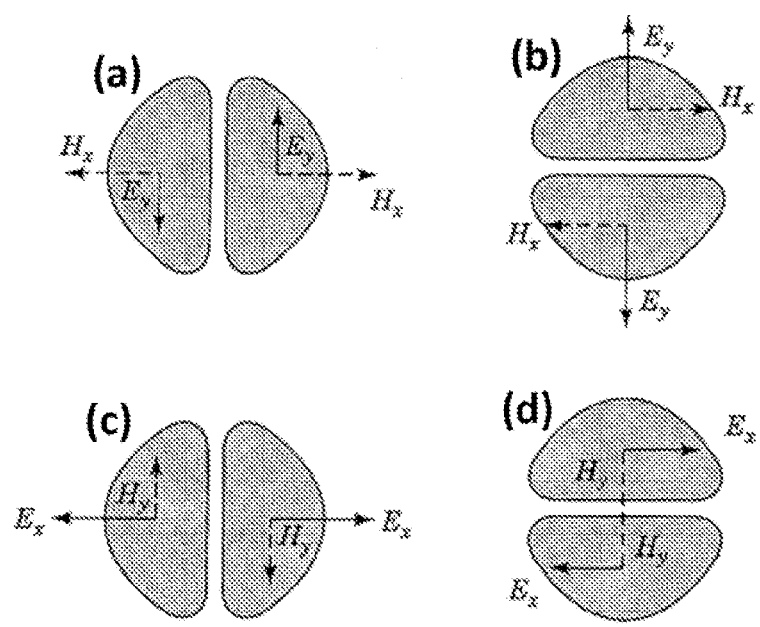
FIG. 1 is a series of diagrams illustrating four possible components (a)-(d) of the $LP_{11}$ mode, including polarization states.
FIG. 2 shows a pair of tables setting forth, in ps/km, the maximum allowable mean differential group delay, under certain assumptions, for a transmission over a hypothetical few-mode fiber.

Aspects of the present invention are directed to improved optical fiber designs and techniques that are suitable for use in space division multiplexing (SDM). In particular, the fibers and techniques described herein are suitable for mode-division multiplexing (MDM), in which a plurality of transverse modes guided by a fiber are used to provide a respective plurality of data transmission channels.

It is noted that the structures and techniques described herein may be combined with other data transmission techniques, including wavelength-division multiplexing (WDM). It is further noted that, while aspects of the invention are described herein with respect to exemplary fibers having one core, aspects of the invention may be suitably combined with multicore fiber (MCF) technologies to create fibers having a plurality of cores configured to support the transmission of a respective plurality of spatially multiplexed optical signals.

An MDM-suitable fiber must, of course, support propagation of the selected signal-carrying modes. In addition, a successful fiber must take a number of issues into account including, for example, wavelength-dependence of the waveguide; non-linearity of the medium; differential group delay (DGD) and differential mode attenuation (DMA); coupling of signal modes with other signal modes (i.e., crosstalk); coupling of signal modes with lossy undesired modes; and other issues discussed below.

Conventional multimode fibers (MMFs) are inadequate for MDM. A conventional MMF has hundreds of guided modes, each having a respective effective index. As shown for example in FIG. 21, discussed below, the effective indices of the guided modes in a standard MMF are closely spaced together. This close spacing results in an unacceptably high level of mode-coupling. Coupling between two or more desired modes used to carry separate transmission signals results in crosstalk. Coupling between desired modes and "leaky" or "lossy" modes results in significant signal loss. Conventional MMFs fail to address differential group delay (DGD), differential mode attenuation (DMA), and other issues discussed below.

The fibers described herein fall within a class of optical fibers generically referred to as "few-mode fibers" (FMFs), i.e., fibers that guide more than one transverse mode, but fewer transverse modes than conventional multimode fibers (MMFs), which typically support hundreds of guided modes and which are widely deployed in data communication links over hundreds of meters. Generally speaking, an FMF supports fewer than 100 guided modes. Depending on the particular application, an FMF may be designed to support 10-20 guided modes, or even fewer.

The FMFs described herein include fibers that guide, at least, the $LP_{01}$ and $LP_{11}$ modes, and fibers that guide, at least, the $LP_{01}$, $LP_{11}$, $LP_{11}$, and $LP_{21}$ modes. It will be appreciated that the structures and techniques described herein may be applied in the design of FMFs that guide a larger number of modes.

It is noted that the FMFs and related structures and techniques described herein are suitable for use within, at a minimum, the entire "C-band," i.e., 1530 nm to 1565 nm and iii some cases the S-, C-, and L-bands. Older few-mode designs are not suitable or readily adaptable for use across the C-band. Further, these older designs fail to take into account differential mode attenuation and other issues, discussed below, of crucial importance to the development of successful fiber designs for spatial multiplexing and similar applications.

For the purposes of the present discussion, unless explicitly stated otherwise, or unless otherwise required by context, the term "$LP_{l,m}$ mode" refers collectively to any or all of the individual configurations, degeneracies, and polarizations of that mode. For example, for a given propagation constant, in an ideal circular fiber, there are four degenerate $LP_{11}$ sub-modes, characterized by their respective angular configurations and polarizations. In some contexts, it is useful to characterize each of the $LP_{11}$ sub-modes, or superpositions thereof, as separate modes. However, in the context of the present description, it is not necessary to make this distinction. Thus, the term "$LP_{11}$ mode" refers to any or all of these four $LP_{11}$ sub-modes, or superpositions of those sub-modes. Following this convention, a few-mode fiber that guides the $LP_{01}$ and $LP_{11}$ modes is referred to as a "two-mode FMF," even though the fiber may be used for MDM over more than two modes (i.e., over the $LP_{01}$ and a plurality of $LP_{11}$ sub-modes). Similarly, a few-mode fiber that guides the $LP_{01}$, $LP_{11}$, $LP_{11}$, and $LP_{21}$ modes is referred to as a "four-mode" FMF.

Each of the described fibers herein comprises a core region surrounded by a cladding comprising a plurality of cladding regions. Depending upon the context, the refractive index of a given fiber region may be quantified in one or more of the following ways:

(1) The refractive index of a given fiber region at a given wavelength may be quantified using absolute units.

(2) The refractive index of a given fiber region may be quantified in relation to the refractive index of the outer cladding as an "absolute index difference" or "absolute delta" (Δn), which is obtained by subtracting the refractive index of the outer cladding region, in absolute units, from the refractive index of the given fiber region, also in absolute units. By definition, the outer cladding region has an absolute index difference Δn=0.

(3) The refractive index of a given fiber region may be quantified in relation to the refractive index of the outer cladding as a "percent relative index difference" or simply "delta" Δ, which is calculated as follows:

$$\Delta_{region} = \frac{n_{region}^2 - n_{clad}^2}{2 \cdot n_{region}^2} \cdot 100$$

Where the index difference $n_{region}-n_{clad}$ is relatively small, Δ may be approximated as follows:

$$\Delta_{region} \approx \frac{n_{region} - n_{clad}}{n_{region}} \cdot 100$$

By definition, the outer cladding region has a delta Δ=0. The present description is organized as follows:
1. Introduction
   1.1 Conceptual Framework
   1.2 Relationship between Mode-Coupling and DGD
2. Criteria for Fiber Suitable for Mode-Division Multiplexing
3. Types of Index Profile Designs
   3.1 Multicore
   3.2 Step-Index Profile—High-Index Guiding Ring
   3.3 Few-Mode Fiber with Step-index Core
      3.3.1 Depressed Cladding Designs
      3.3.2 Trench-Assisted Designs
   3.4 Step Index with Increased Core Radius
   3.5 Few-Mode Fiber with Graded-Index Core
      3.5.1 Quantification and Parameterization of FMF Designs
      3.5.2 Gradient-Index Design Considerations
      3.5.3 Gradient-Index Few-Mode Fiber Having Two LP Modes
      3.5.4 Gradient-Index Few-Mode Fiber Having Four LP Modes
      3.5.5 Summary of Examples
4. Conclusion

1. INTRODUCTION

1.1 Conceptual Framework

The conceptual framework for mode-division multiplexing is straightforward:

(1) a transmission fiber is provided that supports a plurality of guided modes;

(2) at the launch end of the transmission fiber, there is implemented a mode-selective launch of a plurality of data channels into N guided modes of the transmission fiber;

(3) at the receiving end of the transmission fiber, there is implemented a mode-selective detection of the N modes; and (4) following detection of the N modes, recovery techniques are used to extract data from the individual channels.

The implementation of this framework has proven to be technologically challenging for number of reasons. One significant issue is coupling between signal-carrying modes, both at discrete points and distributed along the length of the transmission fiber, which can lead to modal crosstalk. Other issues include differential group delay (DGD), i.e., the difference in the respective arrival times of the guided modes used for spatial multiplexing, and differential mode attenuation (DMA), i.e. the difference in respective losses of the guided modes used for spatial multiplexing. These issues are closely related in that significant mode coupling leads to the need for MIMO (multiple input, multiple output) or other techniques to recover the signals in the presence of crosstalk. Generally speaking, the use of such a technique typically imposes restrictions on the maximum allowable DGD and DMA for a fiber.

The problem of mode-coupling can be generally conceptualized using a hypothetical optical link in which there are transmitted a first signal (Signal 1) launched in a first guided mode (Mode 1) and a second signal (Signal 2) launched in a second guided mode (Mode 2).

Coupling between Mode 1 and Mode 2 will cause Signal 1 to be "copied," to some degree, onto Mode 2. Similarly, Signal 2 will be copied, to some degree, onto Mode 1. The degree of copying depends upon the strength of the coupling between Mode 1 and Mode 2. Thus, signals from a mode-selective detection of Mode 2 will also contain a fraction of power due to the Signal 1, and vice versa. This is commonly known as "crosstalk," and often is not desired.

Further, it is reasonable to assume that the transmission fiber will typically exhibit some amount of DGD between modes. Thus, there will be a difference between the propagation speeds of Mode 1 and Mode 2. Because of this difference in propagation speeds, the portion of Signal 1 propagating in Mode 1 will arrive at its respective mode detector at a time that is different from the arrival time at a respective mode detector of the corresponding portion of Signal 1 propagating in Mode 2. Signal 2 will be similarly affected.

Crosstalk between modes plus this difference in arrival time results in a performance penalty, measured in decibels (dB). Generally speaking, a penalty on the order of 1 dB is tolerable, while larger penalties may render transmission untenable.

The size of the penalty could be reduced by limiting the amount of mode-coupling. It might thus appear that one approach to designing a successful SDM transmission system would be to attempt to design fibers and connectivity structures having a level of mode-coupling low enough to result in a tolerable penalty (e.g., 1 dB). Such an approach might be feasible in some circumstances, such as shorter transmission distances, but is not likely to be a general solution, especially at longer transmission distances, as discussed and shown below.

To demonstrate the likely necessity of implementing crosstalk recovery techniques such as MIMO, it is assumed for the purposes of the present discussion that Mode 1 is the $LP_{01}$ mode, and Mode 2 is the $LP_{11}$ mode, which is actually a superposition of the more fundamental $TM_{01}$, $TE_{01}$, and $HE_{21}$ modes.

It can be further assumed for the sake of illustration, though possibly difficult in practice, that mode-coupling at connectors and splices is greatly minimized, or even eliminated. Therefore, crosstalk would be caused by distributed coupling exhibited by the fiber, i.e., coupling resulting from microbending and other random perturbations.

A fiber could be designed specifically to minimize, or eliminate, coupling between Mode 1 and Mode 2 (i.e., between the $LP_{01}$ and $LP_{11}$ modes), for example, by making the difference between their respective propagation constants large.

FIG. 1 is a series of diagrams illustrating four possible configurations (a)-(d) of the $LP_{11}$ mode, including polarization states. These configurations are degenerate (i.e., have the same propagation constants) in a perfectly axisymmetric fiber. Perturbations commonly present in the fiber due to imperfections, stress when deployed in a cable, and the like, will readily couple these degenerate sub-modes of $LP_{11}$, resulting in strong mixing even over a short length of fiber.

Therefore, mode-mixing inside a few-mode fiber will be intrinsic and strong at least among a subset of modes. Further, it is possible that cable stress and the necessary occurrence of splices every five to ten kilometers in an installed cable infrastructure will also induce significant mode coupling between the guided modes, regardless of all attempts to minimize distributed mode coupling amongst them.

Thus, it is necessary to implement a suitable algorithm, such as MIMO (multiple input, multiple output), capable of untangling the mode-coupling effects during propagation. By considering the requirements of such an algorithm, desirable attributes and profile configurations can be identified. Nevertheless, if it were possible to significantly reduce mode coupling between some modes or mode groups, then the complexity of the MIMO circuitry could be reduced by design of a suitable fiber and use of appropriate splicing or coupling techniques.

A MIMO-based system will typically include an equalization component to quantify and remove the mixing that has occurred during mode-multiplexed propagation. For example, an equalizer may employ a feed-forward architecture comprising a number of tap-and-delay lines with adaptable coefficients to quantify and remove any mode-mixing that has occurred during propagation. Such equalizers must have a number of taps that is sufficiently large to handle the maximum difference in signal propagation time between modes. That is, the number of taps depends on the number of symbols by which the different channels are delayed from one another in time. A MIMO scheme can be employed successfully to untangle crosstalk only if there is a sufficient number of taps to handle the maximum delay between signals. Therefore, the maximum allowable modal delay in a fiber link with MIMO signal recovery is the number of taps (N_taps) multiplied by the symbol period, which is equivalently N_taps/BaudRate. N_taps is the maximum number of adaptable taps that can be implemented by practical technology and may increase over time. (It will be appreciated that this analysis can be adapted to the case of fractionally-spaced taps in a straightforward manner.)

As of the present time, for communications at rates greater than 10 Gbps, the practical upper limit for the number of adaptive taps that can be accommodated by mixed-signal CMOS circuits is in the tens. This limit is expected to be higher in the future. In the present discussion, for the purposes of establishing desirable fiber properties, it is posited that a useful practical upper limit for the number of adaptive taps is a few thousand, for communications at rates in the tens of Gbaud. At 30 Gbaud, the maximum allowable delay would be ~330 ps for 10 taps, ~3,300 ps for 100 taps, and ~33,000 ps for 1,000 taps.

Let us now consider a hypothetical transmission over a few-mode optical fiber, where a population of manufactured fibers (in cables) are spliced together to form a link of length L, with splices occurring every five to ten kilometers. The distribution of manufactured fibers that are concatenated have a mean DGD, expressed as a DGD coefficient in ps/km. In the limit of low-mode coupling, delays accumulate linearly at the rate of the mean DGD coefficient. Thus, the maximum allowable mean DGD of the fiber is given by:

$$DGD\_coeff < N\_taps/(BaudRate*L),$$

in this limit.

FIG. 2 shows a pair of tables 21 and 22 that illustrate this value, in ps/km, for different numbers of adaptable taps and distances at 30 Gbaud and 60 Gbaud, respectively. These targets are exceedingly challenging for fiber design, and especially so for manufacturing. It will be shown below that inventive fibers can be designed with DGD as low as 1 ps/km across a wide wavelength band. However accounting for manufacturing error, such DGD values may not be achievable in production. Few mode fibers for mode-division multiplexing should have DGD less than 200 ps/km, and more preferably less than 100 ps/km, and even more preferably less than 60 ps/km, and most preferably less than 20 ps/km.

Mode-dependent loss, or differential mode attenuation, degrades the performance of a MIMO algorithm. In one theory, the degradation is dependent on the DMA over the entire end-to-end optical link. A 20 dB DMA results in loss of system capacity of ~20%. This 20 dB is equivalent to 0.02 dB/km of DMA for a 1000 km link, 0.05 dB/km for a 400 km link, and 0.1 dB/km for a 200 km link, and 0.2 dB/km over a 100 km link. Therefore it is important to limit DMA to <0.2 dB/km. It would be better to limit DMA to <0.1 dB/km, and better still to limit DMA to <0.05 dB/km, <0.02 dB/km, or an even smaller value. A DMA<0.01 dB/km would sacrifice only 5% of the system capacity over 1000 km.

It is important to note that the MIMO algorithms for removing crosstalk require mode-selective launch and detection, since the algorithms are attempting to recover the original state of the signal. The crosstalk in the originally launched signals may be preserved in the output of the algorithm. (Rather than launching selectively into the transverse modes of the waveguide, one can also launch into orthogonal superpositions of those modes.)

The best achievable performance of a MIMO algorithm is generally obtained with:
- a high degree of mode-selective launch and detection;
- uniform attenuation of modes during propagation (since the algorithms utilize unitary mathematical transformations); and
- delay differences between different modes, over desired transmission distances, that can be accommodated by a practical number of adaptive taps in a tap-delay line filter.

1.2 Relationship between Mode Coupling and Accumulated DGD

In the absence of mode coupling, DGD tends to accumulate in an optical fiber in a generally linear relationship with fiber length L. In the well-known phenomenon of polarization mode dispersion (PMD), it has been found that mode coupling can significantly reduce the rate of DGD accumulation, such that it increases in relationship to $\sqrt{L}$ rather than L.

It is therefore presented that fiber designs according to aspects of the present invention may display similar behavior. In particular, if each signal channel spends some fraction of time in each spatial mode, the differential delay between spatial modes will accumulate as $\sqrt{L}$. The behavior of few-mode fibers in this regime has not been extensively studied.

However, depending upon the mode-coupling effect on DGD accumulation, the requirements set forth in the tables shown in FIG. 2 may be reduced by as much as a factor of approximately $\sqrt{L}$.

FIG. 3 shows a set of tables 31 illustrating the approximate limitations of allowable mean DGD cases with different N_taps, different target link lengths, and varying degrees of mode coupling for 30 and 60 Gbaud. In analogy with PMD theory, the spread in delays $\Delta\tau_{rms}$ depends on the mean DGD and a coupling parameter $L_c$ (in km) by the following relation, $$\Delta\tau_{rms} \approx DGD\_coeff*sqrt(2*L_c*L).$$

where lesser values of L, indicate greater mode coupling. Then, the approximate maximum allowable mean DGD can be expressed as:

$$DGD\_coeff < \sim N\_taps/(BaudRate*sqrt(2*L_c*L)).$$

Comparing the values in FIG. 3 with those in FIG. 2, it can be seen that mode coupling beneficially relaxes the very strict required limits imposed on fiber mean DGD, by slowing the rate of accumulation of DGD in the link. Thus, if mode coupling achieves a desired rate of DGD accumulation, a few-mode fiber can be designed to have low target DGD, according to aspects of the present invention.

2. CRITERIA FOR FIBER SUITABLE FOR MODE-DIVISION MULTIPLEXING

There are a number of important criteria for fibers suitable for mode-division multiplexing, including the following design and manufacturing considerations:

Manufacturing Quality Control:

There should be low variability in transverse mode shapes over a manufacturing distribution to facilitate precise mode-selective launch and detection. This may require excellent control over fiber geometrical dimensions and optical properties.

Small Differential Mode Attenuation:

There should be small differential mode attenuation (DMA), while at the same time maintaining an acceptably low level of microbending and macrobending losses when the fiber is in a deployed condition, such as a cable.

Small Differential Group Delay:

Signals propagating in a multimode fiber accumulate timing skew due to the different group velocities of guided modes. If the DGD is too great, it becomes difficult for a receiver to recover the signals, requiring higher cost, greater power consumption, etc. to develop an efficient receiver. Thus, it is desirable to have a small DGD between any pair of guided transverse modes. The allowable level of DGD depends on the degree of mode coupling and system requirements, such as link length and the strength of signal processing.

Effective Mode Area and Nonlinearity:

Effective mode area considerations are somewhat similar to those dictating the design of conventional single-mode fibers. That is, small mode area typically limits system performance. However, each signal in a multiplexed system experiences some mode coupling, and thus, displays an effective area over the fiber length that is different from the effective area for any of the individual transverse modes. Each signal will see a variety of effective areas. Thus, the "effective $A_{eff}$," is affected by the modal cross-talk:

It is generally desirable in FMF designs for the effective areas of all low-loss modes to be relatively large. Alternatively, desirable fiber designs have a large average effective area for the ensemble of low-loss modes.

It is generally desirable for FMF fibers to display low nonlinearity. In a number of contexts, including significant crosstalk, propagation over long distances, or the like, each channel will see a nonlinearity that is inversely proportional to this average effective area.

Controlling the Loss of Undesired Modes:

Propagation in modes other than those intended for signal propagation (herein generally referred to as "undesired modes") may degrade performance of a link by facilitating leakage of light out of the set of desired signal modes or causing multi-path interference when the undesired mode does not attenuate completely between splices. Undesired modes may have mode effective indices above the outer cladding and be considered lossy guided modes, or they may have mode effective indices below the outer cladding and propagate transiently as leaky modes. Such modes may facilitate the leakage of optical energy out of the fiber when guided modes readily couple to them, contributing to higher DMA. It is a goal of few-moded fiber design that undesired modes be effectively cut off by having sufficiently high loss over short distances in the wavelength range of interest.

More advanced cladding structures can provide selective resonant suppression of unwanted modes, as is well known in the art. Cladding structures such as rings or additional waveguides can provide index matched coupling and facilitate leakage of unwanted modes.

Effective-Index Matching:

The difference between the effective group indices, or equivalently the propagation constants, of the signal modes influences the amount of crosstalk or power transfer between modes.

As mentioned above, if power transfer between modes occurs many times within a transmission length, i.e., strong mode coupling, each signal tends to see the average of the group velocity of the several modes, and so timing skew between multiplexed signals is reduced.

Power transfer within groups of modes, but not from one group to another, may be favorable in certain MIMO schemes or other demultiplexing schemes. This may reduce the burden of digital crosstalk equalization or facilitate optical add-drop of those signals propagating in a group of modes. For example, conventional graded-index fibers experience greater crosstalk within nearly-degenerate groups of modes than between groups. Similarly, a fiber having a composite core consisting of multiple few-mode cores may experience large coupling between the modes of each the same core, but relatively little coupling between modes of different cores.

Dispersion:

Dispersion can be controlled using techniques known in the art. Generally speaking, it is desirable for the modes to have similar dispersions, effective areas, and non-linear coefficients, so that non-linear propagation impairments do not accumulate too differently across modes. For coherent transport with highest spectral efficiency, it is desirable to maintain chromatic dispersion and effective areas as high as or higher than that of standard single-mode fiber, i.e., ~17 ps/nm/km and ~83 $\mu m^2$, respectively. However smaller effective areas or lower dispersions may be traded off for other desirable benefits in some cases.

3. TYPES OF INDEX PROFILE DESIGNS

Several types of fiber geometry and index profile design may lead to favorable properties. These include the following approaches, each of which is discussed separately below:
   3.1 Multicore
   3.2 Step-Index Profile with High-Index Guiding Ring
   3.3 Few-Mode Fiber with Step-index Core
   3.4 Step-Index with Increased Core Radius
   3.5 Few-Mode Fiber with Graded-Index Core

3.1 Multicore

Figure 4:
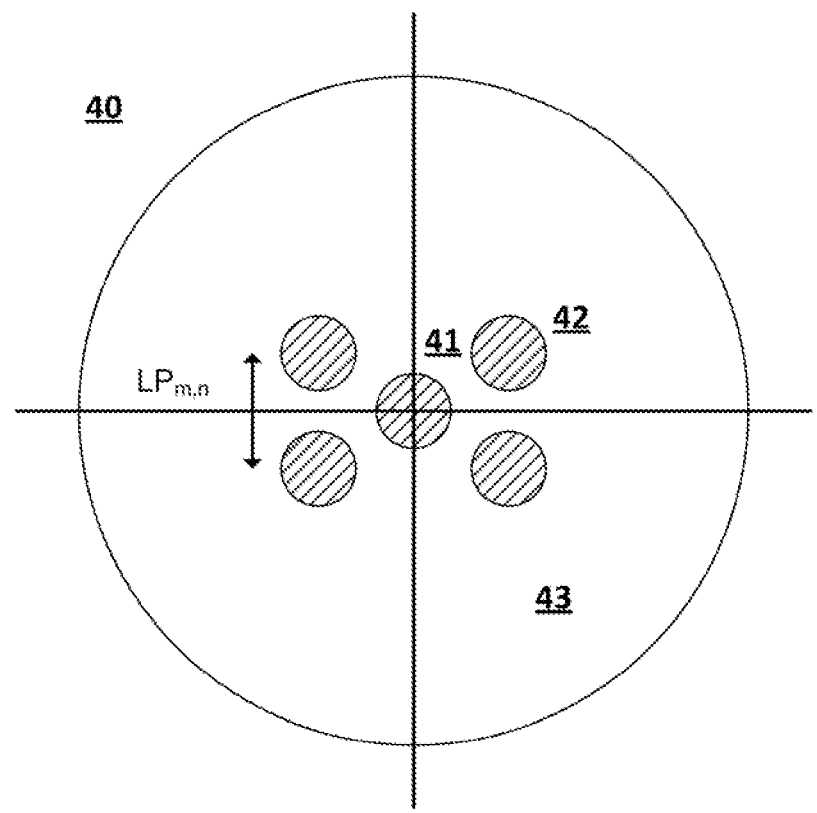
FIG. 4 shows a cross section diagram of an exemplary fiber according to an aspect of the invention comprising a multi-core structure.

FIG. 4 shows a cross section diagram of an exemplary fiber 40 comprising a multicore structure.

In fiber 40, a core region comprises a plurality of individual cores 41a-e extending through a common cladding 42, wherein the cores each support one or more local transverse spatial modes. The individual cores may be configured to support single-mode or multimode transmission, and may have a step index or a graded index. In addition, the individual cores and surrounding cladding may be configured to incorporate some or all of the few-mode fiber structures described herein in the context of single-core few-mode fibers.

The cores 41a-e are configured to support spatial multiplexing. For example, it is possible to apply structures and techniques described herein to create a multicore fiber comprising a plurality of cores, each of which supports a respective spatially multiplexed signal. In a further example, the plurality of individual cores is configured to form a composite core having transverse modes that are superpositions of the transverse modes of the individual cores. The transverse modes of the composite core can then be used for mode multiplexing.

The group index of the local spatial modes can be matched or tuned post-fabrication so that the timing skew of signals propagating in different modes can be reduced. The level of coupling between cores can be controlled through the respective core spacings $L_{m,n}$ (i.e., the center-to-center spacing between core m and core n). Because crosstalk (or energy transfer) accumulates as a function of length, the core spacings $L_{m,n}$ will be one factor that determines the length of fiber required to reach a given level of crosstalk. Bending, twisting and other perturbations will also influence crosstalk between cores.

Other structures and techniques described herein may be used to maintain acceptably low levels of mode coupling, differential group delay, and differential mode attenuation.

3.2 Step-Index Profile—High-Index Guiding Ring

Figure 5:
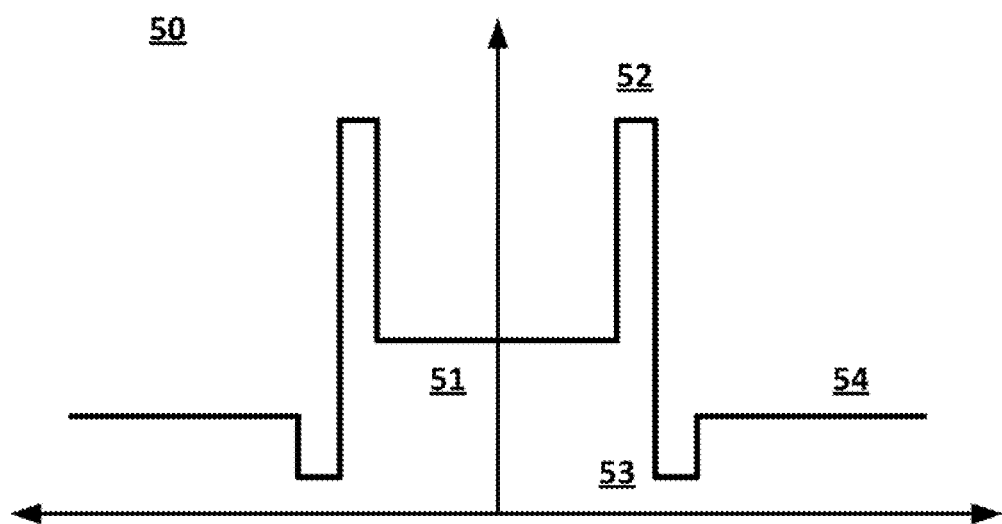
FIG. 5 shows a refractive index profile of a fiber with a high-index guiding ring according to a further aspect of the invention.

FIG. 5 shows a refractive index profile 50 of a fiber according to a further aspect of the invention. The fiber comprises a core 51, a high-index guiding ring 52, an optional depressed-index trench 53, and an outer cladding 54. The high-index guiding ring 52 has a radial thickness t and radius R. The effective group index mismatch between the first few guided modes will be small if t/R is small. If the effective group index mismatch is sufficiently small, these first few guided will then mix rapidly along the fiber to minimize the group delay between signals as well as promote low differential attenuation. Trench 53 may be included to control loss of signal modes and leakage of unwanted modes. Additional cladding waveguide structures (e.g., a second ring) may further be included to facilitate suppression of unwanted modes.

One benefit of the family of designs represented by FIG. 5 relates to the spatial overlap of the modes. In conventional step index or graded index designs, the guided modes sit rather uniformly within the core, resulting in a high degree of spatial overlap of the several modes. Because optical intensity causes a change in refractive index, this overlap of modes can exacerbate nonlinear impairments.

For example, the signal power of a first mode will induce a slight change in refractive index in the spatial region where that mode resides. This change in refractive index can alter the propagation of other modes which also reside at least partially in that same region. This form of cross-mode modulation can be detrimental, especially where the signals are amplitude-modulated. In such cases, there is benefit to spatially separating the modes.

In the exemplary design shown FIG. 5, the fundamental $LP_{01}$ mode sits essentially centered in the profile, while higher-order modes are "pulled" to the periphery of the core, thereby reducing overlap.

3.3 Few-Mode Fiber with Step-Index Core

Generally speaking, a "step-index" fiber is characterized by a refractive index profile in which a central core region is surrounded by a cladding region. The core region usually has a maximum refractive index value at the fiber axis or center, however a central index dip is sometimes present in the vicinity of the fiber axis. The index of refraction of the core region usually decreases to the minimum value at the outer radius of core region. The radial variation of the index of refraction of the central core region of a step index fiber can often be approximated by a power law with relatively large value of the exponent, $\alpha$, typically $\geq 10$. High bandwidth multimode fiber typically is characterized by a refractive index profile in which the core region has a parabolic shape, i.e. has an alpha parameter approximately equal to 2. Fibers fabricated with state of the art manufacturing techniques often deviate from the idealized power law index profile. In this case, the parameters of a power law function fitted to the actual index, e.g., the alpha parameter, provide a useful means to characterize the fabricated index profile.

It will be readily apparent to one skilled in the art that raising the core index of a step index, standard fiber supports additional guided modes; however the mode effective areas become undesirably small, degrading non-linear performance.

It is also apparent that enlarging the core radius of a step index, standard fiber supports additional guided modes with large $A_{eff}$, but that this approach would tend to increase bending losses and exacerbate problems with DMA.

It is also well-known to one skilled in the art that depressed claddings and trenches can be added to fibers, with proper adjustments to core parameters, to improve bending losses while keeping effective areas larger.

However, we are not aware of any recognition by others that it is possible to build a fiber with two LP modes with low differential group delay (in particular, low differential group delay across a wide wavelength range), large $A_{err}$ and low bending losses leading to low DMA, suitable for mode-multiplexed transmission as described above, by selectively combining these design features.

Accordingly, the inventors herein have designed depressed cladding and core-shelf-trench fibers that effectively propagate only the $LP_{01}$ and $LP_{11}$ modes, which have large effective areas, with desirably small DGDs across the C-band, while maximizing the effective index of the $LP_{11}$ mode in order to minimize DMA.

Figure 6:
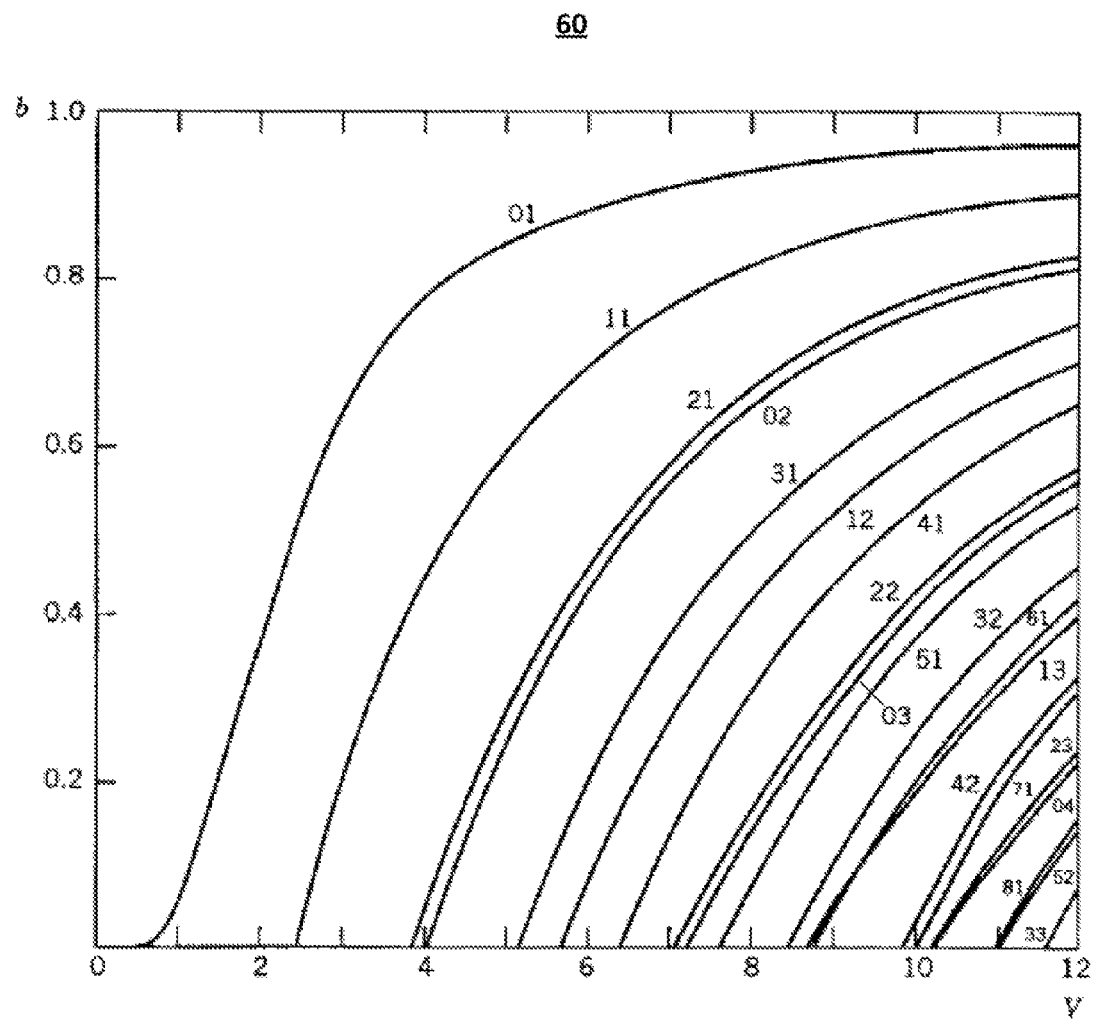
FIG. 6 shows plots of calculated behaviors of step-index optical fibers, known in the prior art.

FIG. 6 is a well-known plot 60 of the calculated behavior of step-index optical fibers, showing a normalized mode effective index h on the y-axis vs. normalized frequency, or V number, on the x-axis, where $$b \approx [(\beta/k_0) - n_{clad}]/[n_{core} - n_{clad}]$$

and $$V = (2\pi a/\lambda)\mathrm{sqrt}(n_{core}^2 - n_{clad}^2)$$

where $k_0$ is $2\pi/\lambda$, a is the radius.

$n_{core}$ is the core index, and $n_{clad}$ is the cladding index of a step index fiber.

At approximately V=4 to 4.5, the $LP_{01}$ and $LP_{11}$ modes have high effective indices, indicating that the modes are well-guided, while the normalized effective indices of the $LP_{11}$ and $LP_{21}$ modes are very low, implying that these two modes are highly lossy and effectively cutoff. This suggests that coupling between well-guided and highly lossy modes will be small. We have searched the space of step-index profiles with depressed and trench-assisted inner claddings to determine and design previously unknown fibers with desirable combinations of properties for MDM.

Exemplary fibers with effective areas similar to that of a standard single mode fiber (approx. 80 to 85 $\mu m^2$) as well as ultra large effective area fiber (approx. 150 $\mu m^2$) are shown. An experimental realization of the depressed cladding profile design with $A_{eff} \approx 150$ $\mu m^2$ is shown herein.

3.3.1 Depressed Cladding Designs

Depressed cladding fiber designs are well known in the prior art, enabling larger effective area fiber designs to control bending losses and maintain single-mode transmission by keeping the effective cutoff wavelength low. Compared to a step index fiber, a depressed cladding fiber has an additional annular cladding region between a core region and an outer cladding region, where the depressed cladding region begins at an outer boundary of the core, and has an index of refraction less than the respective refractive indices of the core region and outer cladding region. Typically, the width or thickness of the depressed cladding region is at least 3 to 4 times the core radius but less than 8 to 10 times the core radius. A depressed cladding fiber profile with normalized frequency V~5 was adjusted to stabilize the $LP_{11}$ mode, effectively cutoff the $LP_{21}$ and $LP_{11}$ modes, and minimize and equalize the modal delays to <60 ps/km across the C-band.

Figures 7A, 7B:
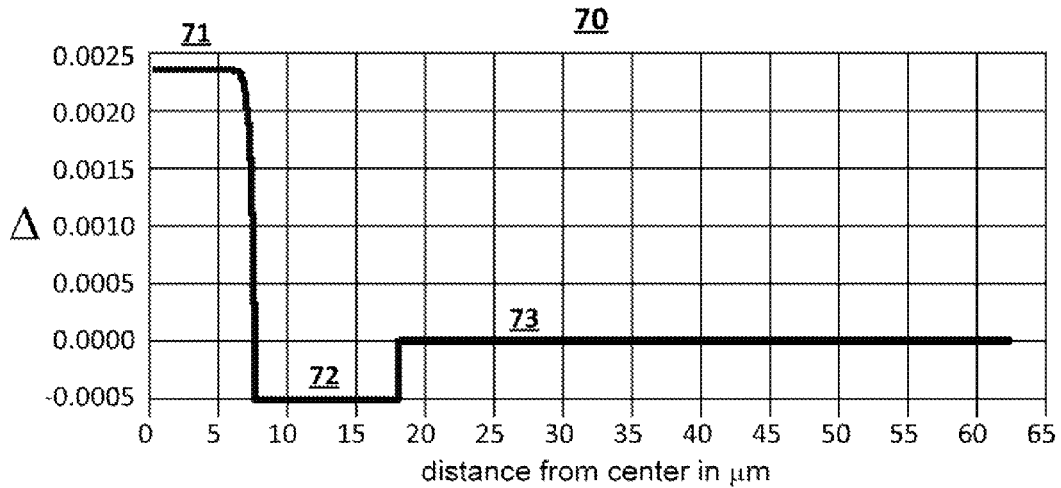
FIG. 7A is a profile design of an exemplary fiber according to an aspect of the invention.
FIG. 7B sets forth a pair of tables showing design parameters and calculated properties of the exemplary fiber of FIG. 7A.

FIG. 7A is a profile design 70 of an exemplary fiber according to an aspect of the invention. The fiber includes a core 71, a trench 72, and an outer cladding 73.

FIG. 7B sets forth a pair of tables 701 and 702 showing the fiber's design parameters and calculated properties. In table 701, fiber radius is in $\mu m$, while delta is the unitless percentage relative index difference ($\Delta$) discussed above. All units of index and effective index are also expressed using delta.

As shown in profile design 70 and table 701:
the core 71 (region #1 in table 701) has
  an outer radius of 7.375 μm,
  a relative percentage index difference Δ=0.0024, and
  an alpha parameter α=25;
the trench 72 (region #2 plus region #3 in table 701) has
  an inner radius of 7.375 μm,
  a width of 10.5 μm,
  an outer radius of 17.875 μm.
  and a Δ=−0.0050;
the outer cladding 73 (region #4) has
  an inner radius of 17.875 μm,
  a width of 44.625 μm.
  an outer radius of 62.5 μm,
  and a Δ=0 (by definition).
As shown in table 702, the fiber supports the $LP_{01}$ and $LP_{11}$ modes and exhibits the following characteristics:
  $LP_{01}$ effective area $A_{eff}$=148 μm$^2$,
  $LP_{01}$ effective area $A_{eff}$=148 μm$^2$,
  DGD (@1550 nm)=45 ps/km,
  $LP_{01}$ effective index=0.00196,
  $LP_{11}$ effective index=0.00015.
In an experimental realization of the fiber, a core body was fabricated using a vapor axial deposition (VAD) technique, with a $GeO_2$-doped core and F-doped inner cladding. The core body then was overclad with a silica tube and drawn into a fiber having a diameter 125 μm.

Figure 8:
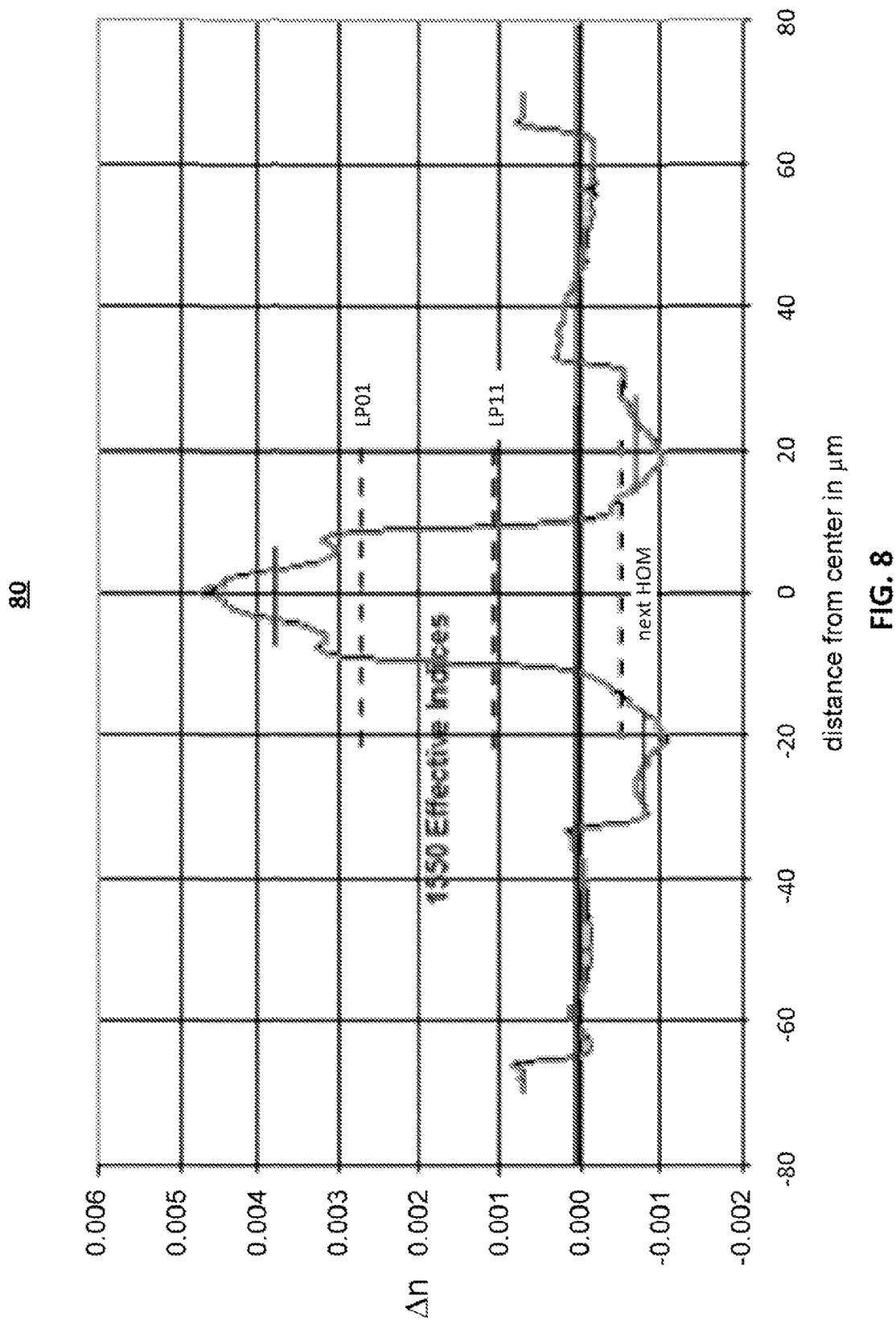
FIG. 8 is a graph showing a measured index profile in absolute delta of a two-moded fiber, and also, shown in broken lines, calculated effective indices of the $LP_{01}$, the $LP_{11}$ mode, and, below the cladding level, a next higher-order LP mode.

FIG. 8 is a graph 80 showing the measured index profile in absolute delta of a two-mode fiber incorporating the FIG. 7 design profile 70. In addition, FIG. 8 shows in broken lines the calculated effective indices of the $LP_{01}$, $LP_{11}$, and a next higher-order LP mode (below the cladding level, i.e., Δn<0). In FIG. 8, units are in absolute Delta n, rather than relative Delta. A loss of 0.205 dB/km was obtained at 1550 nm, and the effective areas were calculated from the measured fiber profile to be 155 μm$^2$ for $LP_{01}$ and 160 μm$^2$ for $LP_{11}$.

Figure 9:
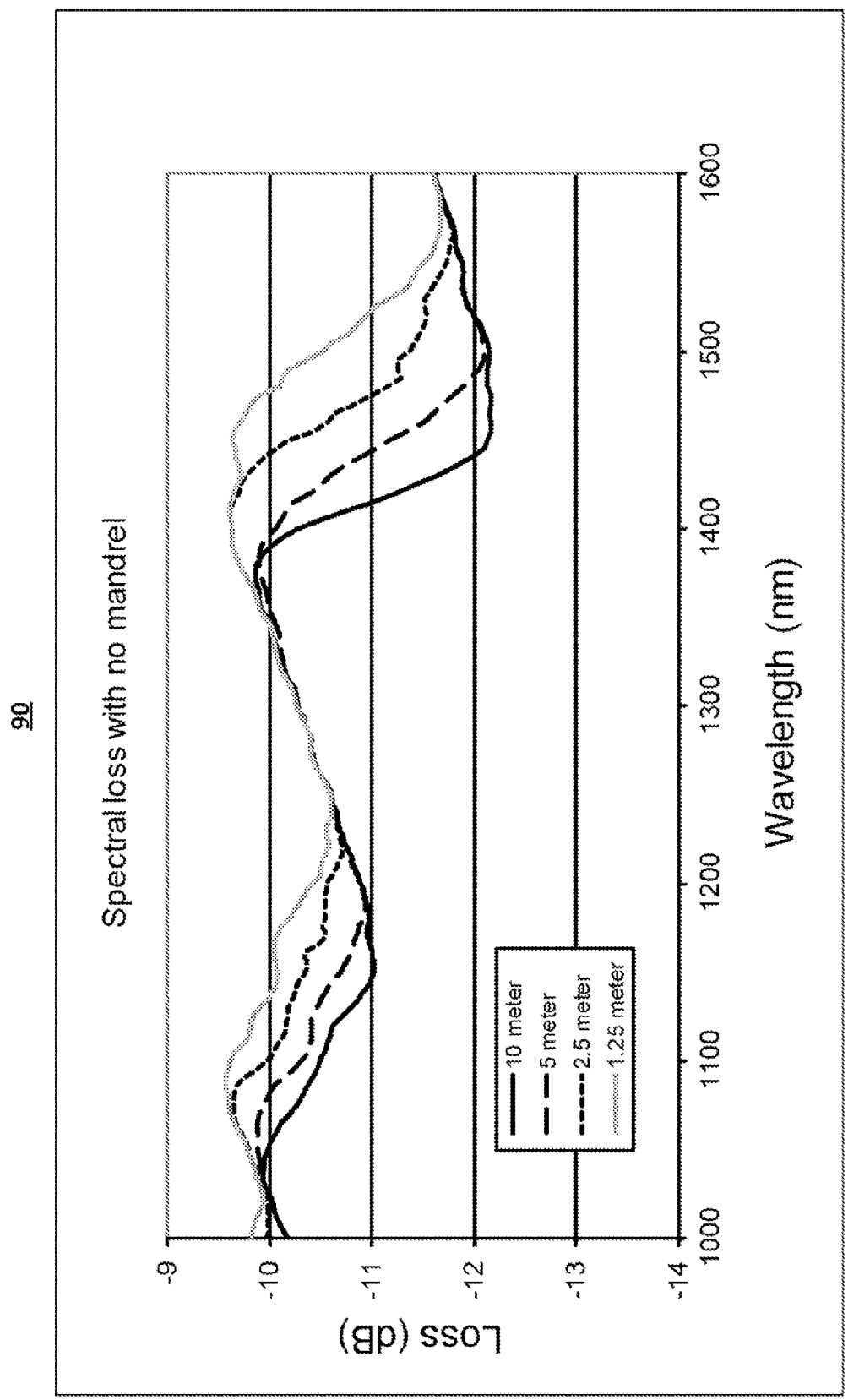
FIG. 9 is a graph comparing the spectral loss curves for the next-higher mode beyond $LP_{11}$ in straight pieces of an experimental two-moded fiber having respective lengths of 1.25 m, 2.5 m, 5 m, and 10 m.

FIG. 9 shows a graph 90 comparing the spectral loss curves for the next-higher mode beyond $LP_{11}$ in straight pieces of the two-mode fiber of FIG. 8, having respective lengths of 1.25 m, 2.5 m. 5 m, and 10 m. As shown in graph 90, the depicted next higher LP mode propagates with high loss between 1400 nm and 1550 nm in straight sections of the two-mode fiber, indicating that this chosen design effectively guides the desired modes but not undesired modes.

Figure 10:
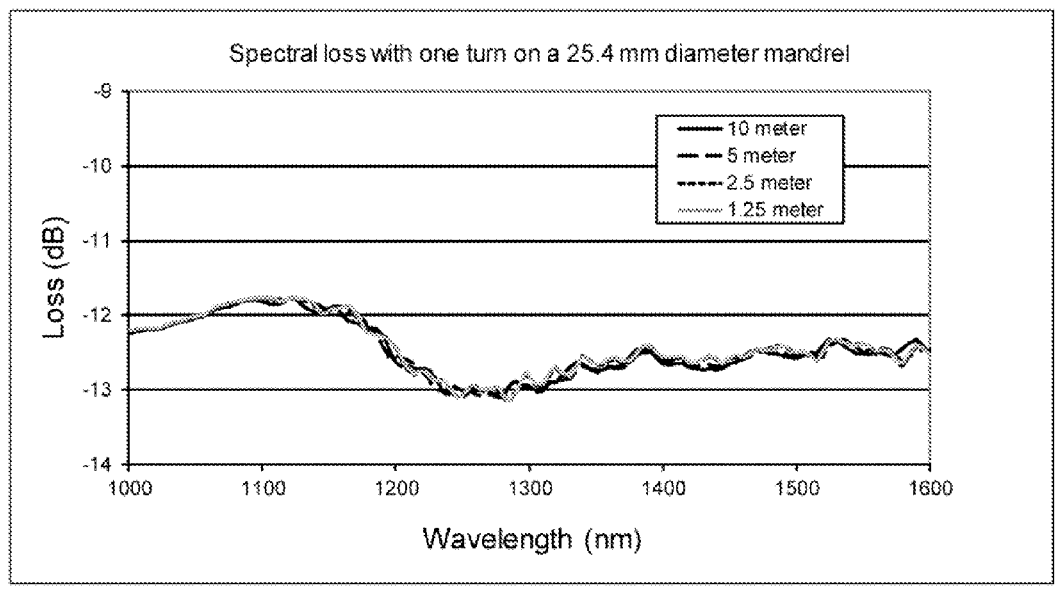
FIG. 10 is a graph comparing the spectral loss curves of FIG. 9 after the addition of a 25.4 mm diameter loop.

FIG. 10 is a graph 100 comparing the spectral loss curves of FIG. 9 after the addition of a 25.4 mm diameter loop (mandrel). As shown in graph 100, the addition of a 25.4 mm mandrel completely suppresses the additional LP mode, rendering the fiber effectively two-moded down to 1200 nm.

Figure 11:
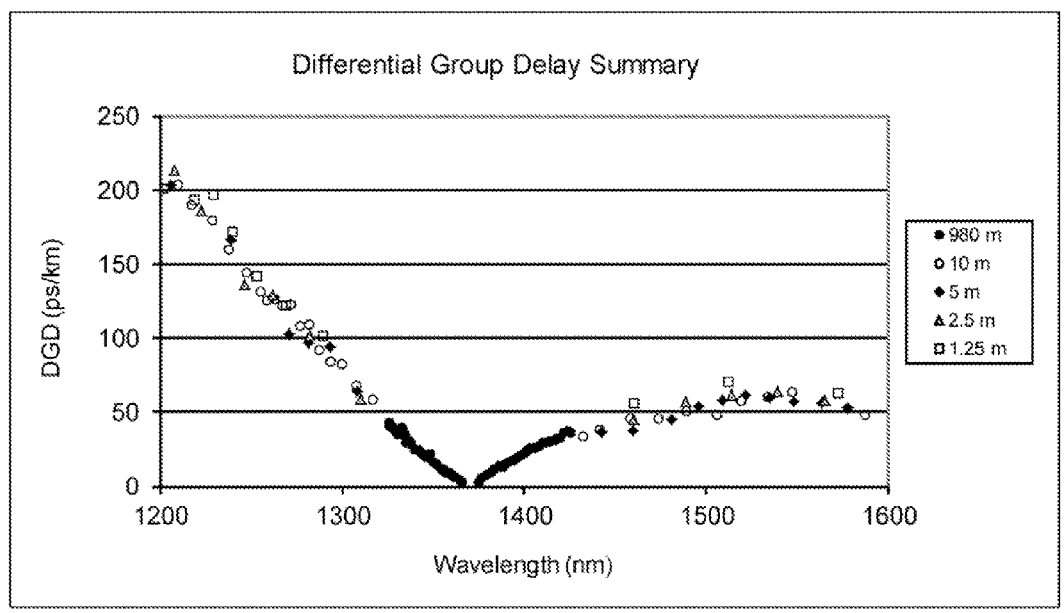
FIG. 11 is a graph illustrating results of an interferometric measurement, showing the maximum group delay difference between the $LP_{01}$ and $LP_{11}$ modes was approximately 0.06 ps/m or 60 ps/km, across the C-band.

FIG. 11 is a graph 110 illustrating the results of an interferometric measurement, showing that the maximum group delay difference between the $LP_{01}$ and $LP_{11}$ modes was approximately 0.06 ps/m or 60 ps/km, across the S-, C- and L-bands.

The measured losses for $LP_{01}$ and $LP_{11}$ are 0.205 dB/km for the realized prototype described in FIGS. 8-11, with a measured DMA of not more than 0.02 dB/km (limited by variability in the mode selective launch and detection optics). In order to minimize differential mode attenuation in a two-mode fiber guiding the $LP_{01}$ and $LP_{11}$ modes, it is important to maintain a high effective index for the $LP_{11}$ mode, while still keeping the $LP_{11}$ and $LP_{21}$ modes effectively cutoff. The difference between the effective indices of the $LP_{11}$ and the next higher order mode (HOM) (which should by design be highly lossy, with effective index below the outer cladding index) ought to be as large as possible to minimize microbending loss of $LP_{11}$. The effective index of $LP_{11}$ should also be as high as possible above the depressed cladding index 72 or 122 to reduce macrobending of $LP_{11}$ for small radius bends.

For the fabricated fiber in FIG. 8, the difference between the $LP_{11}$ effective index and that of the next HOM (below the outer cladding index) is about 0.001 in units of Δ and 0.0015 in units of Δn. For the designs in FIGS. 7A and 12A, the next higher order mode has an effective index below that of the depressed cladding 72 and 122 and does not propagate at all, even as a leaky mode. For those cases, the effective indices for $LP_{11}$ are 0.00065 and 0.001, respectively, in units of Δ, above the depressed cladding 72 and 122, or 0.00095 and 0.0015, respectively, in units of Δn. For depressed cladding, two mode fibers, the difference in effective indices between $LP_{11}$ and the next HOM should be greater than 0.0009 in Δn for good DMA and preferably greater than 0.00125 in Δn for better DMA.

This fiber shown in FIG. 8 was drawn with a known spinning process that promotes mode-mixing in order to reducing fiber PMD and that also beneficially promotes mode coupling in few-mode fibers. Based on limited measured data, the mode coupling length $L_c$ in this fiber may be 7 km to 10 km. For a 1,000 km link, this level of mode coupling would reduce the accumulated DGD from 60,000 ps in the linear limit to approximately 7.100 ps to 8,500 ps in the strongly mixed limit.

3.3.2 Trench-Assisted Designs

A second general category of fibers with an additional structure in the index of refraction profile, when compared to step-index fibers, is the trench-assisted fiber design.

The trench assisted fiber includes an annular region of depressed index within the cladding region. However, unlike a depressed cladding design, the inner boundary of the depressed index region does not start at the outer boundary of the core region, but instead, is disposed at some distance from core boundary, within the cladding.

Accordingly, surrounding the core of a trench assisted fiber is an inner cladding region comprising a shelf region. Thus, the trench is disposed between this shelf region and the outer cladding. The shelf region may have an index that matches the outer cladding, but, in general, its index falls between that of the core and the more deeply doped trench. As a general principle, trench-assisted fiber profiles give more degrees of freedom for controlling macrobending loss than depressed clad profiles, as well as some benefit for microbending loss (i.e. by providing additional confinement for the optical field).

Figures 12A, 12B:
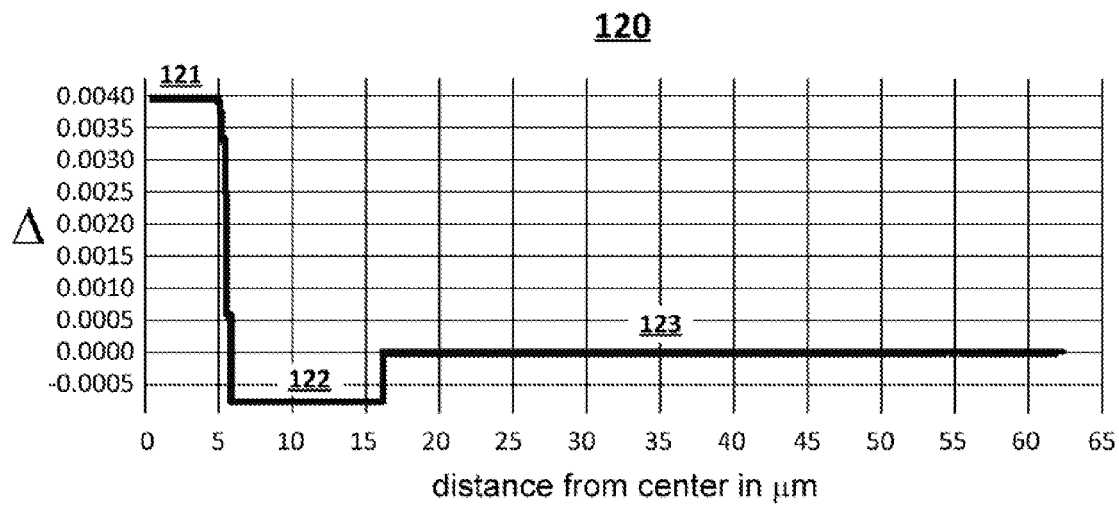
FIGS. 12A-B depict a refractive index profile of a depressed cladding, step index, two-moded fiber having an effective area close to that of a standard single-mode fiber, and tables showing the fiber's design parameters and calculated properties.

FIG. 12A is a refractive index profile of a step-index two-mode fiber design 120 having an effective area close to that of standard single-mode fiber. Fiber design 120 comprises a raised-index core 121, a depressed cladding region 122 and an outer cladding 123. FIG. 12B sets forth a pair of tables 1201 and 1202 showing the fiber's design parameters and calculated properties.

As shown in profile design 120 and table 1201:
the core 121 (region #1 in table 1201) has
  an outer radius of 5.675 μm,
  a relative percentage index different Δ=0.004, and
  an alpha parameter α=25;
the depressed cladding region 122 (regions #2 and #3 in table 701) has
  an inner radius of 5.675 μm,
  a width of 5.5 μm,
  an outer radius of 16.175 μm,
  and a Δ=−0.0080;

the outer cladding 73 (region #4) has
an inner radius of 16.175 µm,
a width of 46.325 µm,
an outer radius of 62.5 µm,
and a Δ=0 (by definition).

As shown in table 702, the fiber supports the $LP_{01}$ and $LP_{11}$ modes and exhibits the following characteristics:
$LP_{01}$ effective area $A_{\mathit{eff}}$=148 µm$^2$,
$LP_{01}$ effective area $A_{\mathit{eff}}$=148 µm$^2$,
DGD (@1550 nm)=45 ps/km,
$LP_{01}$ effective index=0.00196,
$LP_{11}$ effective index=0.00015.

Figures 13A, 13B:
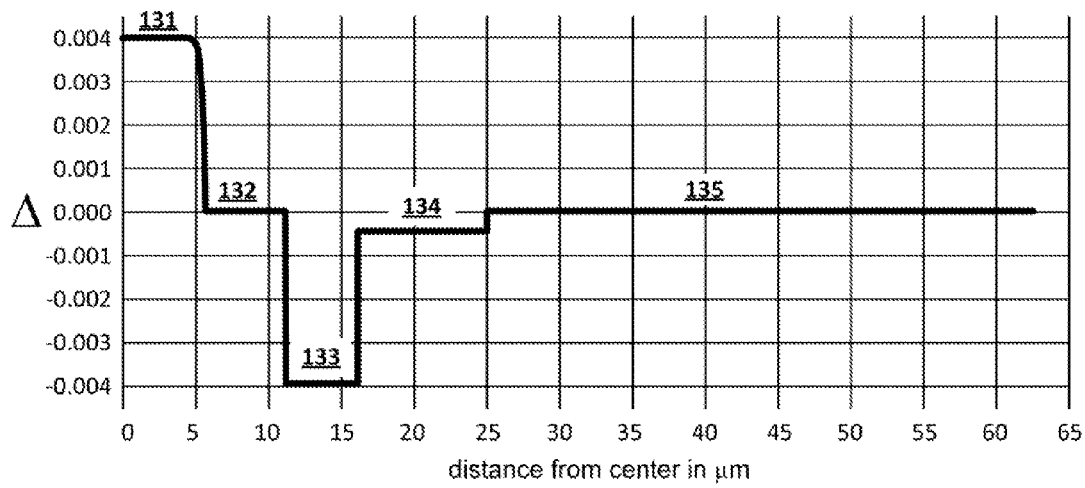
FIGS. 13A-B show a trench-assisted profile of a few-mode fiber having mode effective areas similar to those of a standard single-mode fiber, and tables showing the fiber's design parameters and calculated properties.

FIG. 13A shows a refractive index profile of a trench-assisted two-mode fiber design 130 having mode effective areas near that of standard single-mode fiber. Fiber design 130 comprises a raised-index core 131, a shelf region 132, a deep inner trench 133, a shallow outer trench 134, and an outer cladding 135. FIG. 13B sets forth a pair of tables 1301 and 1302 showing the fiber's design parameters and calculated properties.

As shown in profile design 130 and table 1301:
the core 131 (region #1 in table 1301) has
an outer radius of 5.559 µm,
a relative percentage index different Δ=0.004, and
an alpha parameter α=25;
the shelf 132 (region #2 in table 1301) has
an inner radius of 5.559 µm,
a width of 5.5 µm,
an outer radius of 11.059 µm,
and a Δ=0.0;
the inner trench 133 (region #3 in table 1301) has
an inner radius of 11.059 µm,
a width of 5 µm,
an outer radius of 16.059 µm.
and a Δ=−0.004;
the outer trench 134 (region #4 in table 1301) has
an inner radius of 16.059 µm,
a width of 9 µm.
an outer radius of 25.059 µm,
and a Δ=−0.0005;
the outer cladding 135 (region #5 in table 1301) has
an inner radius of 25.059 µm,
a width of 37.4 µm,
an outer radius of 62.5 µm,
and a Δ=0 (by definition).

As shown in table 1302, the fiber supports the $LP_{01}$ and $LP_{11}$ modes and exhibits the following characteristics:
$LP_{01}$ effective area $A_{\mathit{eff}}$=92 µm$^2$,
$LP_{01}$ effective area $A_{\mathit{eff}}$=90 µm$^2$,
DGD (@1550 nm)=51 ps/km,
$LP_{01}$ effective index=0.00336,
$LP_{11}$ effective index=0.00042.

Figures 14A, 14B:
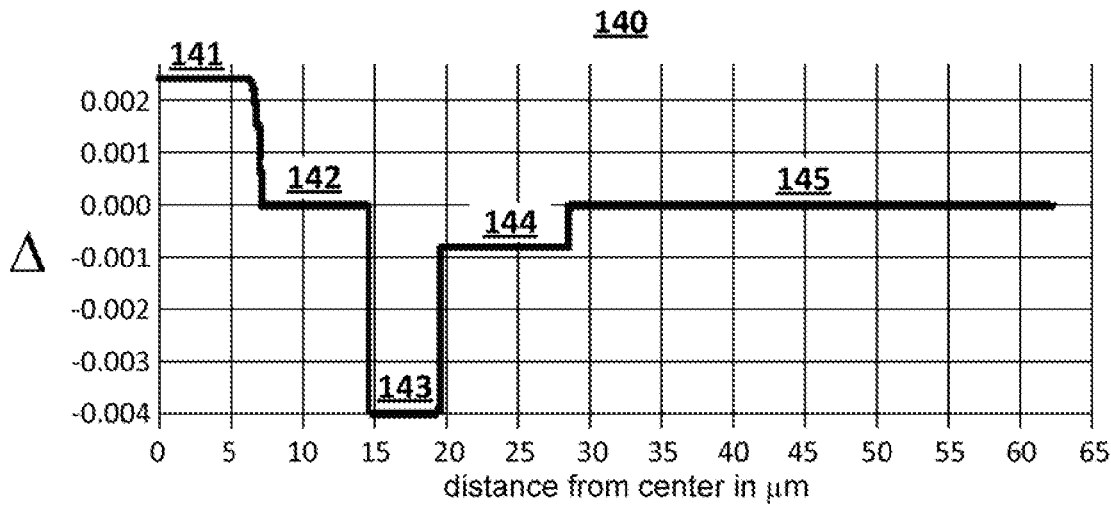
FIGS. 14A-B show a trench-assisted profile for a two-moded fiber having ultra-large mode effective areas, and tables showing the fiber's design parameters and calculated properties.

FIG. 14A shows a refractive index profile of a trench-assisted two-mode fiber design 140 having ultra-large mode effective areas. Fiber design 140 comprises a raised-index core 141, a shelf region 142, a deep inner trench 143, a shallow outer trench 144, and an outer cladding 145. FIG. 14B sets forth a pair of tables 1401 and 1402 showing the fiber's design parameters and calculated properties.

As shown in profile design 140 and table 1401:
the core 141 (region #1 in table 1401) has
an outer radius of 7.0 µm,
a relative percentage index different Δ=0.0025, and
an alpha parameter α=25;
the shelf 142 (region #2 in table 1401) has
an inner radius of 7.0 µm,
a width of 7.5 µm,
an outer radius of 14.5 µm,
and a Δ=0.0;
the inner trench 143 (region #3 in table 1401) has
an inner radius of 14.5 µm,
a width of 5 µm,
an outer radius of 19.5 µm.
and a Δ=−0.004;
the outer trench 144 (region #4 in table 1401) has
an inner radius of 19.5 µm,
a width of 9 µm,
an outer radius of 28.5 µm,
and a Δ=−0.0008;
the outer cladding 145 (region #5 in table 1401) has
an inner radius of 28.5 µm,
a width of 34.0 µm,
an outer radius of 62.5 µm,
and a Δ=0 (by definition).

As shown in table 1402, the fiber supports the $LP_{01}$ and $LP_{11}$ modes and exhibits the following characteristics:
$LP_{01}$ effective area $A_{\mathit{eff}}$=146 µm$^2$,
$LP_{01}$ effective area $A_{\mathit{eff}}$=144 µm$^2$,
DGD (@1550 nm)=36 ps/km,
$LP_{01}$ effective index=0.00205.
$LP_{11}$ effective index=0.00023.

The macrobend loss sensitivity of 32 mm bending of the depressed cladding design shown in FIGS. 12A and 12B is 2.4 times greater than that of the trench assisted design shown in FIGS. 14A and 14B even though the $A_{\mathit{eff}}$'s of the trench assisted design are more than 65% larger than those of the depressed cladding design.

The next higher order modes for the designs in FIGS. 13A and 14A are 0.0016 and 0.0011 in Δ, respectively, below the outer cladding in effective index. The spacings in effective index between the $LP_{11}$ and next HOM for these two cases are then, respectively, 0.002 and 0.00135 in Δ, or 0.0029 and 0.0019 in Δn. Similar to the depressed cladding case, good DMA will be obtained for effective index differences between $LP_{11}$ and the next HOM of >0.0009 and more preferably >0.00125 and most preferably >0.0018, all in Δn.

3.4 Step Index with Increased Core Radius

It is noted that, in addition to being suitable for MDM, the fibers and techniques described in this section are also useful in systems using only the fundamental mode. These fibers and techniques offer the advantage of an increased effective area compared to conventional single mode fiber designs. Such fibers might be especially advantageous for system based on coherent detection and digital signal processing (DSP), where key fiber parameters include low attenuation and large effective area. In those applications, the higher-order modes may be "stripped" from the transmitted light, leaving the $LP_{01}$ mode.

According to an aspect of the invention, the step index profile of a standard transmission fiber is used as the starting point. In a series of simulations, the core radius is increased, while keeping the core index the same. This approach has the advantage that the effective area of the $LP_{01}$ mode is increased without any additional increase in loss.

However, as the core radius is increased, the $LP_{01}$ mode gets further confined (i.e., less light traveling in the $LP_{01}$ mode leaks into the cladding). A further optimization could therefore be obtained by decreasing the core index as the core radius is increased in order to achieve a confinement of the $LP_{01}$ mode that is comparable to that of a fiber having a smaller core radius. Further benefits of decreasing the core index include decreased attenuation and a decreased number of guided modes. Thus, a decrease in core index may play a significant role is moving from a multimode fiber design to a few-mode design.

A series of simulations was performed on a super-large effective area (SLA) fiber preform, in which the core radius is increased by decreasing the cross sectional area (CSA) of the cladding tube, while maintaining a constant fiber diameter.

Figure 15A:
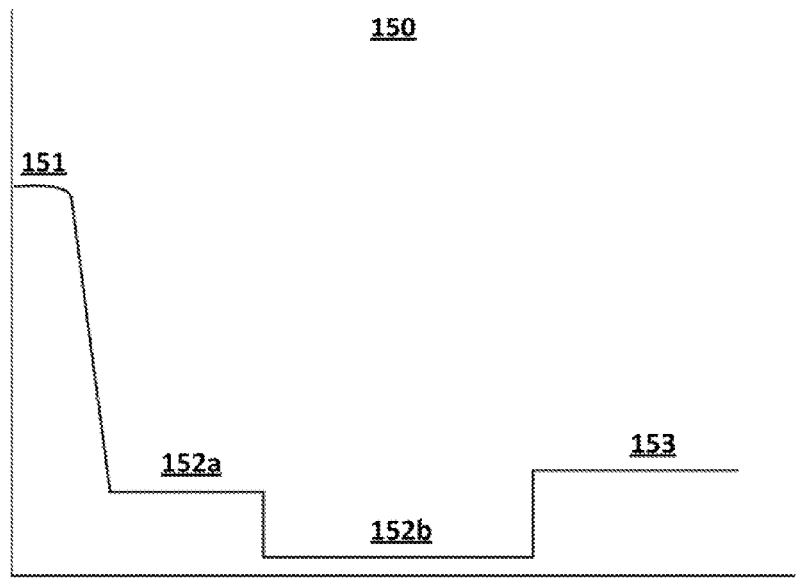
FIG. 15 shows a graph illustrating refractive index profiles of simulated few-mode fiber designs, where the physical cross-sectional areas of the cladding tubes are, respectively, 2850 μm², 1100 μm², and 500 μm².
Figure 15B:
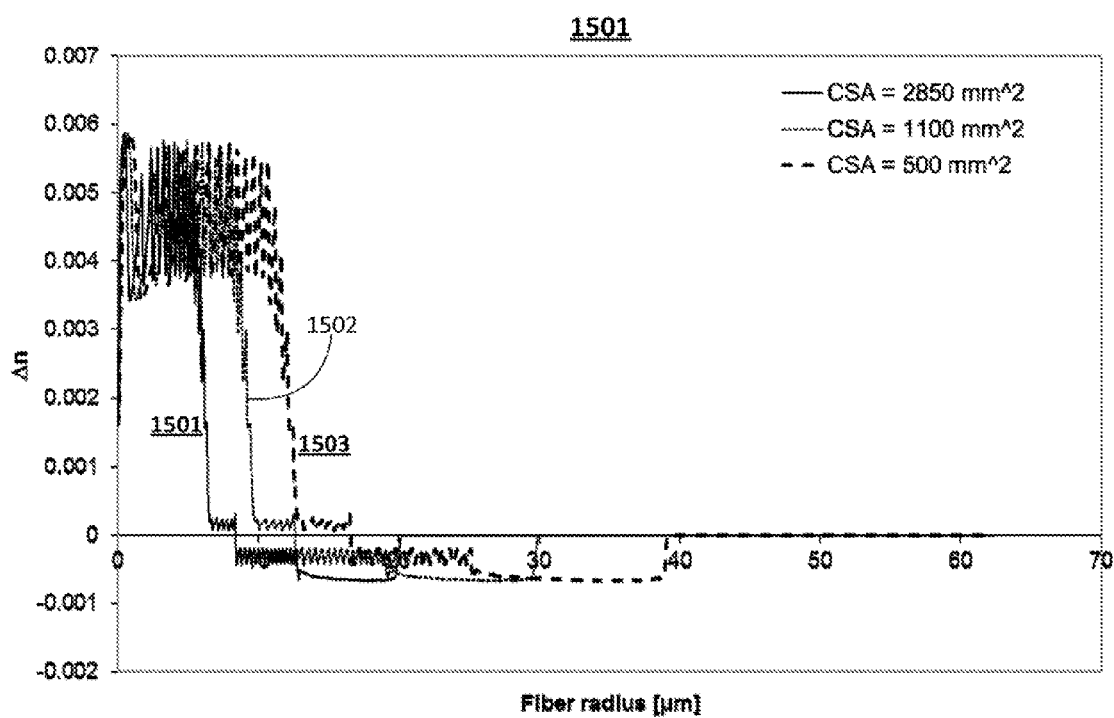

FIG. 15A shows a generic profile design 150 for an SLA fiber. It includes a raised index core 151, a two-step trench 152a and 152b, and an outer cladding 153. FIG. 15B shows a graph 1500, in which traces 1501-1503 illustrate the refractive index profiles of the simulated fiber designs, where the CSAs of the cladding tubes are, respectively, 2850 mm$^2$, 1100 mm$^2$, and 500 mm$^2$. In the simulated fiber, these cladding tube diameters correspond respectively to core radii of approximately 6 μm, 9 μm, and 12 μm, with respective trench outer radii of approximately 20 μm, 30 μm, and 39 μm.

Figure 16A:
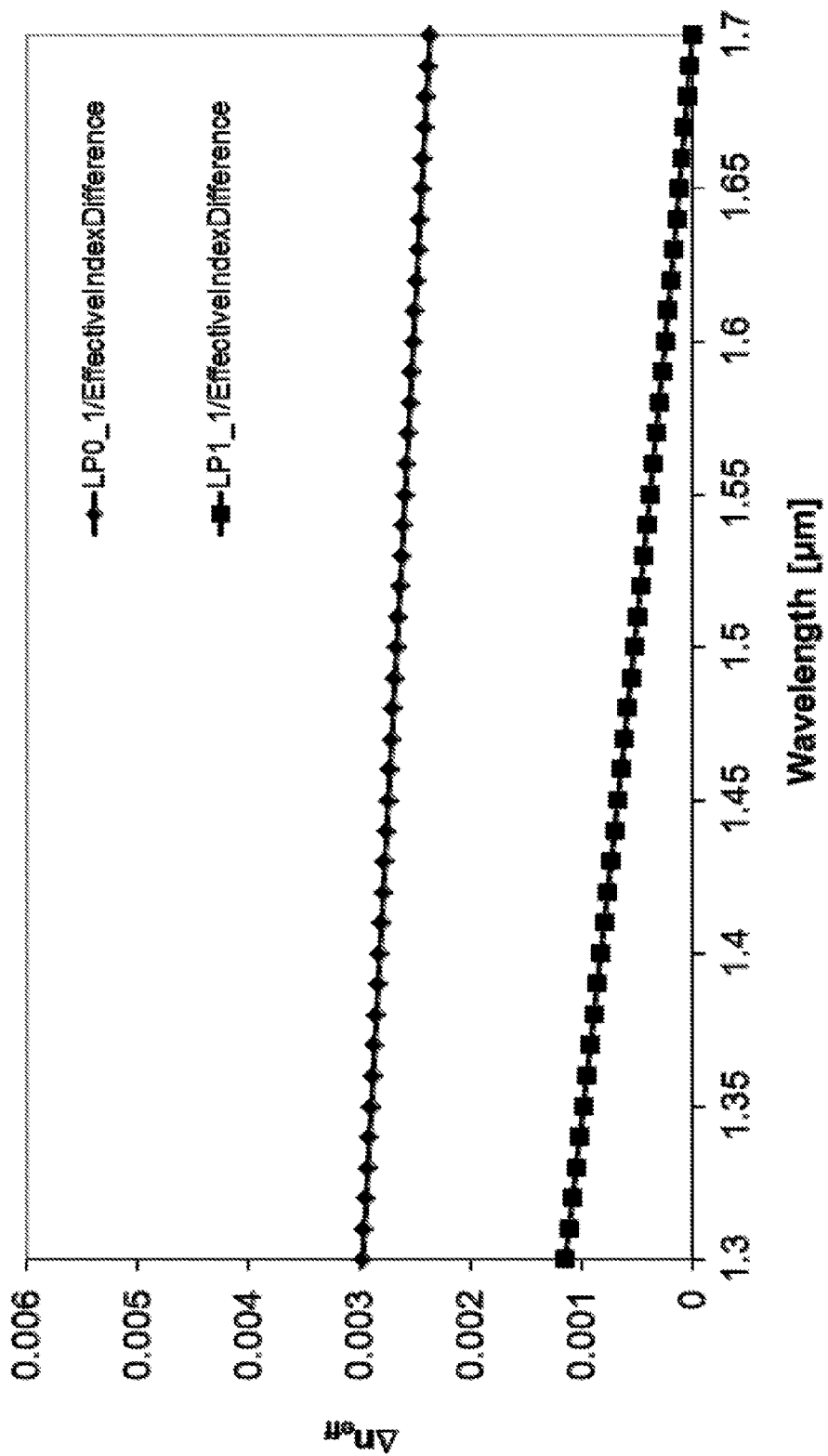
FIGS. 16A-16C show a series of graphs, in which there are illustrated, for the three fiber designs depicted in FIG. 15, the calculated effective index difference for the following guided modes: $LP_{01}$, $LP_{11}$, $L_{11}$, $LP_{12}$, and $LP_{21}$.
Figure 16B:
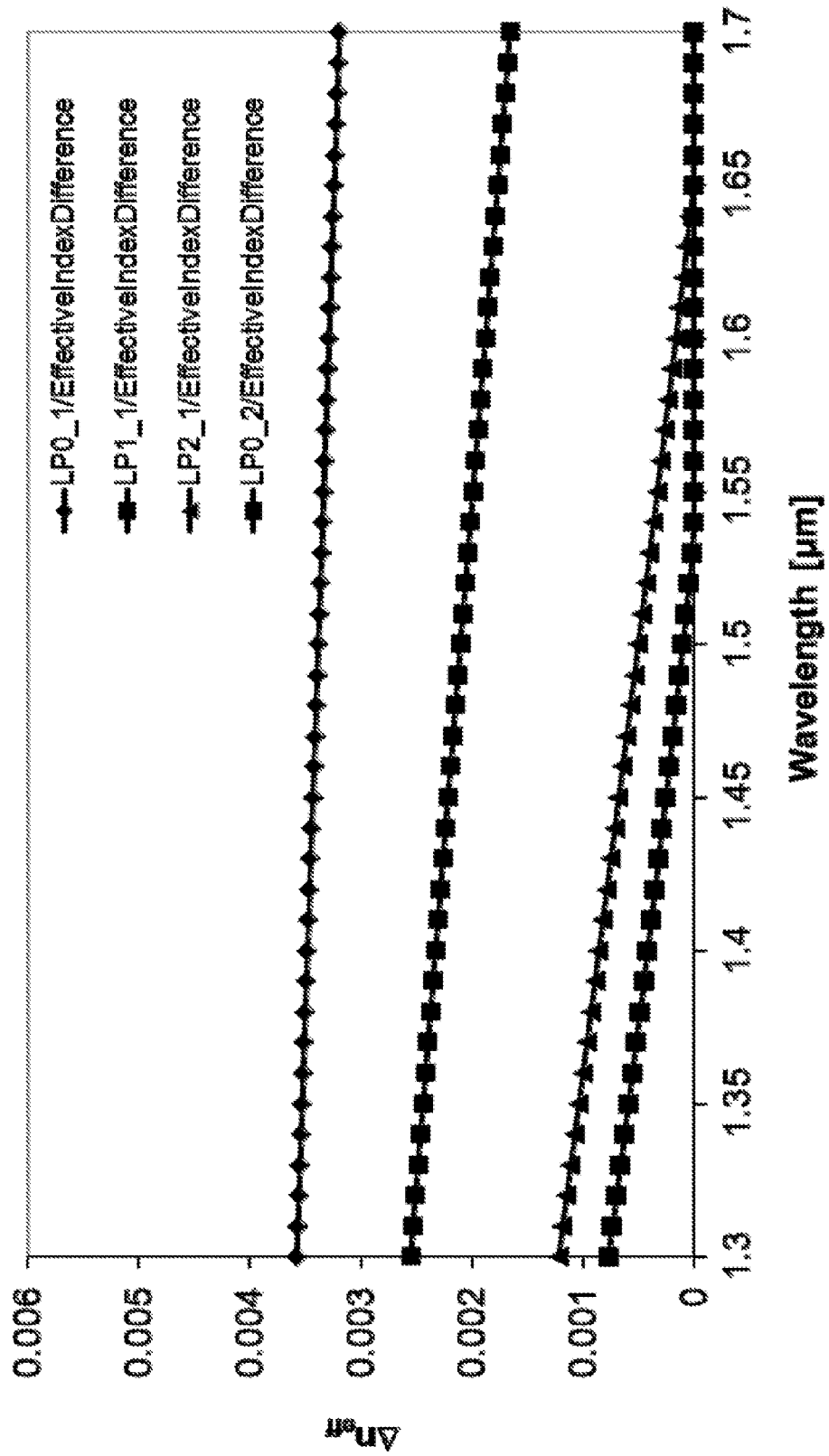
Figure 16C:
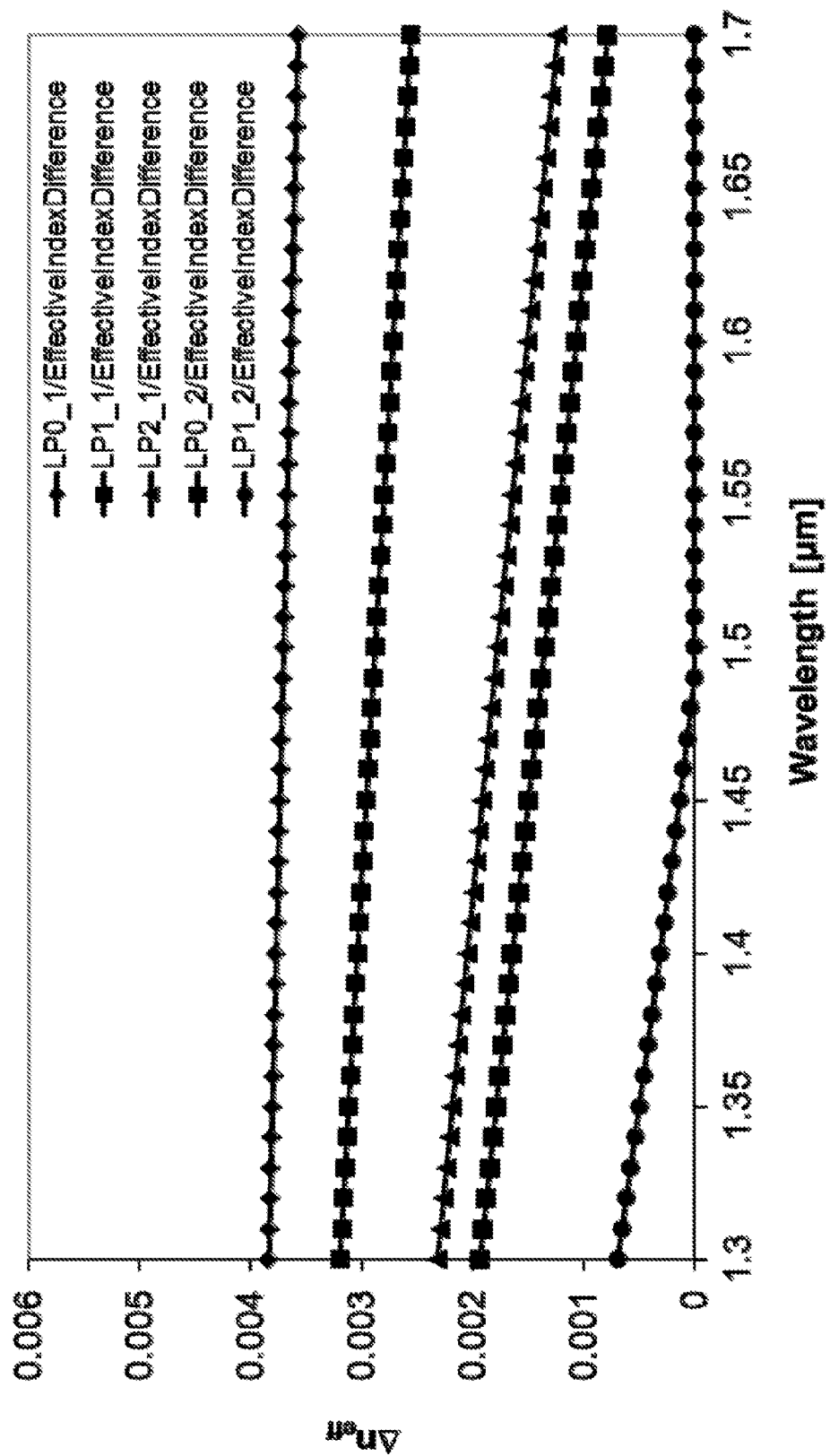

FIGS. 16A-16C are a series of graphs 161-163, in which there are illustrated, for the three designs depicted in FIG. 15, the calculated effective index difference for the following guided modes: $LP_{01}$, $LP_{11}$, $LP_{11}$, $LP_{12}$, and $LP_{21}$.

Graphs 161-163 show that more modes get guided as the CSA of the cladding tube decreases and as the core radius increases. It will also be seen that, as previously stated, the effective index of the fundamental ($LP_{10}$) mode is increased as the core radius increases.

Figure 17A:
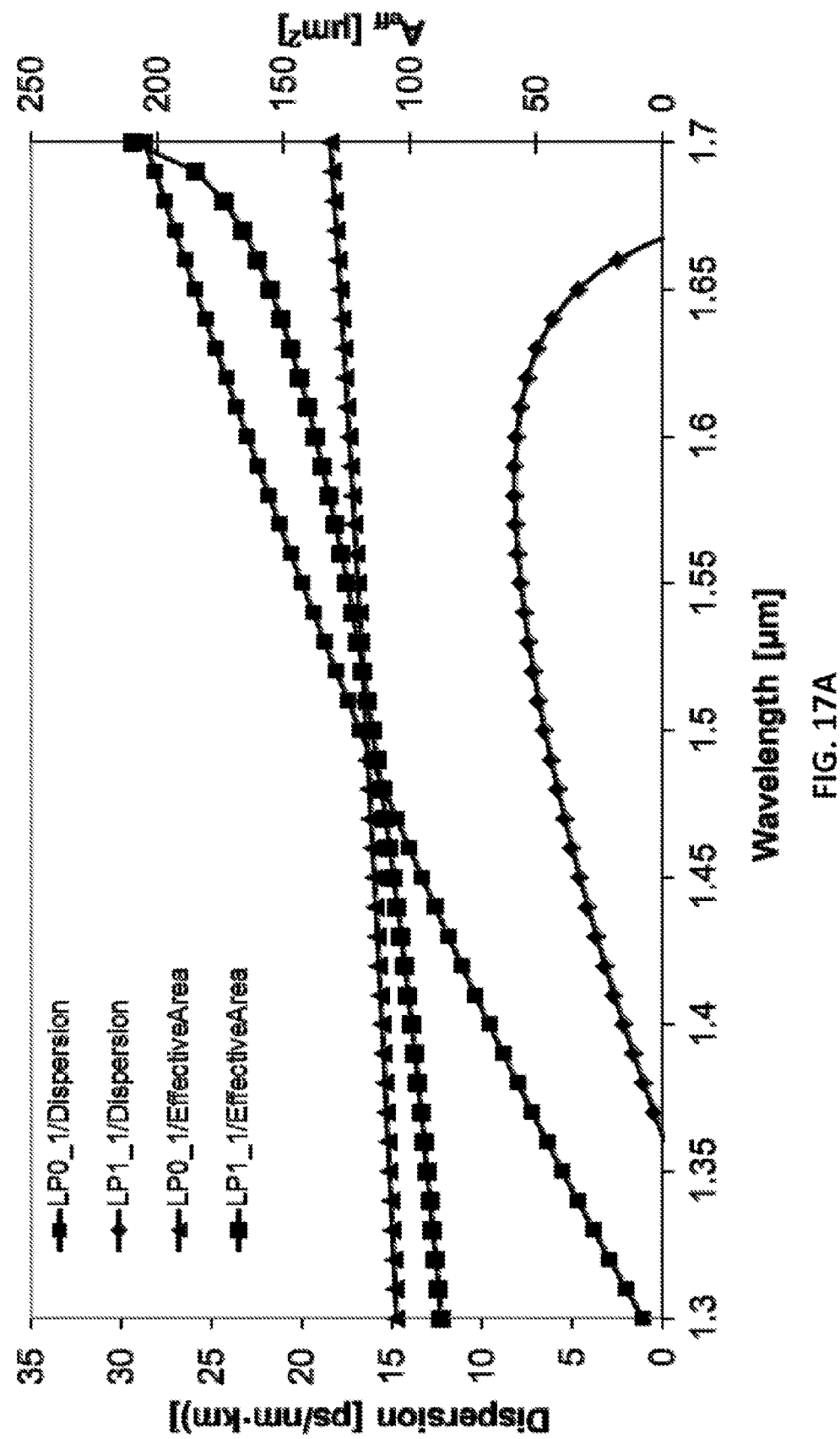
FIGS. 17A-17C show a series of graphs illustrating dispersion and effective area for the each of the three fiber designs of FIG. 15.
Figure 17B:
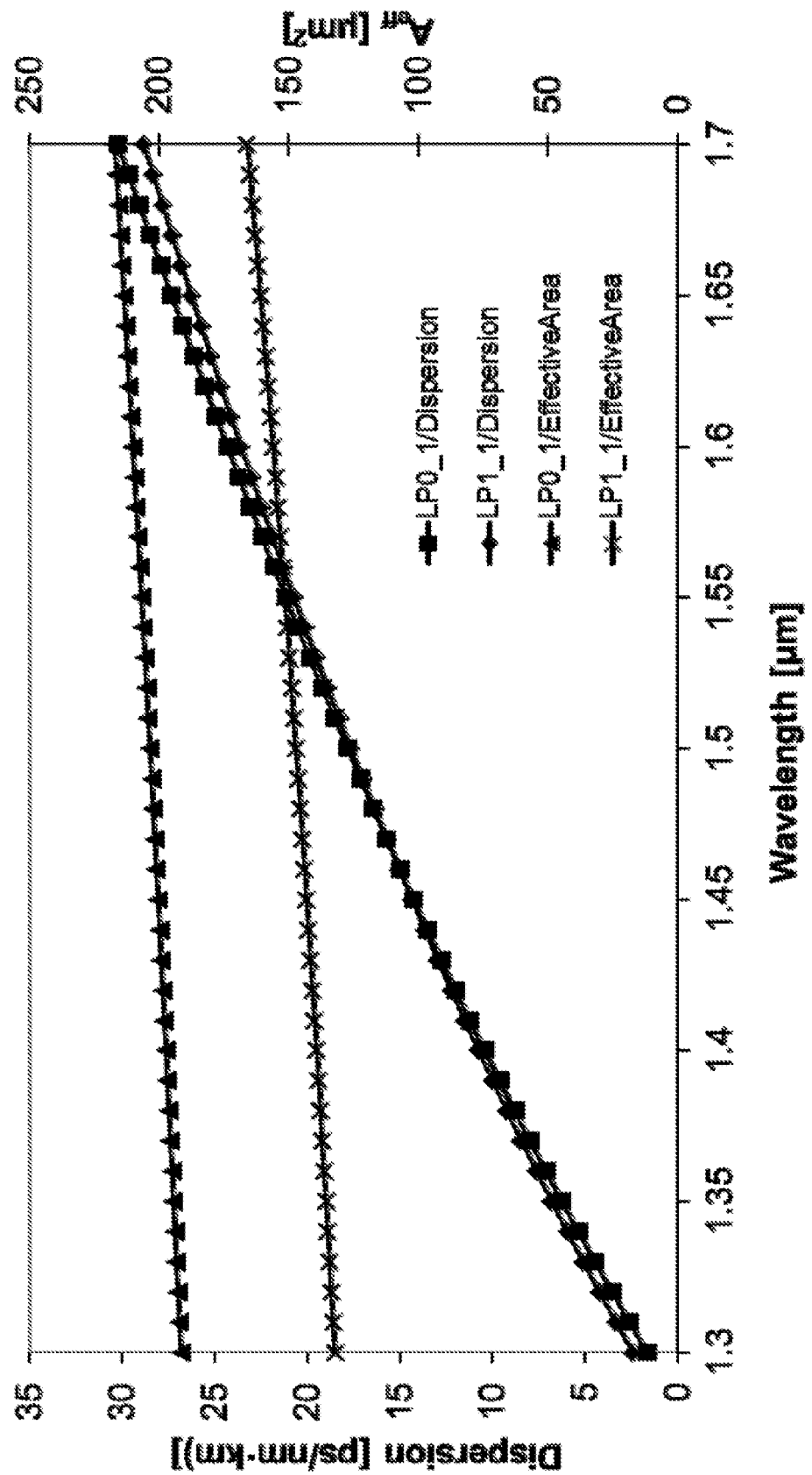
Figure 17C:
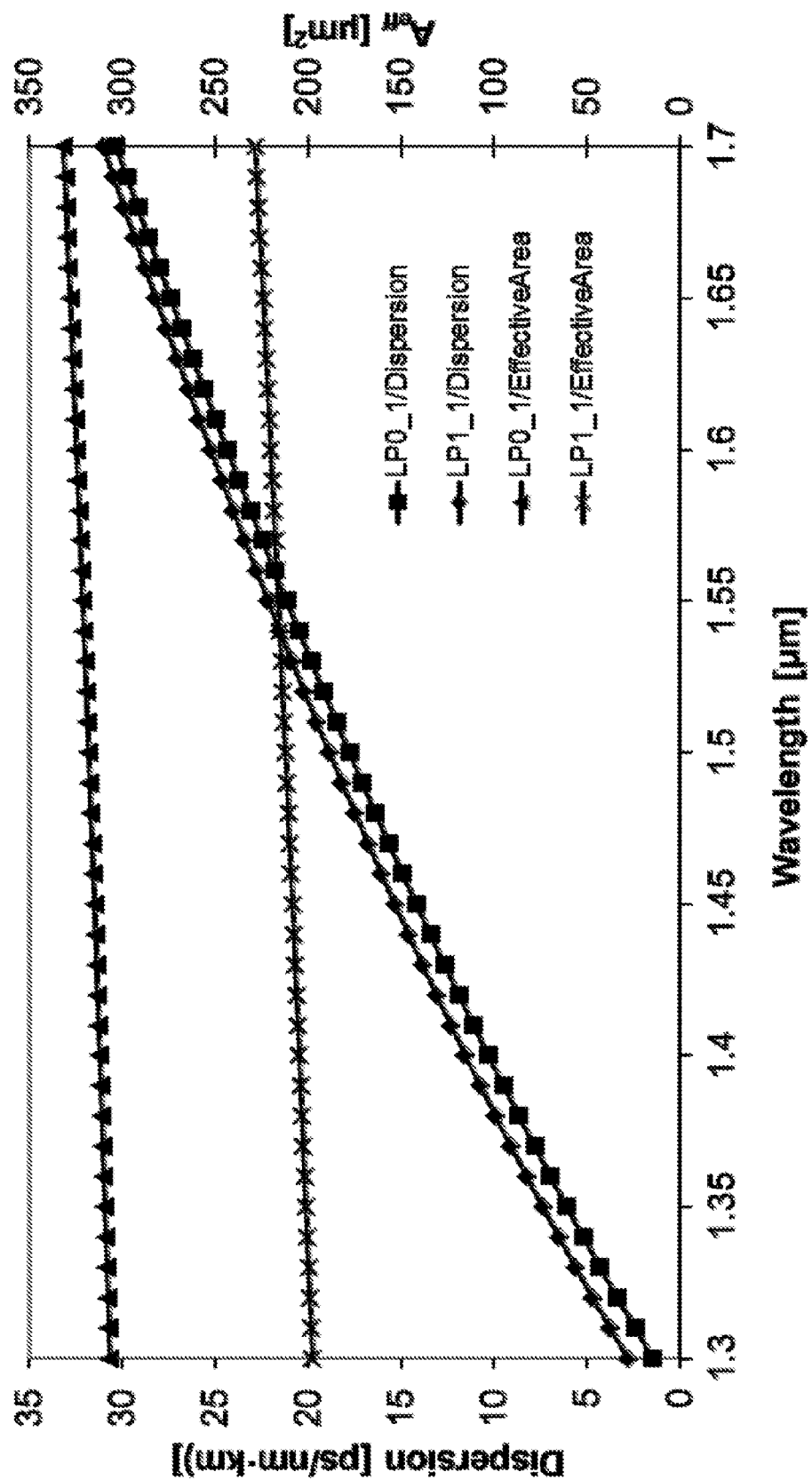

FIGS. 17A-17C present a series of graphs illustrating dispersion and effective area for the three considered designs of FIG. 15. At a wavelength of 1550 nm, an effective area of the fundamental ($LP_{01}$) mode is 207 μm$^2$ for an overcladding CSA of 1100 μm$^2$ and 321 μm$^2$ for an overcladding CSA of 500 μm$^2$ is obtained.

Figure 18A:
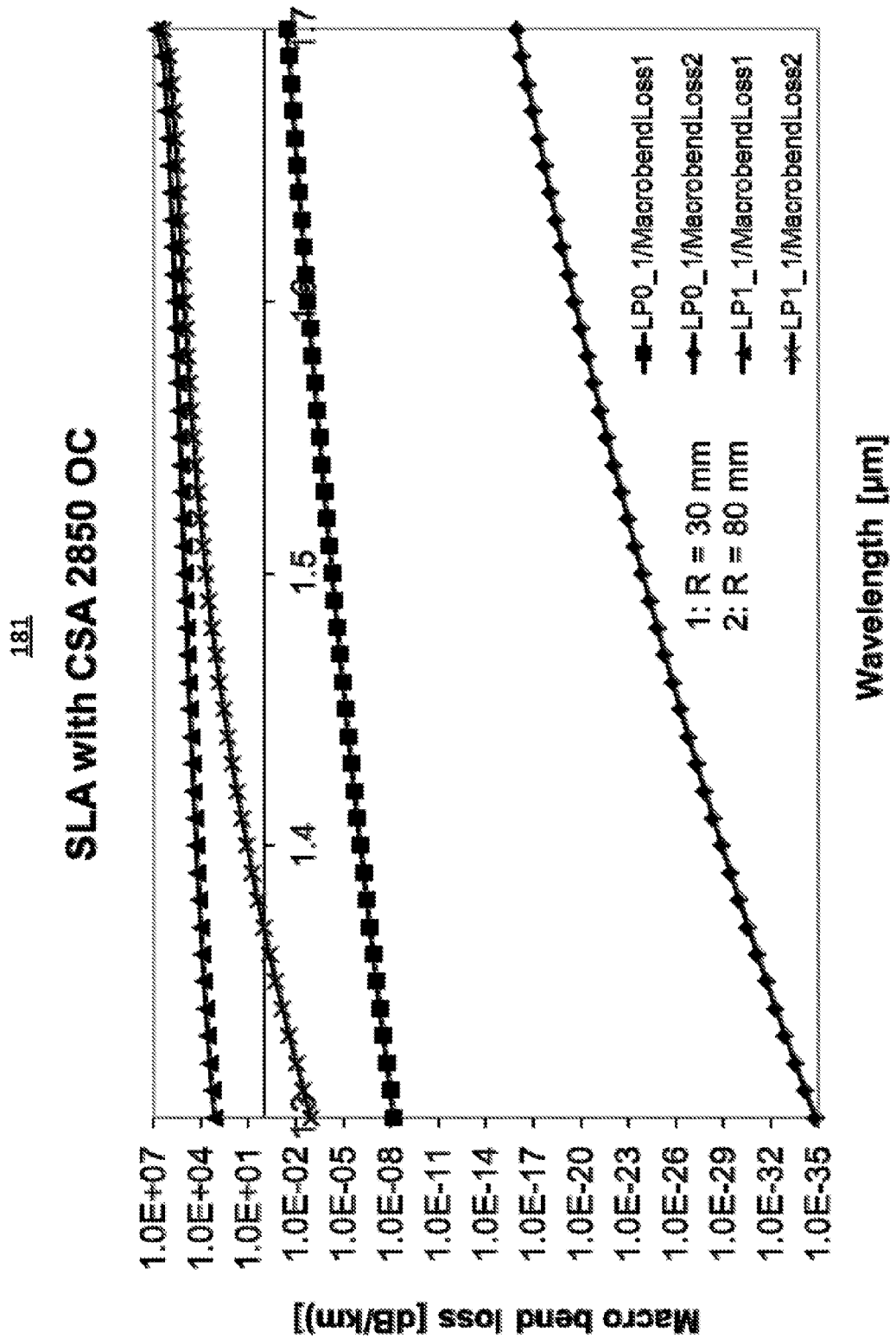
FIGS. 18A-18C show a series of graphs illustrating calculated bend loss for the three fiber designs of FIG. 15 at a bending radius of 30 mm and at a bending radius of 80 mm.
Figure 18B:
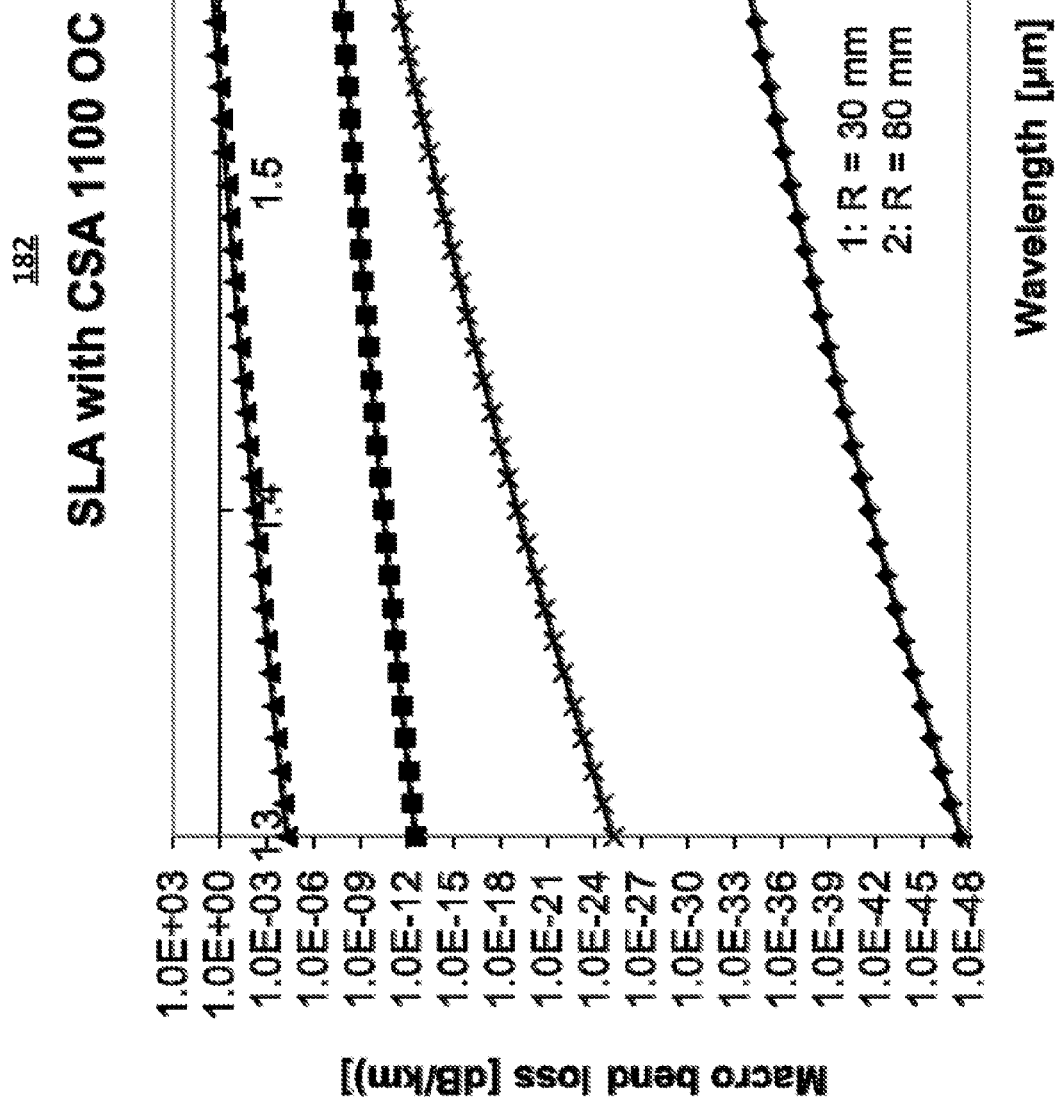
Figure 18C:
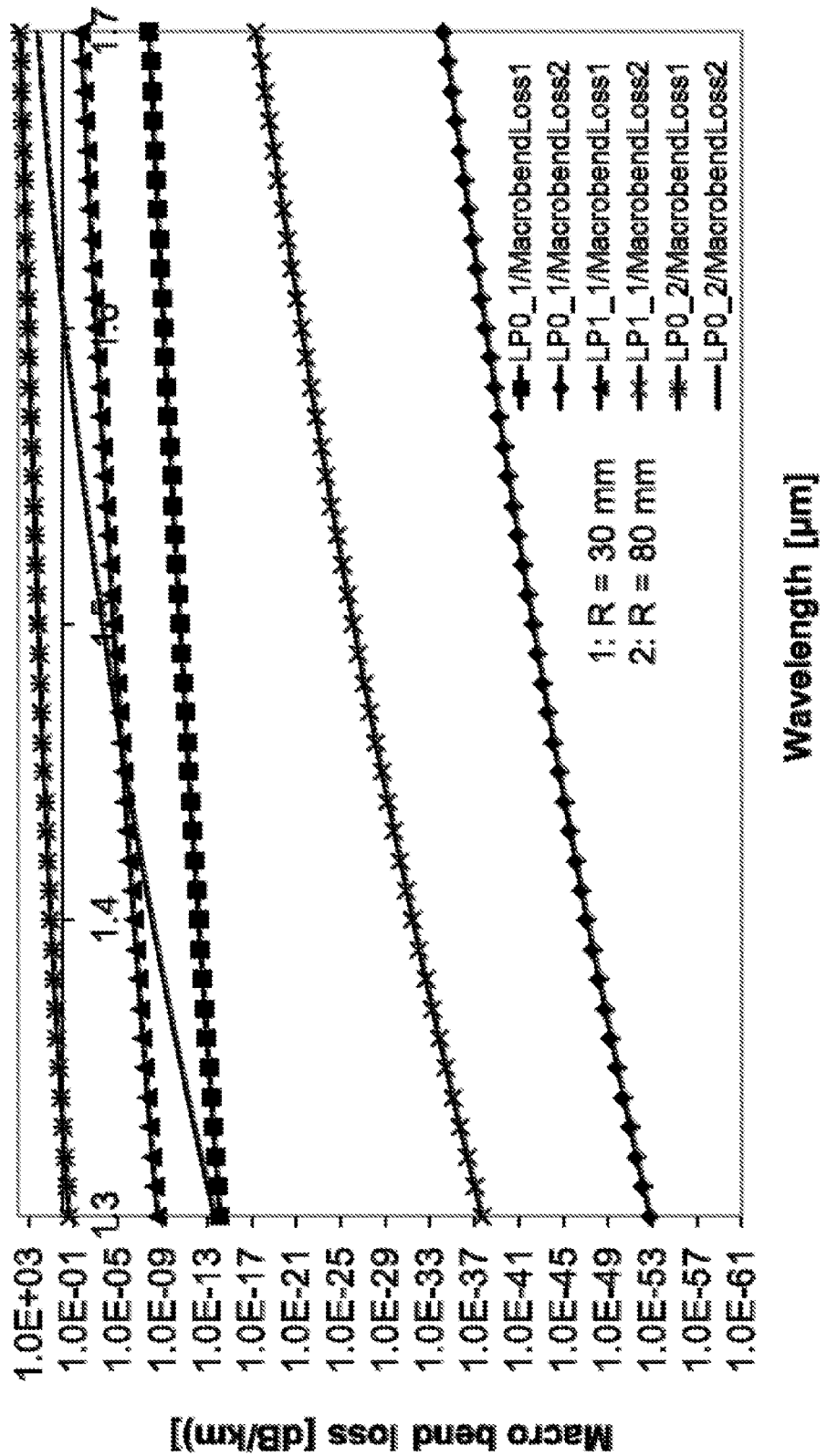

FIGS. 18A-18C are a series of graphs illustrating calculated bend loss for the three considered designs.

Embodiments of the present invention include fibers supporting more modes with $LP_{01}$ effective area >150 μm$^2$. Further, such fibers may be characterized with the following design parameters:

a step index profile with a core $\Delta n < 5 \cdot 10^{-3}$ having an effective area >200 μm$^2$ and a core radius >8 μm;

a step index profile with a core $\Delta n < 5 \cdot 10^{-3}$ having an effective area >300 μm$^2$ with a core radius >10 μm.

In transmission systems using only the fundamental mode, one way to decrease multiple path interference (MPI) is to insert mode strippers in the transmission path with some spacing. The closer the mode strippers are spaced, the more the MPI can be reduced. The penalty by this approach is that the MPI is transformed into additional loss.

The mode strippers can be made by tapering the fiber. The mode strippers can also be made in other ways, including by bending the fiber and the like.

3.5 Few-Mode Fiber with Graded-Index Core

The remainder of the present description focuses on aspects of the invention directed to few-mode fibers (FMFs) having graded-index cores, or a core having a varying refractive index that typically decreases from the fiber axis to an outer core boundary. The described FMFs support a selected plurality of signal modes having a large effective area $A_{eff}$, while displaying low bending losses for low DMA and maintaining a low level of differential group delay across a wide range of wavelengths. Thus, these fibers are well-suited for MDM and like techniques.

As described below, these and other characteristics are obtained by combining a number of different design features, including a graded core region with larger $\Delta n$ than either a single-mode graded-index fiber or a step-index FMF, and a depressed inner cladding region (i.e., a "trench"). Further, certain embodiments may include additional design features, such as a shoulder region between the core and the trench, or an index drop-off between the core and the trench, and various embellishments to the shape of the index profile of the core.

It is noted that the described combination of elements overcomes some known drawbacks associated with individual elements. For example, raising the core index of a fiber is known to support additional guided modes. However, additional leaky modes with an effective index near the cladding will also be supported. The guided modes having the lowest effective indices will suffer more bending losses than, for example, the $LP_{01}$ mode, causing higher DMA or inducing additional attenuation in the desired modes if they couple energy to the leaky modes. Raising the core index also causes a decrease in the size of the respective effective areas $A_{eff}$ of the guided modes, thereby tending to introduce nonlinearities that degrade fiber performance.

It has been recognized by the inventors herein, in designing a FMF, that it is possible to retain the advantages of a graded-index core with a higher index than a step-index core with similar modal content, while minimizing their known disadvantages, by combining those elements with a depressed cladding or a "trench," with proper adjustments to core parameters. As described below, the resulting fiber designs support the desired number of modes, while maintaining an acceptably large effective area $A_{eff}$ and an acceptably low level of bending losses for low DMA.

As described below, embodiments of the present invention includes the design of depressed cladding and core-shelf-trench fibers that effectively propagate only two modes (i.e. the $LP_{01}$ and $LP_{11}$ modes) and only four modes (i.e., the $LP_{01}$, $LP_{11}$, $LP_{11}$, and $LP_{21}$ modes). The described fibers have maximized effective areas $A_{eff}$ for each mode, with acceptably low DGD levels across the C-band. In addition, the effective index of the $LP_{11}$ mode in the two-mode case, and the $LP_{11}$ and $LP_{21}$ modes in the four-mode case, are maximized in order to minimize differential mode attenuation (DMA).

According to a further aspect of the invention, the fabrication of the fibers described herein includes the application of a "spin" profile during the drawing draw process, which is believed to be beneficial.

3.5.1 Quantification and Parameterization of Hybrid FMF Designs

Figure 19:
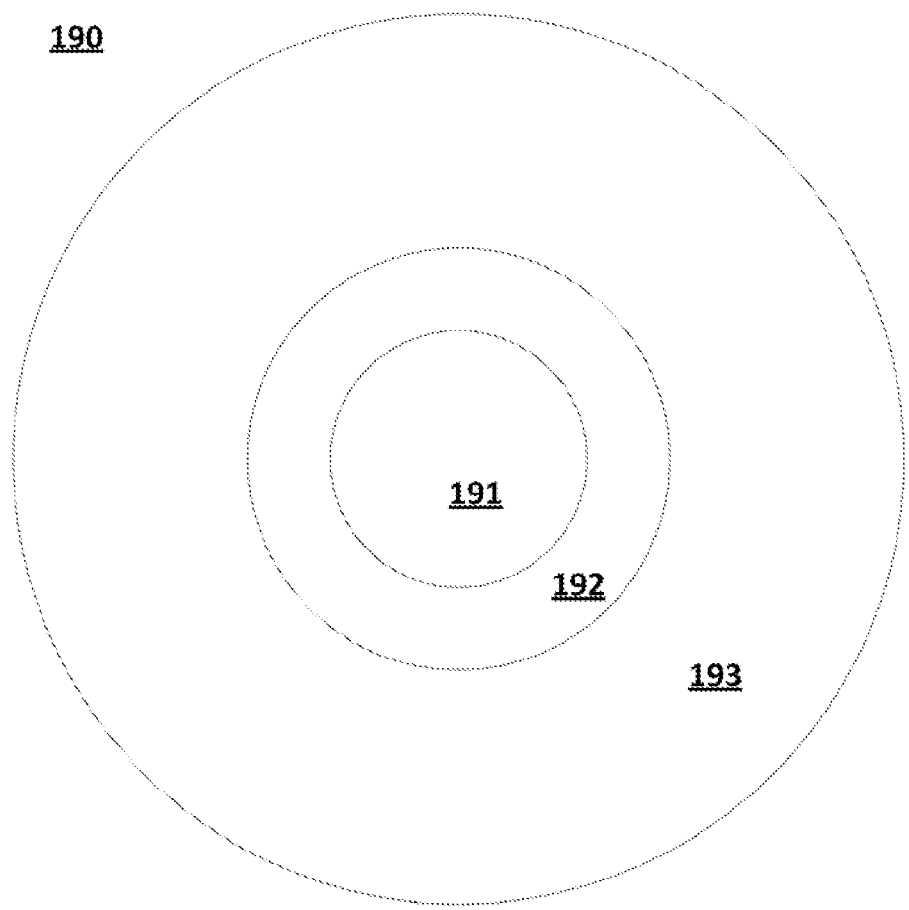
FIG. 19 is a cross section diagram, not drawn to scale, of an exemplary graded-index few-mode fiber (FMF) according to the present invention.

FIG. 19 is a cross section diagram, not drawn to scale, of an exemplary graded-index few-mode fiber 190 according to the present invention. FMF 190 comprises a raised-index, graded-index core region 191, a depressed-index trench region 192, and an outer cladding 193. As shown in some of the following examples, such a FMF may further include other fiber regions, such as a shoulder region between the core 191 and a trench 192.

Figure 20:
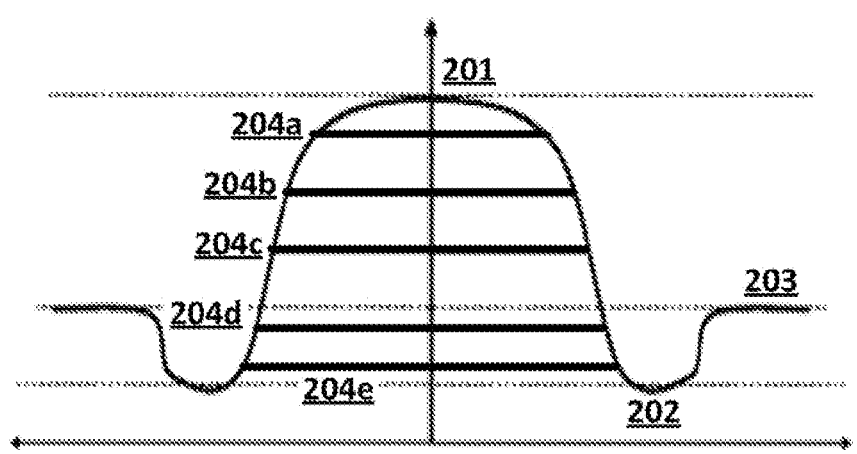
FIG. 20 is a refractive index profile of the FMF shown in FIG. 19.

FIG. 20 illustrates a refractive index profile 200 of FMF 190, shown in FIG. 19. Profile 200 illustrates the respective refractive indices of the core region 201, trench 202, and outer cladding 203, wherein the x-axis represents radial position with x=0 representing the center of the core region, and wherein the y-axis represents refractive index, expressed as an index difference $\Delta n$ unless otherwise stated.

Refractive index profile 200 illustrates the grading of the core refractive index 201 from a peak value at the center of the core to a lowest value at the core's outer circumference. In some of the FMF designs described herein, the lowest core index is equal to that of the outer cladding, i.e., Δn=0. In other designs, the core's lowest index value may have a positive Δn value, in which case there is an "index drop" or "step" at the transition between the core region and the immediately adjacent cladding region.

In the present discussion, the graded-index core region 201 is characterized using the following parameters: the core radius $r_{core}$; the core peak refractive index (located proximate to the core center) $n_{core\,(max)}$; and the core's lowest refractive index (located at the core circumference) $n_{core\,(min)}$. In addition, the core region is characterized by a delta parameter (Δ) and an alpha parameter (α).

The core's Δ parameter quantifies the core's peak refractive index $n_{core\,(max)}$ relative to the refractive index of the fiber's outer cladding $n_{clad}$, as follows:

$$\Delta = \frac{n_{core(max)}^2 - n_{clad}^2}{2 \cdot n_{core(max)}^2}$$

The Δ parameter is commonly expressed as a percentage.

The core's α parameter is based on the assumption that the refractive index profile of the core region can be expressed as a function n(r) of radial location r, substantially as follows:

$$n(r) = n_{core(max)} = \sqrt{1 - 2\Delta\left(\frac{r}{r_{core}}\right)^\alpha}.$$

An alpha parameter α=2 corresponds to an inverted parabola. An alpha parameter α=1 corresponds to a triangular shape (i.e., a sawtooth) while an alpha parameter α=∞ corresponds to a rectangular "box" shape (i.e., a step function). An alpha parameter α=0 corresponds to a flat line along the x-axis.

The grading of the index can be tailored to reduce group velocity mismatch between the low-loss core-guided modes. For example, the core index profile may have a conventional parabolic shape or a non-parabolic shape in the α parameter space. In addition, the core index profile can have a shape lying outside of the α parameter space that is tailored to have better group velocity matching for modes guided near the core edge. As used herein, the term "near-parabolic" refers to a graded-index core shape that is substantially graded, but that does not lend itself to characterization using the α parameter.

Generally speaking, it is desirable for signal-carrying modes to have a high effective index, which provides for better confinement of the mode by the fiber core, thereby decreasing macrobending and microbending losses and thus, decreasing attenuation. A further consideration is that modes having effective indices that are relatively closely spaced to one another but above the refractive index of the outer cladding typically experience greater mode-mixing and thus averaged differential group delays and effective areas over such lengths. Modes having an effective index that are close to, or below, that of the refractive index of the outer cladding tend to be "lossy" or "leaky."

In FIG. 20, index profile 200 further includes a series of bars 204a-e indicating the effective refractive index (also known as the "modal index") for various LP modes guided by the fiber. Each of the three modes 204a-c have an effective refractive index above that of the outer cladding, while two other modes 204d-e each have a refractive index below that of the outer cladding. Thus, the upper three modes 204a-c appear to be suitable for carrying mode-multiplexed signals. The lower two modes 204d-e, on the other hand, are unwanted, undesired modes.

The down-doped trench 192, 202 can provide lower bending loss and better group refractive index matching of low-loss modes, while the outer cladding 193, 203 allows unwanted modes to leak out of the fiber. Although the lowest signal mode 204c has an effective index relatively close to the index of the outer cladding, within some limits, the proper reference for bending loss properties of this mode is the index of the down-doped trench 192, 202. Further, the width of the trench region 192, 202 allows leakage loss of modes to be controlled, such that signal modes see low loss, but unwanted modes are suppressed.

3.5.2 Graded-Index Design Considerations

In the following fibers according to further aspects of the invention, a graded-index design is employed that is specifically configured to provide functionality in contexts in which prior multimode fibers are inadequate in mode-division multiplexing applications.

One advantage of a graded-index design over a step-index design is that the graded-index design can substantially reduce signal dispersion (i.e., pulse spreading) arising from differences in respective transmission speeds (characterized by the group velocity or equivalently the group effective index) for the individual modes of a multimode fiber. In particular, in a data communication transmission link of a given length where a single signal is transmitted over each respective mode simultaneously, a graded-index design can be used to limit accumulated modal dispersion to a maximum value that does not exceed the tolerance of the receiver to dispersion.

For example, a transmission link can be constructed using a commercially available OM4 gradient-index multimode fiber (MMF), a vertical-cavity, surface-emitting laser (VCSEL) connected to an input end of the MMF, and a suitable receiver connected to an output end of the MMF. The VCSEL launches into the MMF a transmission signal that is, itself, multi-transverse-moded. The signal is transmitted down the length of the MMF, employing a plurality of modes supported by the MMF, and is then recovered by the receiver. In one common specification, the OM4 MMF has a maximum differential group delay (DGD) of 140 ps/km, or equivalently 0.140 ps/m, and is configured to have a length wherein the maximum accumulated transmission-induced pulse broadening falls within a range that is tolerated by the receiver.

Figure 21:
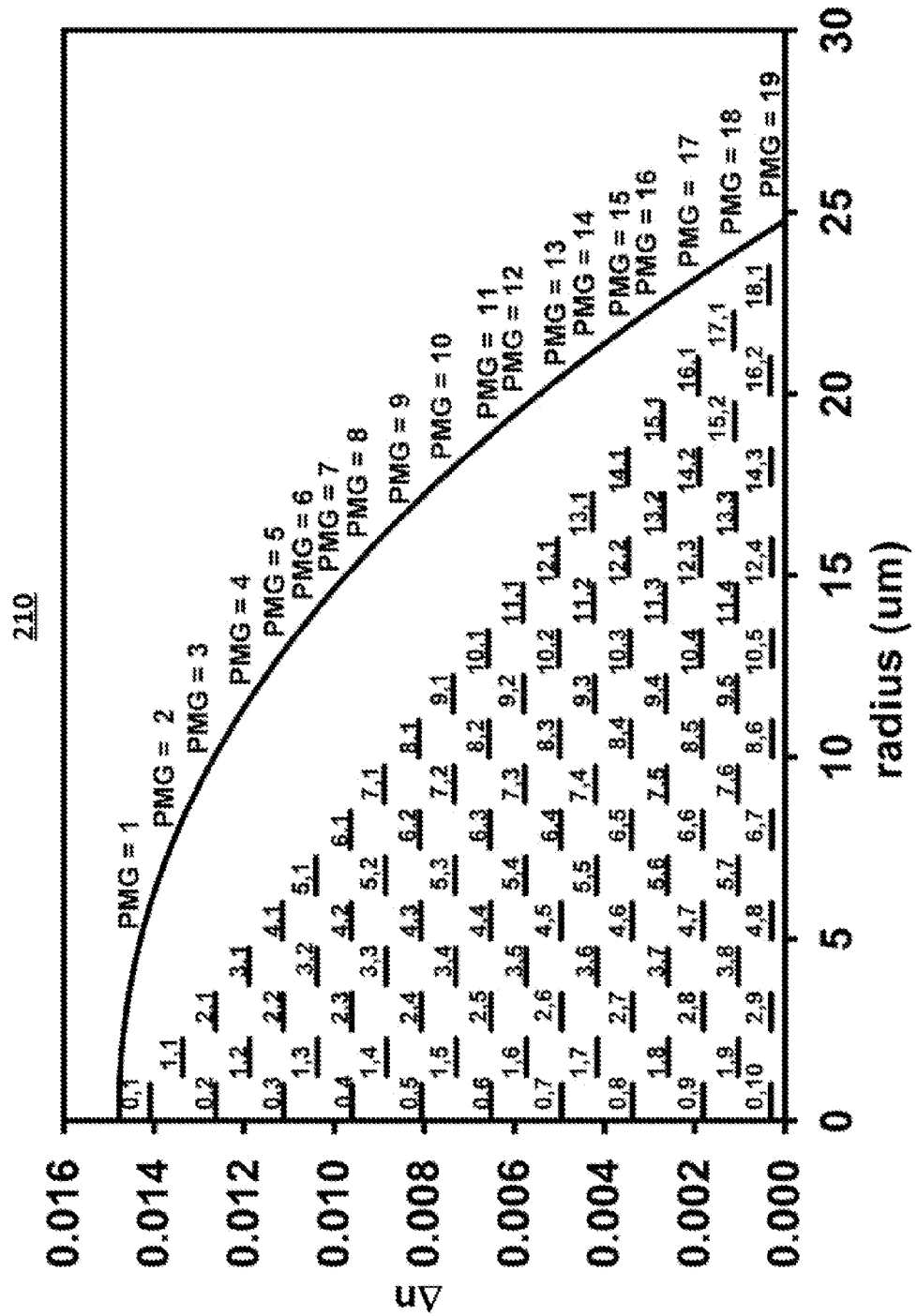
FIGS. 21 and 22 are graphs, according to the prior art, showing a calculated modal structure for the $LP_{l,m}$ modes, at 850 nm and 1550 nm respectively, for a conventional graded-index multimode fiber (MMF) having a core diameter of 50 μm and a 1% relative delta.
Figure 22:
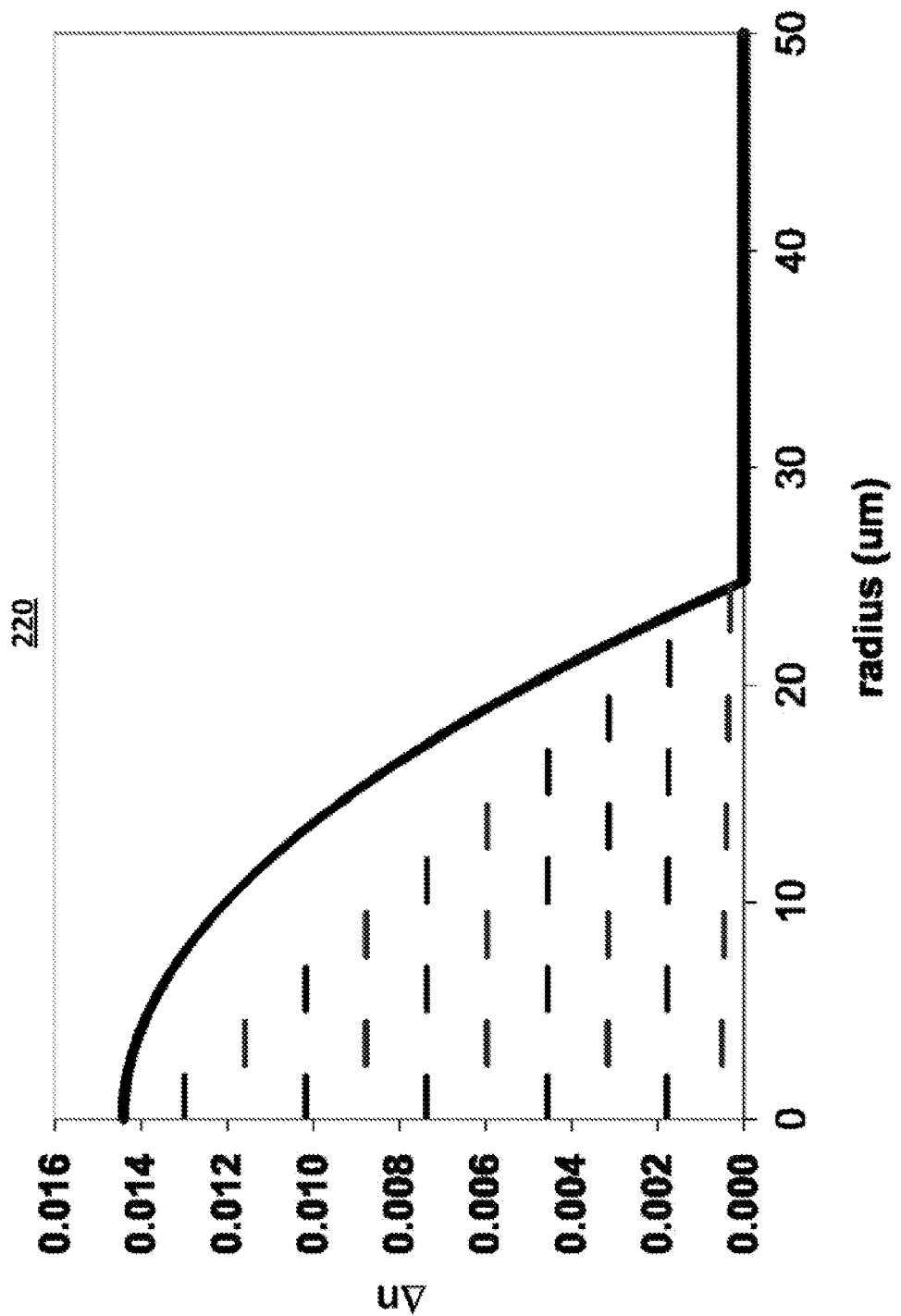

FIGS. 21 and 22 are a pair of graphs 210 and 220, according to the prior art, showing the calculated modal structure for the $LP_{l,m}$ modes, at 850 nm and 1550 nm respectively, for an exemplary graded-index multimode fiber (MMF) having a core diameter of 50 μm and a 1% relative delta (i.e., percentage difference, in absolute units, between the maximum core index and the cladding index). The depicted modal structures are representative of the modal structures of MMFs used in short-reach communications, such as commercially available OM3 or OM4 fibers. Each $LP_{l,m}$ mode is represented by a short horizontal bar. The position of a given line segment ($LP_{l,m}$ mode) with respect to the y-axis indicates the effective index of that particular mode.

For purposes of illustration, the $LP_{l,m}$ modes are grouped into principal mode groups (PMGs) having similar propagation constants (and equivalently, similar effective indices). Thus, PMG 1 comprises the $LP_{01}$ mode;
PMG 2 comprises the $LP_{11}$ mode;
PMG 3 comprises the $LP_{11}$ and $LP_{12}$ modes;
PMG 4 comprises the $LP_{12}$ and $LP_{31}$ modes;
PMG 5 comprises the $LP_{03}$, $LP_{22}$, and $LP_{41}$ modes;
etc.

Note that in FIG. 21, the y-axis represents units of absolute refractive index n (i.e., the ratio between the speed of a given light transmission through a given fiber region and the speed of light traveling through a vacuum), while in FIG. 22, the y-axis represents units of refractive index difference Δn (i.e., the difference between the refractive index of a given fiber region $n_{region}$ and the refractive index of the cladding $n_0$). In the present example, a 1% relative delta is approximately equivalent to a Δn of approximately 0.0145.

The following discussion will show why conventional multimode fibers (MMF) or bend-insensitive MMF are not suitable for mode-division multiplexing, due to high DMA and a lack of control of unwanted modes having effective indices near the index of the outer cladding, or in one limit, too low difference in effective mode index between nearest neighbor pairs of guided, desired signal modes.

As shown in FIG. 21, at 850 nm, the effective indices of the $LP_{l,m}$ modes (and thus the respective average effective indices of PMGs 1-19) are spaced at approximately equal intervals of ~0.00075 (in Δn) down to the cladding level. The effective index, $n_{eff}$ of a mode is related to a propagation constant, β, of the mode, by a constant factor $k_0$, previously defined:

$$n_{eff} = \frac{\beta}{k_0}.$$

Coupling between modes is dependent on statistical distribution of fiber perturbations along the length of the fiber and the difference in propagation constants Δβ between two modes. Approximate formulae in the literature have used inverse powers of Δβ to estimate the relative coupling between modes and mode groups, such as $\Delta\beta^{-p}$ where p is 4, 6, or 8. The highest order modes just above the cladding index couple strongly to leaky modes just below the cladding and are very lossy.

By reducing the gradient-index parameter from 2.14 (theoretical optimum at 850 nm) to 1.98 (theoretical optimum at 1550 nm), it is possible to re-optimize an existing short-reach fiber for minimum differential group delay at 1550 nm. (Experimentally, these numbers may be slightly different, but the trend is illustrated by theory.) Such a fiber supports approximately 9 well-guided principal mode groups (the tenth is lost quickly and not counted), comprising approximately 25 modes.

The described short-reach fiber can be used to construct a few-mode transmission link employing a selected number of modes. Those modes having the highest respective effective indices (i.e., those modes at the top of a mode profile, such as the profile shown in FIG. 12A) are selected to be the desired transmission modes. Mode-selective launch and detection are used to exclude the undesired modes.

As shown in FIG. 22, at 1550 nm, the effective refractive indices of the LP modes are spaced apart at approximately equal intervals of 0.0014 (in Δn), which is approximately twice the separation between the LP modes at 850 nm. This increase in separation reduces the coupling between modes according to the inverse power law formula referenced above. As stated earlier, some level of mode coupling is not detrimental in and of itself so long as MIMO, or other suitable technique, is capable of correcting the mode coupling.

However, typically, closely-spaced modes below the desired modes will serve as a "mode ladder" to couple power down from the desired modes to the very loss), lowest order modes near the cladding. In other words, there will typically be some primary coupling between one or more desired modes and one or more undesired adjacent modes. In addition, there is typically some secondary coupling between the coupled-to undesired modes and one or more additional undesired modes. This process will continue downward through the mode profile, resulting in some amount of coupling to the lowest, most lossy modes in the mode profile. Discrete mode coupling at splices and connectors will also contribute to coupling between rungs on the mode ladder.

Thus, in a transmission link employing a multimode fiber having a mode profile similar to the mode profiles shown in FIGS. 21 and 22, DMA may still be unacceptably high over a transmission distance of many tens of kilometers, since the lowest mode in the profile always has an effective index that is relatively close to the cladding index. Due to larger mode spacings, the DMA at 1550 nm in a 50 μm core MMF over long distances is less severe than the DMA at 850 nm. However, it still may not be optimized enough for MIMO algorithm performance.

According to the mode coupling theory above, for p=6, a factor of 100× reduction in mode coupling is obtained by increasing the spacing in mode effective index (or equivalently Δβ) for adjacent modes from 0.0014 in Δn in the case of conventional or bend-insensitive, 50 μm core diameter, 1% Δ MMF at 1550 nm to 0.0020 for an beneficial fiber design. In graded-index waveguide design it is challenging to minimize the spacing Δβ between guided modes while simultaneously maximizing the spacing between the lowest guided mode and the next higher undesired mode. Therefore maximizing the spacing of mode effective indices should generally improve DMA also. A benefit for improving DMA and possibly reducing MIMO complexity by reducing mode coupling is obtained when the modes of a graded index FMF have effective index difference between nearest neighbor modes of greater than or equal to 0.002 (in units of Δn). This mode spacing is compatible with further increasing the number of guided LP modes to 6 or even 9 in a few-mode fiber using the principles disclosed herein. Even greater benefit would be obtained by increasing the mode spacing to greater than or equal to 0.0026 in units of Δn.

According to an aspect of the invention, an ideal scenario for reduced DMA and simultaneously reduced accumulated delay is one in which all the guided modes have small spacing between them, and high effective indices, far above the cladding index, with a relatively large gap between the lowest, selected, guided mode and the cladding index.

According to a further aspect of the invention, in lieu of the ideal scenario, tradeoffs are employed, resulting in a modal structure having spacing between the modes such that the loss of the lowest guided mode is minimized, while effectively guiding the number of modes desired. In other words, it is desirable to create fibers where the desired number of guided modes is confined within, for example, a gradient-index core, but where the mode with the lowest effective index is the least lossy it can be within the other constraints.

In an exemplary practice of the invention, the above goals are achieved, minimizing both macrobending and microbending of the guided modes, by using "steps" in the outer core and trenches around the core, coupled with an appropriate choice of core delta, width, and graded-index parameter.

Specifically, one aspect of the invention provides few-mode fibers (FMFs) having two LP modes ($LP_{01}$, $LP_{11}$). Another aspect of the invention provides FMFs having four LP modes ($LP_{01}$, $LP_{11}$, $LP_{11}$, $LP_{21}$). The fiber profiles are designed so that group delay differences between different LP modes are minimized. Thus, the maximum group delay difference can be beneficially limited across wide wavelength bands.

3.5.3 Gradient-Index Few-Mode Fiber Having Two LP Modes

Embodiments of the present invention include few-mode fiber designs in which two modes are guided: $LP_{01}$ and $LP_{11}$. The described fibers can be fabricated, for example, using a modified chemical vapor deposition (MCVD), or other suitable technique such as plasma chemical vapor deposition (PCVD).

As mentioned above, a spin profile may be applied to the fiber as it is drawn by rotating the preform or the fiber, or both, around their respective longitudinal axes.

In the following examples, unless otherwise indicated, the refractive index of each fiber region is quantified using the region's index difference $\Delta n$, i.e. the region's refractive index minus the refractive index of the fiber's outer cladding. By definition, the outer cladding has an index difference $\Delta n$ equal to zero.

For the purposes of illustration, in the refractive index profiles used to illustrate each fiber design, the outer cladding has been truncated. Unless otherwise indicated, the outer cladding has a radius of 62.5 μm (i.e., the uncoated FMF has an outer diameter of 125 μm).

Figure 23:
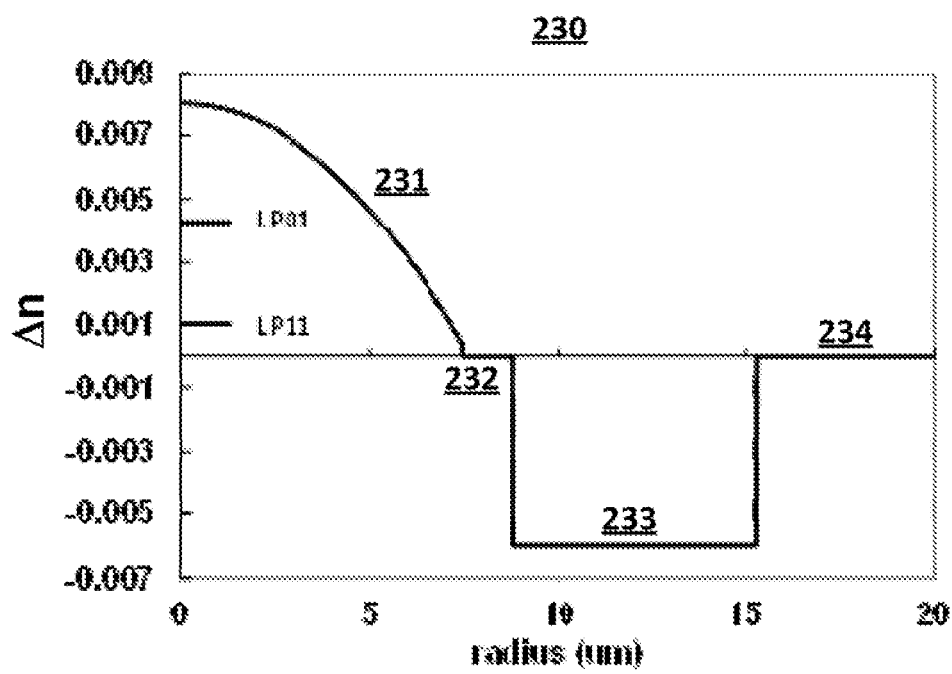
FIG. 23 shows an FMF refractive index profile according to a further aspect of the invention.
Figures 25, 26:
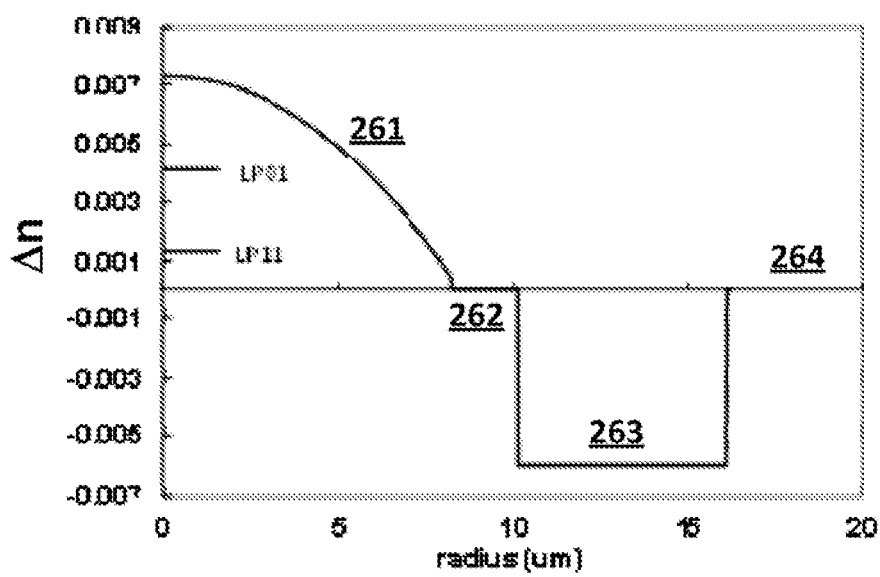
FIG. 25 is a table setting forth specifications for the FMF design shown in FIG. 23.
FIG. 26 depicts a refractive index profile for a few-mode fiber (FMF) according to a further aspect of the invention.
Figure 29:
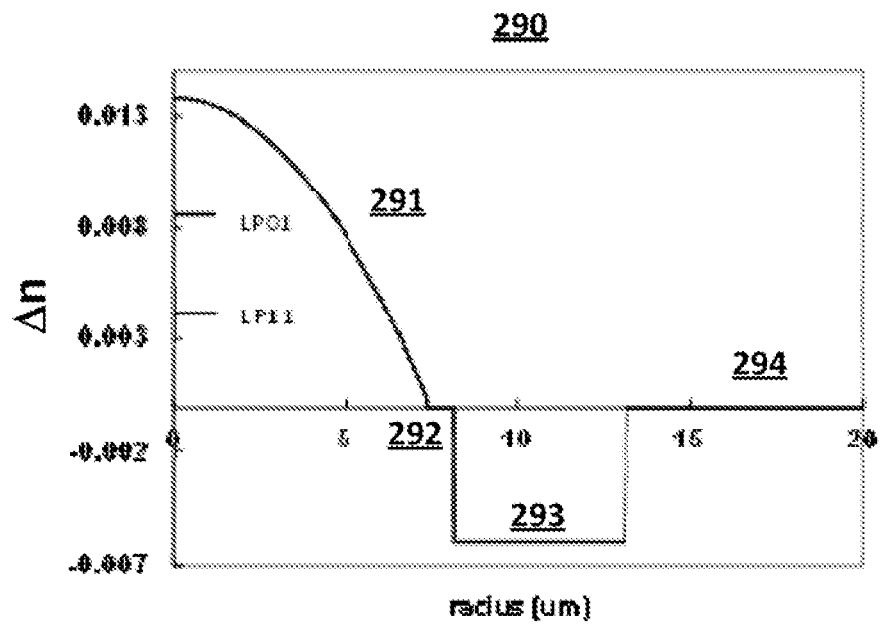
FIG. 29 depicts a refractive index profile for a few-mode fiber (FMF) according to a further aspect of the invention.

Also, in the index profiles for Examples 1.1, 1.2, and 1.3 shown, respectively, in FIGS. 23, 26, and 29, there is a small index step at the right edge of the graded-index core 231, 261, and 291. This small index step is an artifact resulting from the finite calculation grid used to simulate the index profile.

Example 1.1

FIG. 23 shows a FMF refractive index profile 230 according to an aspect of the invention. The FMF comprises a graded-index core 231, a shoulder 232, a down-doped trench 233, and an outer cladding 234. The effective index of the guided $LP_{01}$ and $LP_{11}$ modes are shown as labeled black bars in index profile 230.

Figure 24:
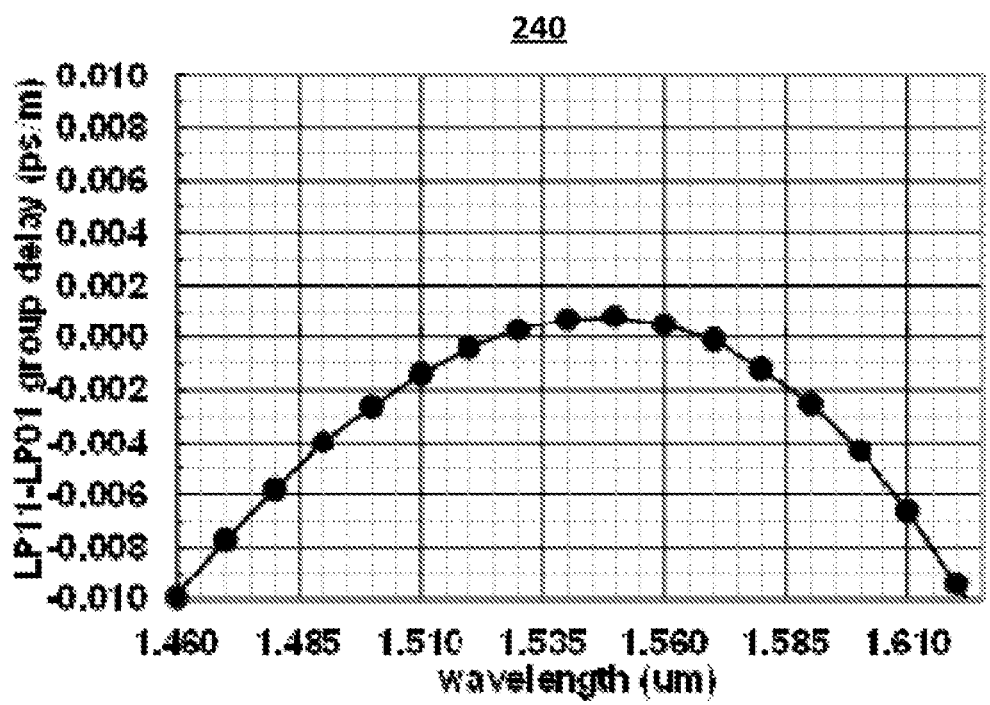
FIG. 24 is a graph illustrating group delay difference between the $LP_{01}$ and $LP_{11}$ modes as a function of wavelength for the fiber design shown in FIG. 23.

FIG. 24 is a graph 240 illustrating the group delay difference between the $LP_{01}$ and $LP_{11}$ modes as a function of wavelength.

FIG. 25 is a table 250 setting forth the specifications for fiber design 230.

As shown in profile design 230 and table 250:
the graded-index core 231 has
 a radius of 7.7 μm,
 a start absolute index difference $\Delta n=0.0081$,
 an end absolute index difference $\Delta n=0.0$,
 an alpha parameter $\alpha=2.00$;
the shoulder region 232 has
 an inner radius of 7.7 μm,
 a thickness of 1.085 μm.
 an outer radius of 8.785,
 an absolute index difference $\Delta n=0$;
the trench region 233 has
 an inner radius of 8.785 μm,
 a thickness of 6.5 μm,
 an outer radius of 15.285
 an absolute index difference $\Delta n=-0.006$;
the outer cladding 234 has
 an inner radius of 15.285 μm,
 a thickness of 47.215 μm,
 an outer radius of 62.5 μm.
 an absolute index difference $\Delta n=0$ (by definition).
As further shown in table 250, the fiber supports the $LP_{01}$ and $LP_{11}$ modes and exhibits the following characteristics:
group delay difference between $LP_{01}$ and $LP_{11}$ modes:
 <0.001 ps/m across C-band,
 calculated $LP_{01}$ effective area $A_{eff}=80.85$ μm$^2$,
 calculated $LP_{01}$ effective area $A_{eff}=80.5$ μm$^2$.

Example 1.2

FIG. 26 shows a FMF refractive index profile 260 according to an aspect of the invention. The FMF comprises a graded-index core 261, a shoulder 262, a down-doped trench 263, and an outer cladding 264. The effective index of the guided $LP_{01}$ and $LP_{11}$ modes are shown as labeled black bars in index profile 260.

Figures 27, 28:
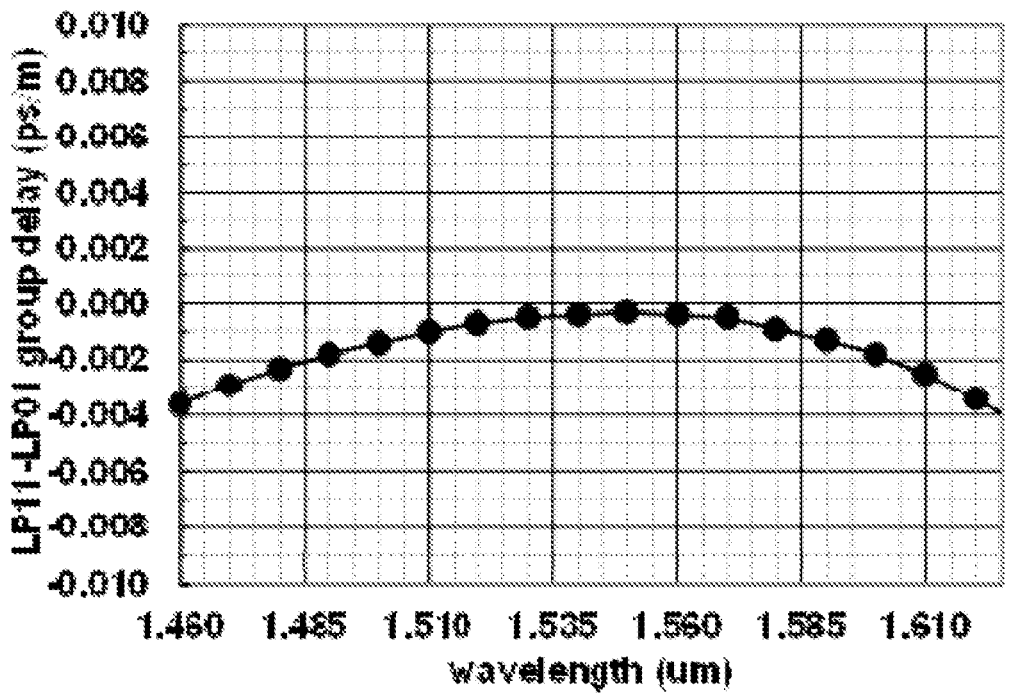
FIG. 27 is a graph illustrating group delay difference between the $LP_{01}$ and $LP_{11}$ modes as a function of wavelength for the fiber design shown in FIG. 26.
FIG. 28 is a table setting forth specifications for fiber design shown in FIG. 26.

FIG. 27 is a graph 270 illustrating the group delay difference between the $LP_{10}$ and $LP_{11}$ modes as a function of wavelength.

FIG. 28 is a table setting forth the specifications for fiber design 280.

As shown in profile design 260 and table 280:
the graded-index core 261 has
 a radius of 8.5 μm,
 a start absolute index difference $\Delta n=0.0073$,
 an end absolute index difference $\Delta n=0.0$,
 an alpha parameter $\alpha=2.09$;
the shoulder region 262 has
 an inner radius of 8.5 μm,
 a thickness of 1.61 μm,
 an outer radius of 10.11,
 an absolute index difference $\Delta n=0$;
the trench region 263 has
 an inner radius of 10.11 μm,
 a thickness of 6.0 μm,
 an outer radius of 16.1 μm
 an absolute index difference $\Delta n=-0.006$;
the outer cladding 264 has
 an inner radius of 16.61 μm,
 a thickness of 45.89 μm,
 an outer radius of 62.5 μm,
 an absolute index difference $\Delta n=0$ (by definition).
As further shown in table 280, the fiber supports the $LP_{01}$ and $LP_{11}$ modes and exhibits the following characteristics:
group delay difference between $LP_{01}$ and $LP_{11}$ modes:
 <0.001 ps/m across C-band,
 calculated $LP_{01}$ effective area $A_{eff}=94.76$ μm$^3$,
 calculated $LP_{11}$ effective area $A_{eff}=94.9$ m$^2$.

A two-mode graded index fiber of the profile disclosed as Example 1.2 and shown in FIG. 26 was fabricated. The losses of $LP_{01}$ and $LP_{11}$ were 0.198 and 0.191 dB/km, respectively, showing excellent DMA <0.01 dB/km. The $LP_{11}$ effective index difference with respect to the outer cladding is 0.0013 in $\Delta n$. The next higher order mode in this trench design is leaky and has an effective index below that of the outer cladding, so that the effective index difference relevant to controlling microbending sensitivity is actually greater than 0.0013 in $\Delta n$.

Example 1.3

FIG. 29 shows a FMF refractive index profile 290 according to an aspect of the invention. The FMF comprises a graded-index core 291, a shoulder 292, a down-doped trench 293, and an outer cladding 294.

Figure 30:
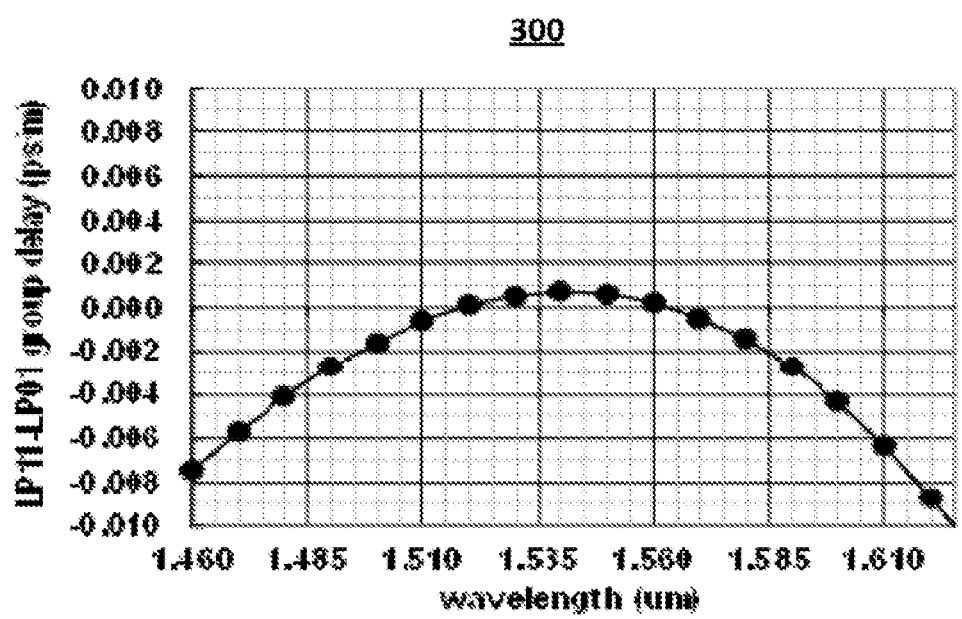
FIG. 30 is a graph illustrating group delay difference between the $LP_{01}$ and $LP_{11}$ modes as a function of wavelength for the fiber design shown in FIG. 29.

The effective index of the guided $LP_{01}$ and $LP_{11}$ modes are shown as labeled black bars in index profile 290. FIG. 30 is a graph 300 illustrating the group delay difference between the $LP_{01}$ and $LP_{11}$ modes as a function of wavelength.

Figures 31, 32:
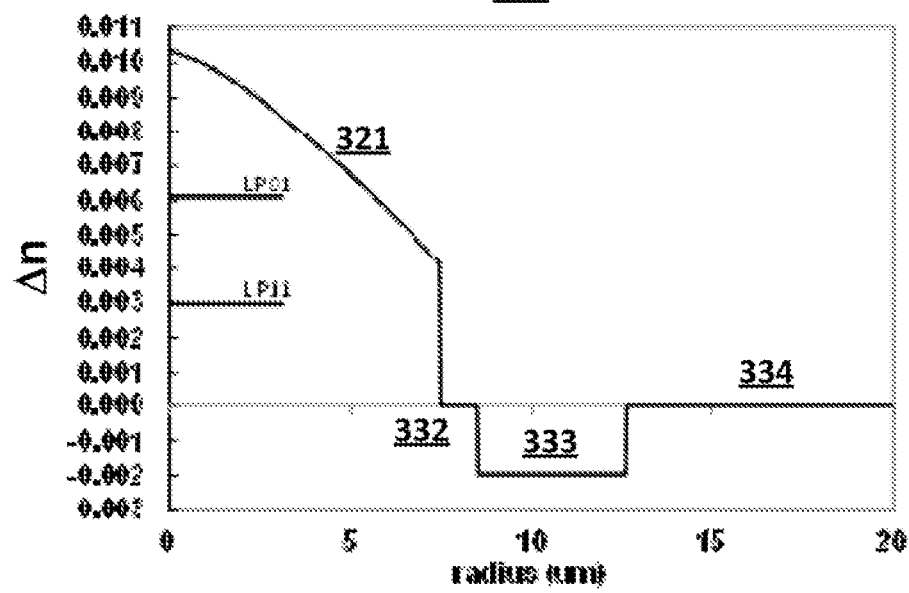
FIG. 31 shows a table setting forth specifications of the fiber design shown in FIG. 29.
FIG. 32 depicts a refractive index profile of a few-mode fiber (FMF) according to a further aspect of the invention.

FIG. 31 shows a table setting forth the specifications of fiber design 290.

As shown in profile design 290 and table 310:
the graded-index core 291 has
a radius of 7.47 μm,
a start absolute index difference Δn=0.0139,
an end absolute index difference Δn=0.0,
an alpha parameter α=2.01;
the shoulder region 292 has
an inner radius of 7.47 μm,
a thickness of 0.65 μm,
an outer radius of 8.12,
an absolute index difference Δn=0.0;
the trench region 293 has
an inner radius of 8.12 μm,
a thickness of 5.0 μm,
an outer radius of 13.12
an absolute index difference Δn=−0.006;
the outer cladding 294 has
an inner radius of 13.12 μm,
a thickness of 49.38 μm,
an outer radius of 62.5 nm,
an absolute index difference Δn=0 (by definition).
As further shown in table 310, the fiber supports the $LP_{01}$ and $LP_{11}$ modes and exhibits the following characteristics:
group delay difference between $LP_{01}$ and $LP_{11}$ modes: <0.001 ps/m across C-band,
calculated $LP_{01}$ effective area $A_{eff}$=59.62 μm$^2$,
calculated $LP_{11}$ effective area $A_{eff}$=59.8 μm$^2$.

Example 2

FIG. 32 shows a FMF refractive index profile 320 according to an aspect of the invention. The FMF comprises a graded-index core 321, a shoulder 322, a down-doped trench 323, and an outer cladding 324.

Figures 33, 34:
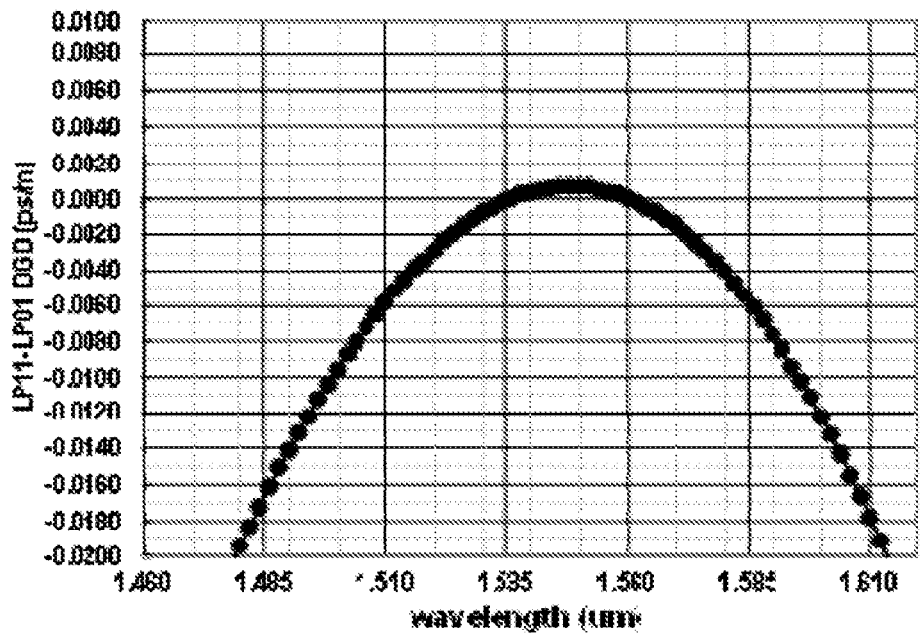
FIG. 33 is a graph illustrating group delay difference between the $LP_{01}$ and $LP_{11}$ modes as a function of wavelength for the fiber design shown in FIG. 32.
FIG. 34 shows a table setting forth specifications for the fiber design shown in FIG. 32.

The effective index of the guided $LP_{01}$ and $LP_{11}$ modes are shown as labeled black bars in index profile 320. FIG. 33 is a graph 330 illustrating the group delay difference between the $LP_{01}$ and $LP_{11}$ modes as a function of wavelength.

FIG. 34 shows a table setting forth the specifications for fiber design 320.

As shown in profile design 320 and table 340:
the graded-index core 321 has
a radius of 7.51 μm,
a start absolute index difference Δn=0.0104.
an end absolute index difference Δn=0.0042,
an alpha parameter α=1.34;
the shoulder region 322 has
an inner radius of 7.51 μm,
a thickness of 1 μm,
an outer radius of 8.51.
an absolute index difference Δn=0;
the trench region 323 has
an inner radius of 8.51 μm,
a thickness of 4.1 μm,
an outer radius of 12.61 μm,
an absolute index difference Δn=−0.002;
the outer cladding 324 has
an inner radius of 12.61 μm,
a thickness of 49.89 μm,
an outer radius of 62.5 μm,
an absolute index difference Δn=0 (by definition).
As further shown in table 340, the fiber supports the $LP_{01}$ and $LP_{11}$ modes and exhibits the following characteristics:
group delay difference between $LP_{01}$ and $LP_{11}$ modes: <0.002 ps/m across C-band.
calculated $LP_{01}$ effective area $A_{eff}$=77.01 μm$^2$.
calculated $LP_{11}$ effective area $A_{eff}$=77.4 μm$^2$.

Example 3

Figure 35:
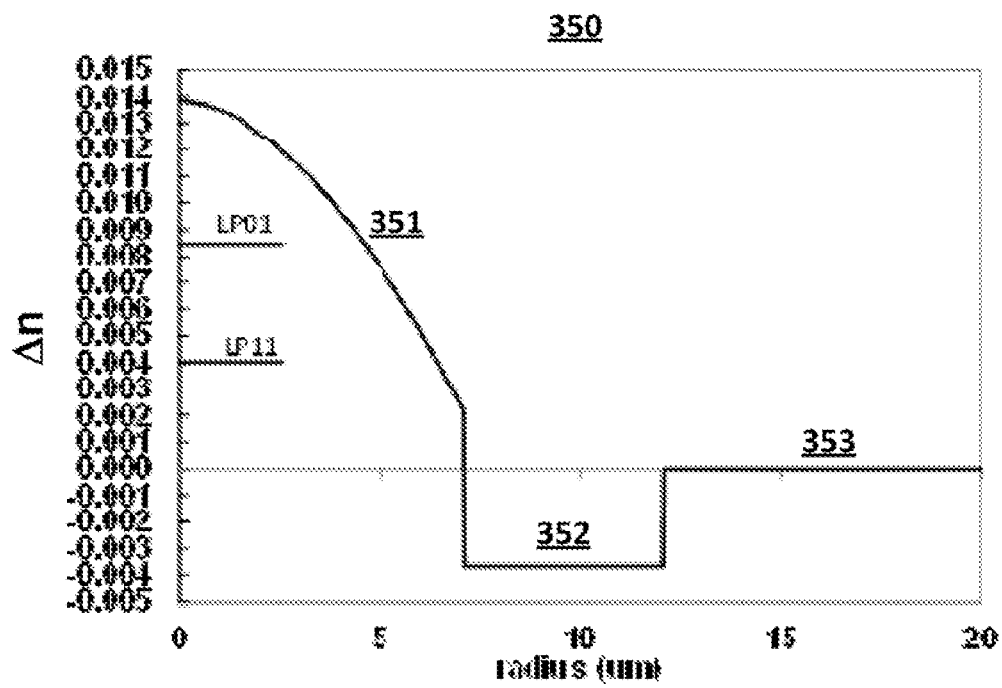
FIG. 35 depicts a refractive index profile of a few-mode fiber (FMF) according to a further aspect of the invention.

FIG. 35 shows a FMF refractive index profile 350 according to an aspect of the invention. The FMF comprises a graded-index core 351, a down-doped trench 352, and an outer cladding 353. (In Examples 3, 4, and 5, there is no shoulder region).

Figure 36:
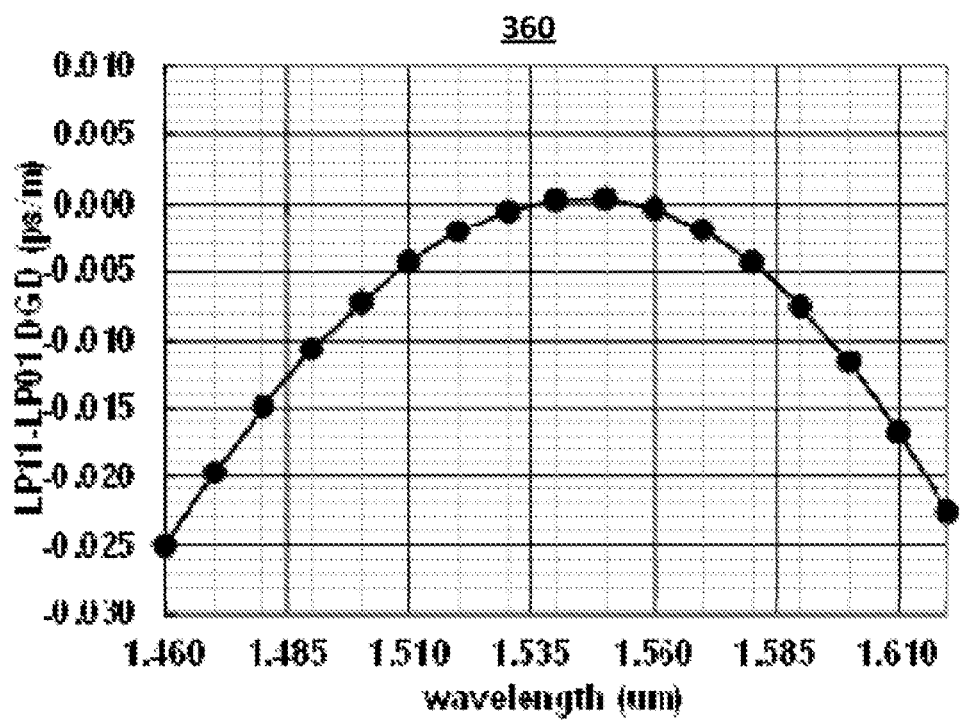
FIG. 36 is a graph illustrating group delay difference between the $LP_{01}$ and $LP_{11}$ modes as a function of wavelength for the fiber design shown in FIG. 35.

The effective index of the guided $LP_{01}$ and $LP_{11}$ modes are shown as labeled black bars in index profile 350. FIG. 36 is a graph 360 illustrating the group delay difference between the $LP_{01}$ and $LP_{11}$ modes as a function of wavelength.

Figures 37, 38:
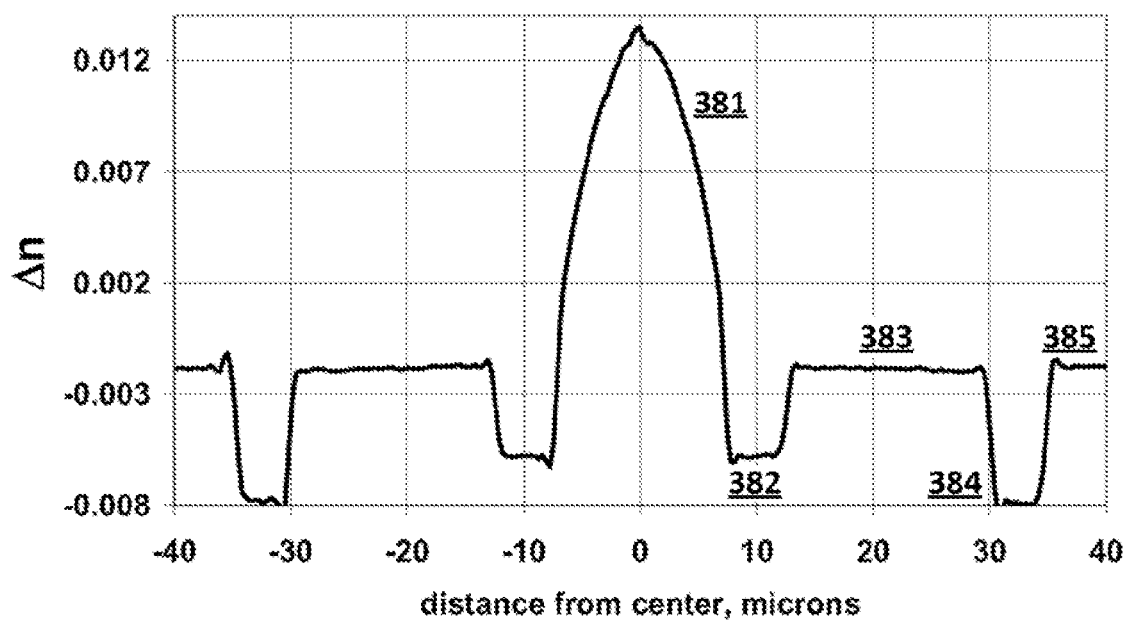
FIG. 37 shows a table setting forth specifications for the fiber design shown in FIG. 35.
FIG. 38 shows a measured refractive index profile of a prototype of the fiber design shown in FIG. 35.

FIG. 37 shows a table setting forth the specifications for fiber design 350.

FIG. 38 shows a measured refractive index profile of a prototype of the fiber design shown in FIG. 35.

The outer trench is not an essential feature of the inventive index profile, but is rather an artifact of the materials readily available when the design was prototyped. The outer trench has some value in limiting macrobending in large diameter loops. The loss of this fiber measured 0.24 dB/km for $LP_{01}$ and $LP_{11}$, with DMA not more than 0.02 dB/km (measurement error bars limited by uncertainty in alignment of mode-selective launch and detection optics).

As shown in profile design 350 and table 370:
the graded-index core 351 has
a radius of 7.1 μm,
a start absolute index difference Δn=0.0139.
an end absolute index difference Δn=0.0022,
an alpha parameter α=1.80;
the trench region 352 has
an inner radius of 7.1 mm,
a thickness of 5 μm.
an outer radius of 12.1 μm,
an absolute index difference Δn=−0.0037:
the outer cladding 353 has
an inner radius of 12.1 μm,
a thickness of 50.4 μm.
an outer radius of 62.5 μm,
an absolute index difference Δn=0 (by definition).
As further shown in table 370, the fiber supports the $LP_{01}$ and $LP_{11}$ modes and exhibits the following characteristics:
group delay difference between $LP_{01}$ and $LP_{11}$ modes: <0.002 ps/m across C-band,
calculated $LP_{01}$ effective area $A_{eff}$=59.59 μm$^2$,
calculated $LP_{11}$ effective area $A_{eff}$=59.8 μm$^2$.

Example 4

Figure 39:
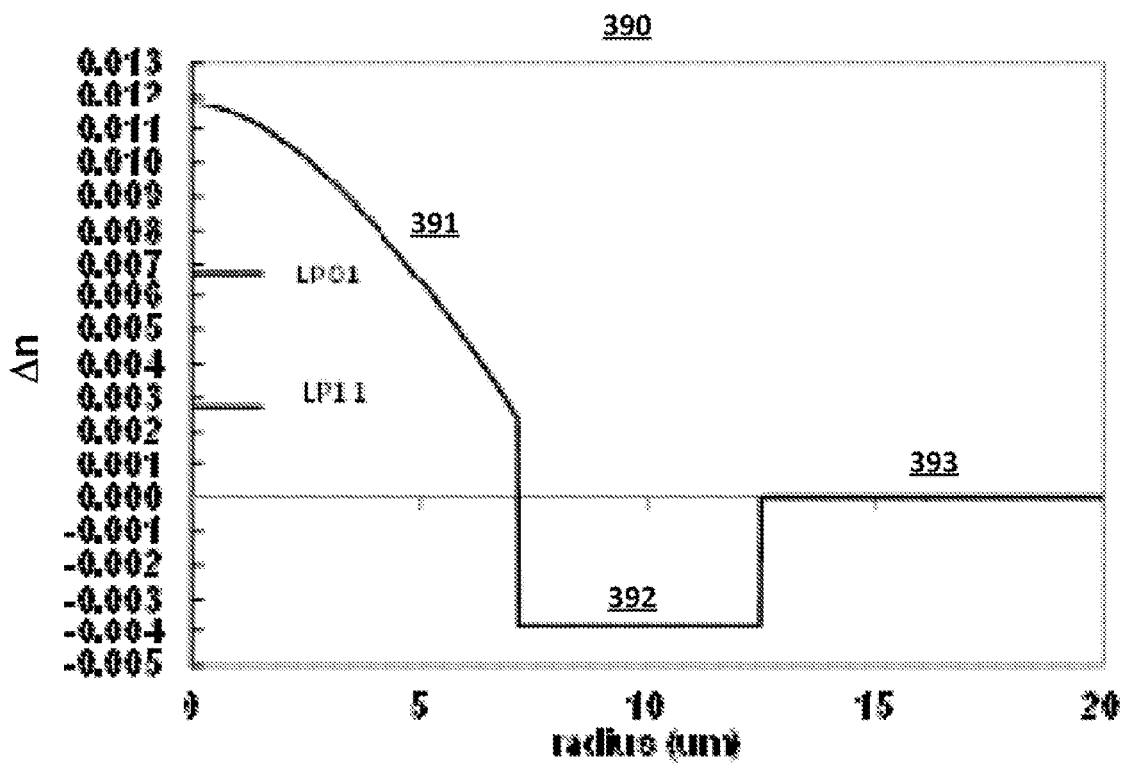
FIG. 39 depicts a refractive index profile of a few-mode fiber (FMF) according to a further aspect of the invention.

FIG. 39 shows a FMF refractive index profile 390 according to an aspect of the invention. The FMF comprises a graded-index core 391, a down-doped trench 392, and an outer cladding 393.

Figure 40:
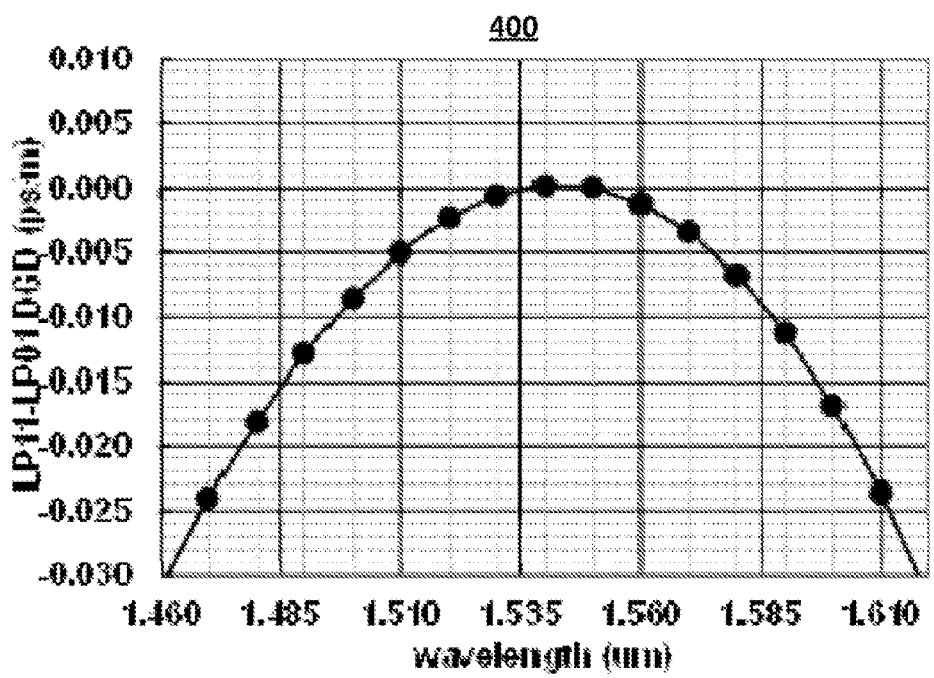
FIG. 40 is a graph illustrating group delay difference between the $L_{01}$ and $LP_{11}$ modes as a function of wavelength for the fiber design shown in FIG. 39.

The effective index of the guided $LP_{01}$ and $LP_{11}$ modes are shown as labeled black bars in index profile 390. FIG. 40 is a graph 400 illustrating the group delay difference between the $LP_{01}$ and $LP_{11}$ modes as a function of wavelength.

Figures 41, 42:
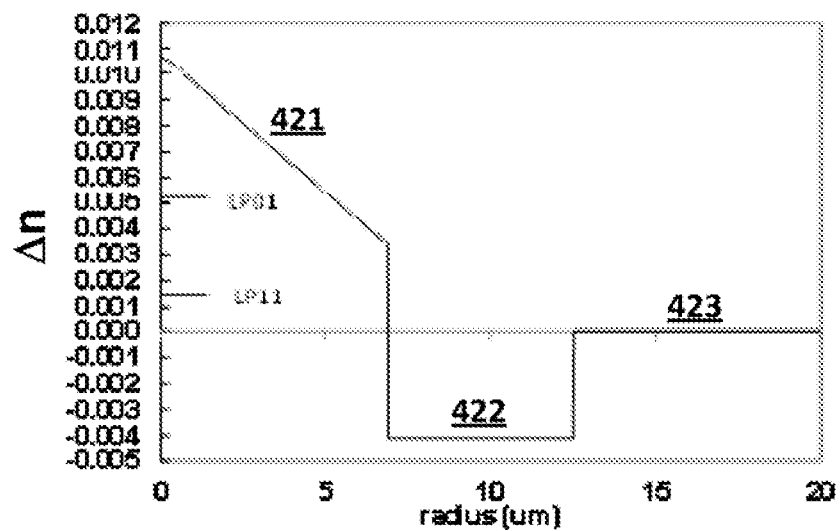
FIG. 41 shows a table setting forth specifications for the fiber design shown in FIG. 39.
FIG. 42 depicts a refractive index profile of a few-mode fiber (FMF), according to a further aspect of the invention.

FIG. 41 shows a table 410 setting forth the specifications for fiber design 390.

As shown in profile design 390 and table 410:
the graded-index core 391 has
a radius of 7.12 μm,
a start absolute index difference Δn=0.0119.
an end absolute index difference Δn=0.0024.
an alpha parameter α=1.62;

the trench region 392 has
an inner radius of 7.12 μm,
a thickness of 5.32 μm,
an outer radius of 12.44
an absolute index difference Δn=−0.0038;
the outer cladding 393 has
an inner radius of 12.44 μm,
a thickness of 50.06 μm,
an outer radius of 62.5 μm,
an absolute index difference Δn=0 (by definition).

As further shown in table 410, the fiber supports the $LP_{01}$ and $LP_{11}$ modes and exhibits the following characteristics:
group delay difference between $LP_{01}$ and $LP_{11}$ modes:
<0.001 ps/m across C-band,
calculated $LP_{10}$ effective area $A_{eff}$=65.4 μm².
calculated $LP_{11}$ effective area $A_{eff}$=65.7 μm².

Example 5

FIG. 42 shows a FMF refractive index profile 420 according to an aspect of the invention. The FMF comprises a graded-index core 421, a down-doped trench 422, and an outer cladding 423.

Figures 43, 44:
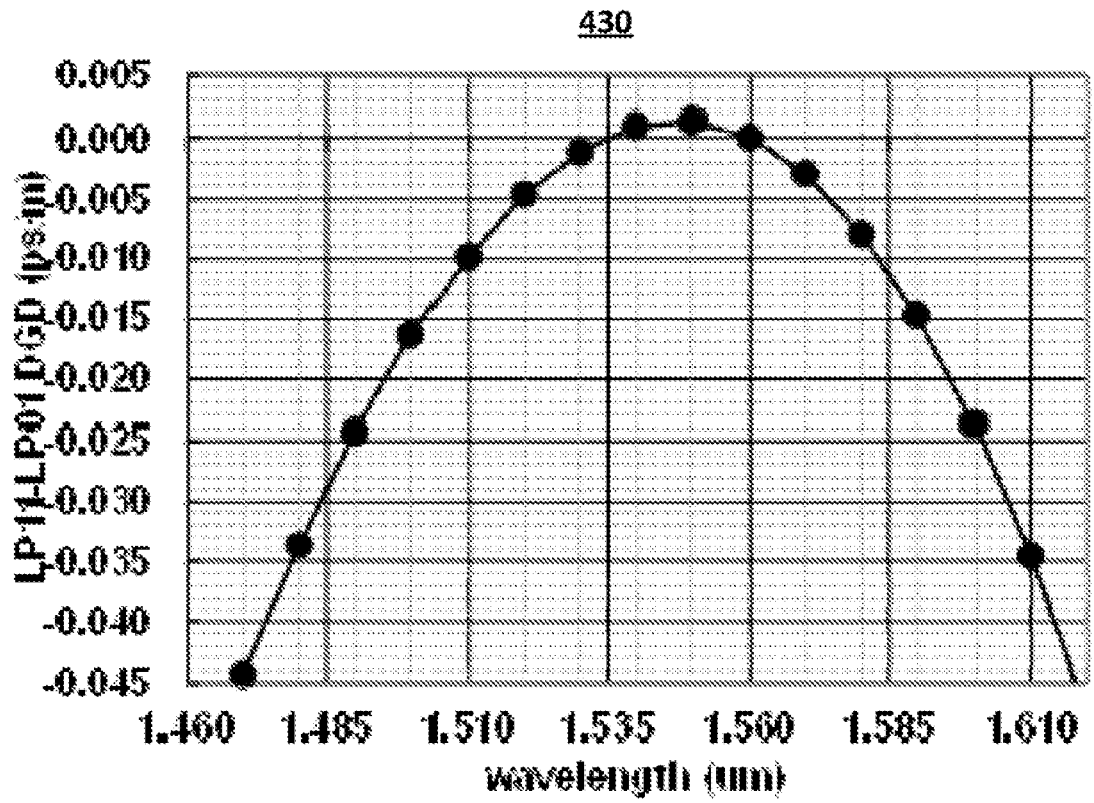
FIG. 43 is a graph illustrating group delay difference between the $LP_{01}$ and $LP_{11}$ modes as a function of wavelength for the fiber design shown in FIG. 42.
FIG. 44 shows a table setting forth specifications for the fiber design shown in FIG. 42.

The effective index of the guided $LP_{01}$ and $LP_{11}$ modes are shown as labeled black bars in index profile 420. FIG. 43 is a graph 320 illustrating the group delay difference between the $LP_{01}$ and $LP_{11}$ modes as a function of wavelength.

FIG. 44 shows a table 440 setting forth the specifications for fiber design 420.

As shown in profile design 420 and table 440:
the graded-index core 421 has
a radius of 6.9 μm,
a start absolute index difference Δn=0.0108,
an end absolute index difference Δn=0.0034.
an alpha parameter α=1.0;
the trench region 422 has
an inner radius of 6.9 μm,
a thickness of 5.58 μm,
an outer radius of 12.48,
an absolute index difference Δn=−0.0041;
the outer cladding 423 has
an inner radius of 12.48 μm,
a thickness of 50.02 μm,
an outer radius of 62.5 μm,
an absolute index difference Δn=0 (by definition).

As further shown in table 440, the fiber supports the $LP_{01}$ and $LP_{11}$ modes and exhibits the following characteristics:
group delay difference between $LP_{01}$ and $LP_{11}$ modes:
<0.002 ps/m across C-band,
calculated $LP_{01}$ effective area $A_{eff}$=70.35 μm²,
calculated $LP_{11}$ effective area $A_{eff}$=70.8 μm².

3.5.4 Gradient-Index Few-Mode Fiber Having Four LP Modes

There are now described a number of examples of FMFs according to aspects of the invention, in which four LP modes are guided: $LP_{01}$, $LP_{11}$, $LP_{11}$, and $LP_{21}$.

Example 6

Figure 45:
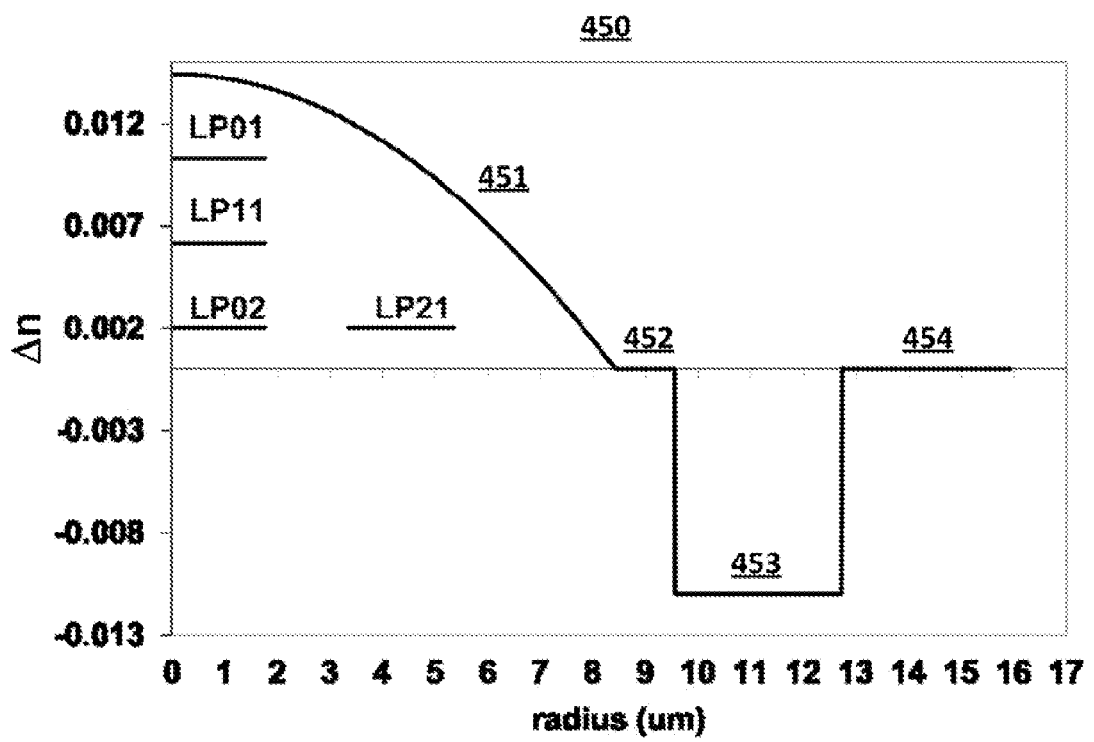
FIG. 45 depicts a refractive index profile of a four-mode fiber according to a further aspect of the invention.

FIG. 45 shows a FMF refractive index profile 450 according to an aspect of the invention. The FMF comprises a graded-index core 451, a shoulder 452, a down-doped trench 453, and an outer cladding 454. The effective index of the guided $LP_{01}$, $LP_{11}$, $LP_{11}$, and $LP_{21}$ modes are shown as labeled black bars in index profile 450.

Figure 46:
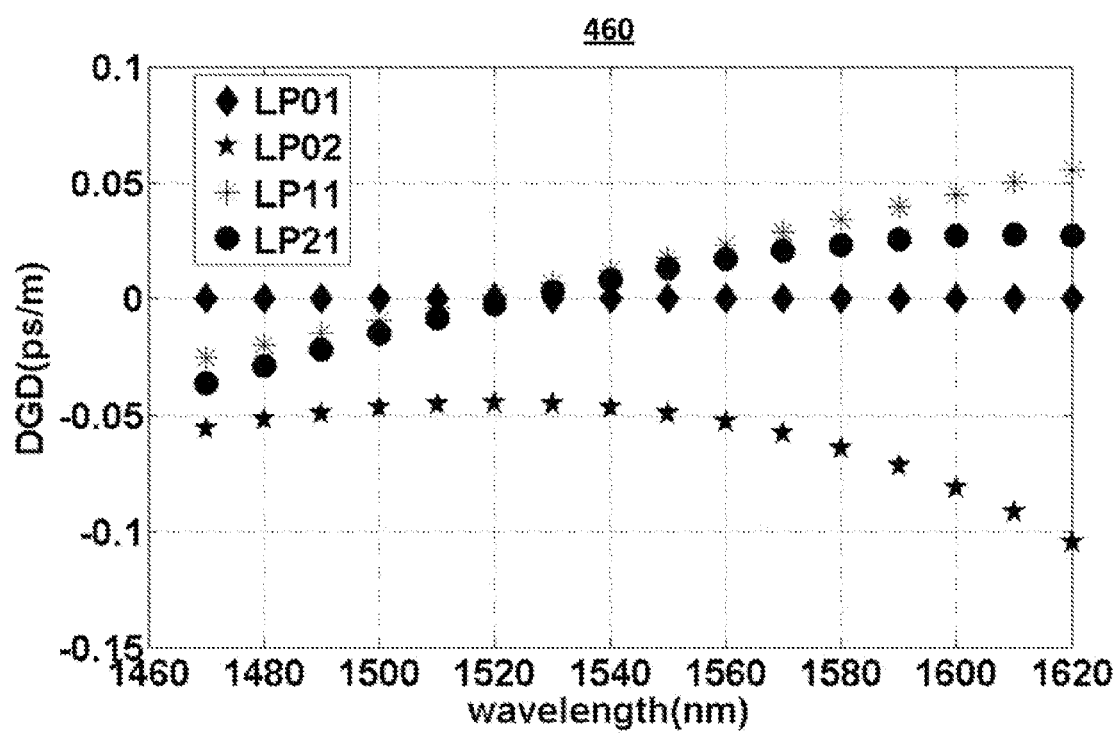
FIG. 46 is a graph illustrating group delay difference between the $LP_{01}$, $LP_{11}$, $LP_{11}$, and $LP_{12}$ modes of the fiber design shown in FIG. 45, as a function of wavelength.

FIG. 46 is a graph 460 illustrating the group delay difference between the $LP_{01}$, $LP_{11}$. $LP_{11}$ and $LP_{21}$ modes as a function of wavelength.

Figures 47, 48:
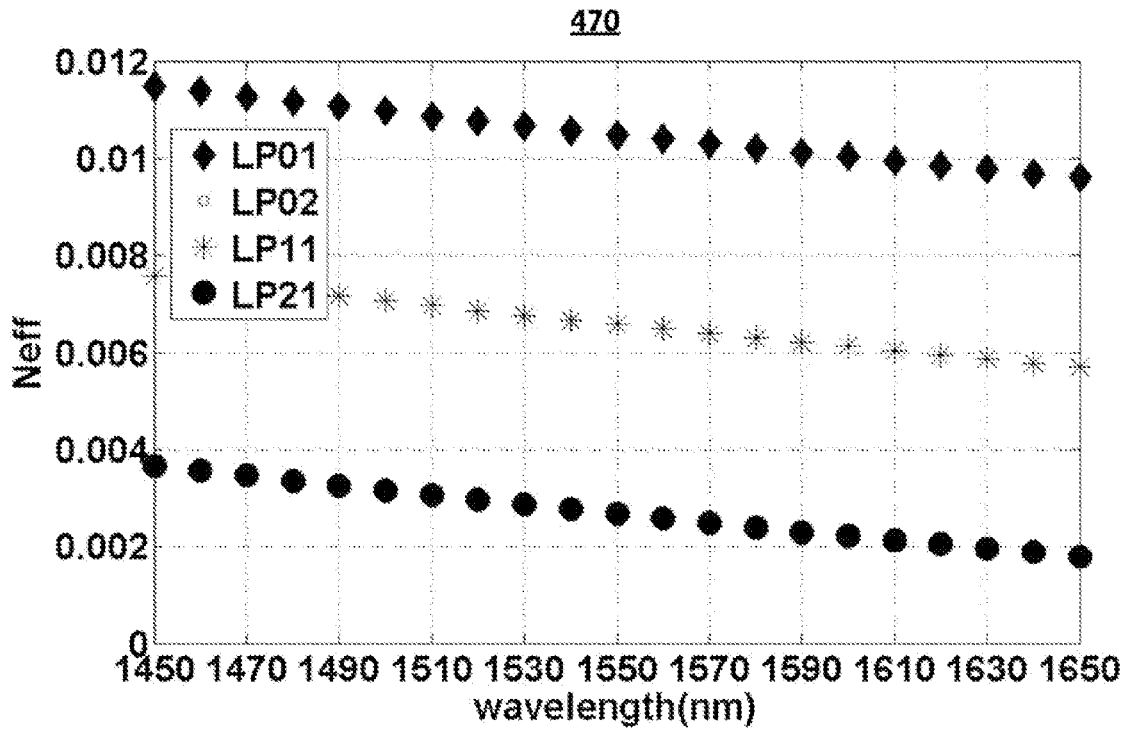
FIG. 47 is a graph illustrating respective effective refractive indices of the four modes of the fiber design shown in FIG. 45, as a function of wavelength.
FIG. 48 shows a table setting forth specifications for the fiber design shown in FIG. 45.

FIG. 47 is a graph 470 illustrating the respective effective refractive indices of the four modes as a function of wavelength.

FIG. 48 shows a table setting forth the specifications for fiber design 480.

As shown in profile design 450 and table 480:
the graded-index core 451 has
a radius of 8.4 rpm,
a start absolute index difference Δn=0.0144,
an end absolute index difference Δn=0,
an alpha parameter α=1.97;
the shoulder region 452 has
an inner radius of 8.4 μm,
a thickness of 1.16 μm,
an outer radius of 9.56,
an absolute index difference Δn=0;
the trench region 453 has
an inner radius of 9.56 μm.
a thickness of 3.16 μm.
an outer radius of 12.72 μm,
an absolute index difference Δn=−0.011;
the outer cladding 454 has an inner radius of 12.72 μm, a thickness of 49.78 μm,
an outer radius of 62.5 μm,
an absolute index difference Δn=0 (by definition).

As further shown in table 480, the fiber supports the $LP_{01}$, $LP_{11}$, $LP_{11}$, and $LP_2$, modes and exhibits group delay difference between $LP_{01}$, $LP_{11}$, $LP_{11}$, and $LP_{21}$ modes <0.05 ps/m across C-band. The effective areas of the $LP_{01}$, $LP_{11}$, $LP_{11}$, and $LP_{21}$ are, respectively, 64.7, 65.2, 131.7, and 87.4 μm².

Example 7

Figure 49:
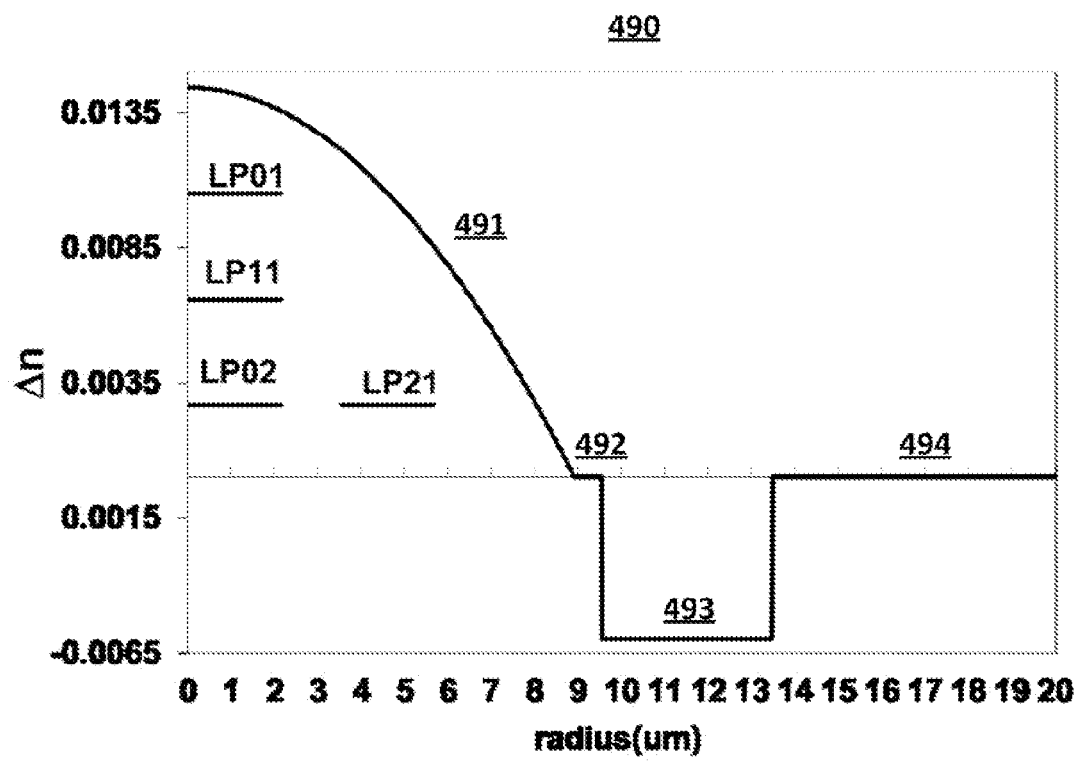
FIG. 49 depicts a refractive index profile of a four-mode fiber according to a further aspect of the invention.

FIG. 49 shows a FMF refractive index profile 490 according to an aspect of the invention. The FMF comprises a graded-index core 491, a shoulder 492, a down-doped trench 493, and an outer cladding 494. The effective index of the guided $LP_{01}$, $LP_{11}$, $LP_{11}$, and $LP_{21}$ modes are shown as labeled black bars in index profile 490.

Figure 50:
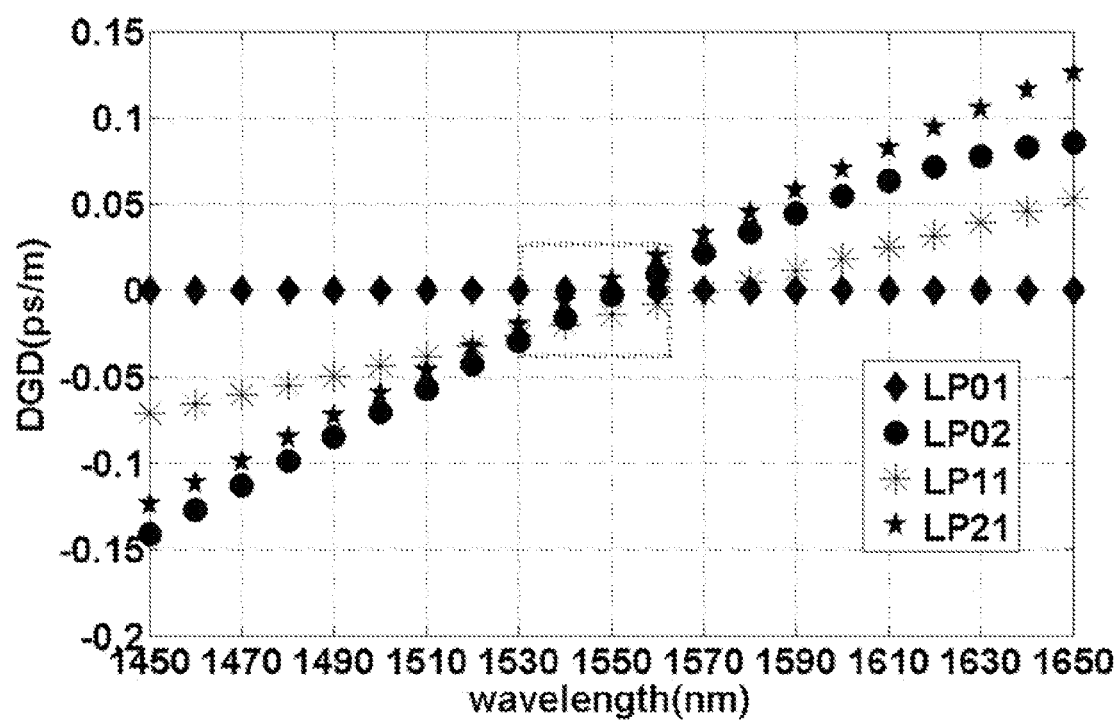
FIG. 50 is a graph illustrating group delay difference between the $LP_{01}$, $LP_{11}$, $LP_{11}$, and $LP_{21}$ modes of the fiber design shown in FIG. 49, as a function of wavelength.

FIG. 50 is a graph 500 illustrating the group delay difference between the $LP_{01}$, $LP_{11}$, $LP_{11}$, and $LP_{21}$ modes as a function of wavelength.

Figures 51, 52:
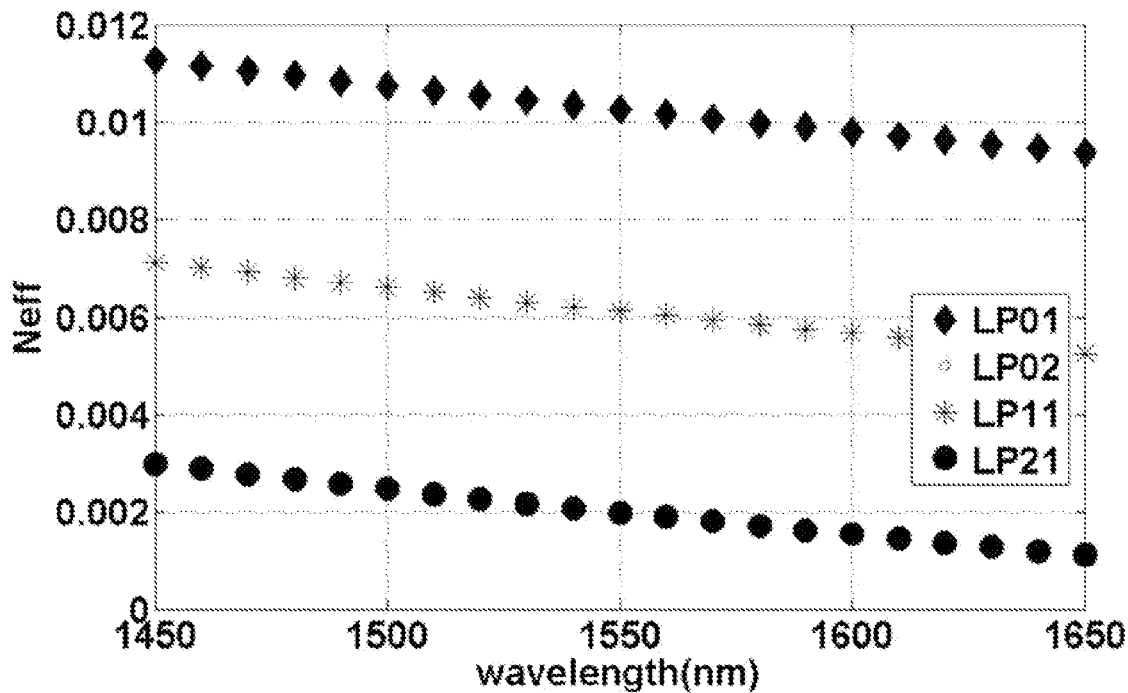
FIG. 51 is a graph illustrating respective effective refractive indices of the four modes of the fiber design shown in FIG. 49, as a function of wavelength.
FIG. 52 shows a table setting forth the specifications for the fiber design shown in FIG. 49.

FIG. 51 is a graph 510 illustrating the respective effective refractive indices of the four modes as a function of wavelength.

FIG. 52 shows a table 520 setting forth the specifications for the fiber design 490.

As shown in profile design 490 and table 250:
the graded-index core 491 has
a radius of 8.91 μm,
a start absolute index difference Δn=0.0144,
an end absolute index difference Δn=0.0.
an alpha parameter α=1.97;
the shoulder region 492 has
an inner radius of 8.91 μm,
a thickness of 0.558 μm.
an outer radius of 9.468 μm,
an absolute index difference Δn=0;
the trench region 493 has
an inner radius of 9.468 μm,
a thickness of 3.906 μm.
an outer radius of 13.374
an absolute index difference Δn=−0.006;

the outer cladding 494 has
an inner radius of 13.374 μm,
a thickness of 49.126 μm,
an outer radius of 62.5 μm,
an absolute index difference Δn=0 (by definition).

As further shown in table 520, the fiber supports the $LP_{01}$, $LP_{11}$, $LP_{11}$, and $LP_{21}$ modes and exhibits group delay difference between $LP_{01}$, $LP_{11}$, $LP_{11}$, and $LP_{21}$ modes <0.1 ps/m across C-band. The effective areas of the $LP_{01}$, $LP_{11}$, $LP_{11}$, and $LP_{21}$ are, respectively, 68.7, 69.04, 138.6, and 92.2 μm$^2$.

Example 8

Figure 53:
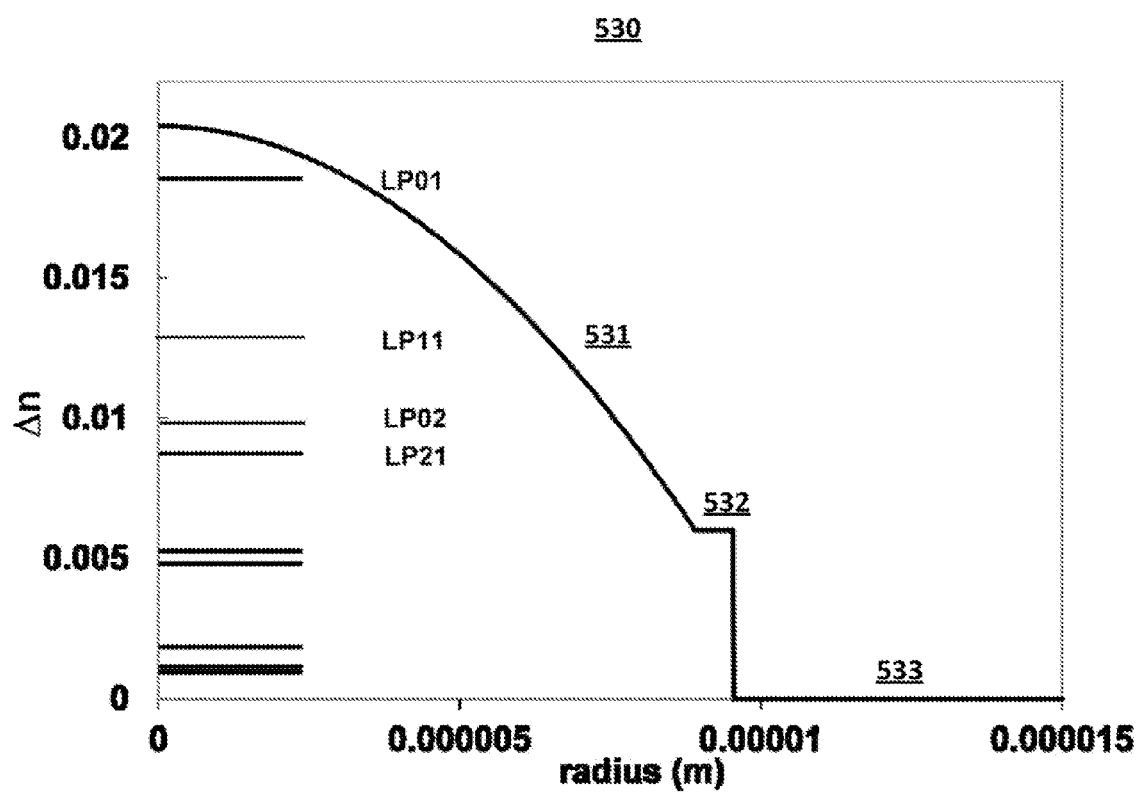
FIG. 53 depicts a refractive index profile of a four-mode fiber, according to a further aspect of the invention.

FIG. 53 shows a FMF refractive index profile 530 according to an aspect of the invention. The FMF comprises a graded-index core 531, a shoulder 532, and an outer cladding 533. The effective index of the guided $LP_{01}$, $LP_{11}$, $LP_{11}$, and $LP_{21}$ modes are shown as labeled black bars in index profile 530. One aspect of this embodiment is to selectively launch into the $LP_{01}$, $LP_{11}$, $LP_{11}$, and $LP_{21}$ modes as the desired signal modes, with the lower guided modes being unwanted. However, the undesirable aspects of having these unwanted, more lossy modes is mitigated by the fact that the spacing in effective index between $LP_{21}$ and the next lower mode is relatively large. The gap may be large enough such that the $LP_{21}$ mode has low attenuation and has low coupling to the next lower mode. Alternatively, the core may be supplemented by an advanced cladding structure to provide selective resonant suppression of the unwanted modes. Cladding structures such as rings or additional waveguides can provide index-matched coupling and facilitate leakage of unwanted modes.

A second aspect of FIG. 53 is to illustrate the approximate gap in effective index between $LP_{21}$ and $LP_{11}$ and the leaky modes below the outer cladding index for the designs of FIGS. 45 and 49, where the leaky modes were not calculated by the software. The gap in FIG. 53 is a close approximation to the gap in the case of FIGS. 45 and 49, indicating that $LP_{21}$ and $LP_{11}$ will have low bending losses, thus supporting low DMA for those profile designs.

3.5.5 Summary of Examples

FIG. 54 shows a table 540 that summarizes the specifications for the two-mode core-shoulder-trench FMF designs of Examples 1.1, 1.2, 1.3, and 2, discussed above.

FIG. 55 shows a table 550 that summarizes the specifications for the two-mode core-trench FMF designs of Examples 3, 4 and 5, discussed above.

FIG. 56 shows a table 560 that summarizes the specifications for the four-mode core-shoulder-trench FMF designs of Examples 6 and 7, discussed above.

FIG. 57 shows a table 570 setting forth, for Examples 1-7 above, the following information with respect to effective index $n_{eff}$@1550 nm:

Column 1: the effective index $n_{eff}$ of the $LP_{01}$ mode;
Column 2: the effective index $n_{eff}$ of the $LP_{11}$ mode;
Column 3: the effective index $n_{eff}$ of the $LP_{11}$ mode (for the four-mode FMFs shown in Examples 6 and 7);
Column 4: the effective index $n_{eff}$ of the $LP_{21}$ mode (for the four-mode FMFs shown in Examples 6 and 7);
Column 5: the effective index difference between the $LP_{01}$ and $LP_{11}$ modes (i.e., $LP_{11}-LP_{11}$);
Column 6: the effective index difference between the $LP_{11}$ and $LP_{21}$ modes (i.e., $LP_{11}-LP_{21}$) for the four-mode FMFs shown in Examples 6 and 7;
Column 7: the lowest guided mode effective index;
Column 8: trench volume (i.e., the cross-sectional area of the trench, in μm$^2$, multiplied by the absolute index difference Δn).

It can be seen from FIG. 57 that all of the exemplary graded index designs have effective index differences between $LP_{01}$ and $LP_{11}$ (column 5) and between $LP_{11}$ and $LP_{11}/LP_{21}$ (column 6) that are beneficially 2× to 3× larger than the difference of approximately 0.0014 in conventional MMF or bend-insensitive MMF @1550 nm shown in FIG. 22; this large mode spacing reduces power loss down the cascade of modes and may also enable simpler MIMO schemes.

Also, the difference between the effective index of the lowest guided, desired mode and the outer cladding index are all greater than 0.001 Δn (in column 7). Since the next higher order mode is below the outer cladding in effective index, the fiber designs shown in FIG. 57 have a difference between the LP mode effective index and the leaky, higher order mode with effective index below that of the outer cladding that is greater than the value show in column 7. This was illustrated in Example 8 shown in FIG. 53 and the discussion of it. Good DMA will be obtained for effective index differences between $LP_{11}$ and the next HOM of >0.0009 and more preferably >0.00125 and most preferably >0.0018, all in Δn.

4.0 CONCLUSION

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An optical fiber, comprising:
a core and a cladding surrounding the core;
wherein the core and cladding have a step index profile that is structured to support propagation of a plurality of desired signal-carrying modes, while suppressing undesired modes,
wherein the cladding includes an outer cladding region having an outer radius $r_{cladding}$, a refractive index $n_{cladding}$, and an index difference $\Delta n_{cladding}=0$, and
wherein the core has a radius $r_{core}$, a refractive index $n_{core}$, and an index difference $\Delta n_{core}$,
wherein the core and cladding are configured such that the undesired modes have respective effective indices that are close to, or less than, the cladding index such that the undesired modes are leaky modes, and
wherein the index spacing between the desired mode having the lowest effective index and the leaky mode with the highest effective index is sufficiently large so as to substantially prevent coupling therebetween.

2. The fiber of claim 1, wherein the core and cladding are configured for operation in the C-band.

3. The optical fiber of claim 1, wherein the cores and cladding are configured such that the desired modes have respective effective indices with an index spacing that is sufficiently large so as to achieve desired levels of mode-coupling, differential group delay and differential mode attenuation.

4. The optical fiber of claim 3, wherein the fiber is configured to support the $LP_{01}$ and $LP_{11}$ and to cut off the next higher order modes.

5. The optical fiber of claim 4, wherein the index spacing between the $LP_{11}$ mode and the next highest-order mode is $\Delta n = 0.0009$ or greater.

6. The optical fiber of claim 5, wherein the core and cladding are configured are configured to achieve a differential group delay of 200 ps/km or less.

7. The optical fiber of claim 5, wherein the core and cladding are configured are configured to achieve a differential group delay of 100 ps/km or less.

8. The optical fiber of claim 5, wherein the core and cladding are configured are configured to achieve a differential group delay of 60 ps/km or less.

9. The optical fiber of claim 5, wherein the core and cladding are configured to achieve a differential mode attenuation of 0.1 dB/km or less.

10. The optical fiber of claim 5, wherein the core and cladding are configured to achieve a differential mode attenuation of 0.02 dB/km or less.

11. The optical fiber of claim 5, wherein the core and cladding are configured to achieve a differential mode attenuation of 0.01 dB/km or less.

12. The optical fiber of claim 5, wherein the cladding further includes an inner, down-doped trench region between the core and the outer cladding region.

13. The optical fiber of claim 1,
wherein the fiber supports a plurality of guided modes, and wherein the $LP_{01}$ mode has an effective area $A_{\it eff} > 150\ \mu m^2$.

14. The optical fiber of claim 13,
wherein $\Delta n_{core} < 5 \cdot 10^{-3}$,
where $r_{core} > 8\ \mu m$, and
wherein the fiber has an effective area $A_{\it eff} > 200\ \mu m^2$.

15. The optical fiber of claim 13,
wherein $\Delta n_{core} < 5 \cdot 10^{-3}$,
where $r_{core} > 10\ \mu m$, and
wherein the fiber has an effective area $A_{\it eff} > 300\ \mu m^2$.

16. A transmission link comprising the fiber of claim 13, wherein multipath interference is suppressed by periodically inserted mode strippers.

17. The transmission link of claim 16, wherein the mode strippers are formed by tapering the fiber.

* * * * *